United States Patent [19]
Shimomura

[11] Patent Number: 5,796,872
[45] Date of Patent: Aug. 18, 1998

[54] METHOD AND APPARATUS FOR COMPRESSING AND DECOMPRESSING IMAGE DATA

[75] Inventor: Yukari Shimomura, Yokohama, Japan

[73] Assignee: Canon Kabushiki Kaisha, Tokyo, Japan

[21] Appl. No.: 36,559

[22] Filed: Mar. 23, 1993

[30] Foreign Application Priority Data

Mar. 25, 1992 [JP] Japan .................................. 4-066799
Jul. 29, 1992 [JP] Japan .................................. 4-202525

[51] Int. Cl.6 .............................. G06K 9/36; G06K 9/46
[52] U.S. Cl. ...................... 382/237; 382/238; 358/261.2
[58] Field of Search ........................... 382/56, 22, 237, 382/238, 236; 358/261.1, 261.2, 261.3, 427, 428, 430; 356/394; 341/56

[56] References Cited

U.S. PATENT DOCUMENTS

| | | | |
|---|---|---|---|
| 3,992,572 | 11/1976 | Nakagome et al. | 178/6 |
| 4,646,148 | 2/1987 | Lienard et al. | 382/236 |
| 4,742,554 | 5/1988 | Tsuda | 382/50 |
| 4,876,607 | 10/1989 | Tseng | 382/56 |
| 5,046,119 | 9/1991 | Hoffert et al. | 382/56 |
| 5,123,061 | 6/1992 | Pritchard | 358/261.1 |
| 5,235,430 | 8/1993 | Takasu | 358/261.2 |
| 5,245,679 | 9/1993 | Rosenberg | 382/56 |
| 5,303,372 | 4/1994 | Oliver et al. | 382/56 |
| 5,365,347 | 11/1994 | Ozaki | 358/261.3 |

OTHER PUBLICATIONS

*Patent Abstracts of Japan*, vol. 006, No. 009 (E–910) (kokai 56–131260) (Jan. 1982).
"Multilevel Image Coding Using a Two–Component Method", in *IBM Technical Disclosure Bulletin*, pp. 116–121 (Dec. 1988).

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

A first comparator compares pixel data outputted by a pixel-data generating unit with an immediately preceding item of pixel data that has been latched by a first latch. The result of comparison is delivered to a first memory unit. If the result of comparison is that the two compared items of pixel data do not agree, a second comparator compares the pixel data outputted by the pixel-data generating unit with pixel data latched by a second latch. The result of this comparison is delivered to a second memory unit. If the result of the comparison performed by the second comparator is that the two compared items of pixel data do not agree, the pixel data from the generating unit is stored in a third memory unit. When the pixel data latched by the first latch does not agree with this pixel data, the content latched by the second latch is updated to the content latched by the first latch and the content latched by the first latch is updated to this pixel data.

24 Claims, 35 Drawing Sheets

FIG. 9

| | PRESENT [3] | FORMA [3] | FORMB [3] | COUNT | FIRST MEMORY UNIT | SECOND MEMORY UNIT | THIRD MEMORY UNIT |
|---|---|---|---|---|---|---|---|
| INITIAL VALUE | — | 255, 255, 255 | 0, 0, 0 | 0 | — | — | — |
| PIXEL 41 | 255, 255, 255 | → | → | 1 | 0 | — | — |
| PIXEL 42 | 255, 255, 255 | → | → | 2 | 0 | — | — |
| PIXEL 43 | 230, 10, 120 | 230, 10, 120 | 255, 255, 255 | 3 | 1 | 1 | 230, 10, 120 |
| PIXEL 44 | 230, 10, 120 | → | 230, 10, 120 | 4 | 0 | — | — |
| PIXEL 45 | 255, 255, 255 | 255, 255, 255 | → | 5 | 1 | 0 | — |
| PIXEL 46 | 255, 255, 255 | → | 255, 255, 255 | 6 | 0 | — | — |
| PIXEL 47 | 0, 200, 255 | 0, 200, 255 | 255, 255, 255 | 7 | 1 | 1 | 0, 200, 255 |
| ⋯ | ⋯ | ⋯ | ⋯ | ⋯ | ⋯ | ⋯ | ⋯ |

☐ (255,255,255)

▦ (230, 10,120)

▨ ( 0,200,255)

| 0 | 0 | 1 | 0 | 1 | 0 | 0 | 0 |
|---|---|---|---|---|---|---|---|
| 0 | 1 | 0 | 0 | 1 | 0 | 0 | 0 |
| 1 | 0 | 0 | 0 | 1 | 0 | 0 | 0 |
| 1 | 0 | 0 | 0 | 1 | 0 | 1 | 0 |
| 1 | 0 | 0 | 0 | 1 | 0 | 1 | 0 |
| 1 | 0 | 0 | 0 | 1 | 0 | 1 | 0 |
| 1 | 0 | 0 | 0 | 0 | 0 | 1 | 0 |
| 1 | 0 | 0 | 0 | 0 | 0 | 1 | 0 |

| * | * | 1 | * | 0 | * | * | * |
|---|---|---|---|---|---|---|---|
| * | 0 | * | * | 0 | * | * | * |
| 0 | * | * | * | 0 | * | * | * |
| 0 | * | * | * | 0 | * | 1 | * |
| 1 | * | * | * | 1 | * | 1 | * |
| 1 | * | * | * | 1 | * | 1 | * |
| 0 | * | * | * | * | * | 0 | * |
| 0 | * | * | * | * | * | 0 | * |

Block 3301:
```
 30  30  30 225 225 225 225  30  30 225 225 225 225 225  30  30
225  30  30  30 225 225 225  30  30 225 225 225 225 225 225  30
225 225 225  30  30 225 225  30  30 225 225 225 225 225 225 225
225  30  30 225 225 225 225  30 225 225 225 225 225 225 225 225
 30  30  30  30 225 225 225 225 225 225 225 225 225 225 225 225
 30  30  30  30  30  30  30  30 225 225 225 225 225 225 225 225
225  30  30  30  30  30  30  30  30  30 225 225 225 225 225 225
225  30  30 225 225  30  30  30  30  30  30  30  30 225 225 225
225  30  30 225 225 225 225 225  30  30  30  30  30  30 225 225
225  30  30 225 225 225 225 225 225  30  30  30  30  30  30  30
 30  30  30 225 225 225 225  30  30  30  30  30  30  30  30  30
 30  30  30  30  30 225 225  30  30  30  30 225 225 225 225  30
 30  30  30  30  30  30  30  30  30 225 225 225 225 225 225 225
225 225  30  30  30  30  30  30 225 225 225 225 225 225 225 225
225 225 225 225 225  30  30  30  30  30 225 225 225 225 225 225
225 225 225 225 225 225 225 225  30  30  30 225 225 225 225 225
```

Block 3302:
```
 30  30  30 225 225 225 225  30  30 225 225 225 225 225  30  30
225  30  30  30 225 225 225  30  30 225 225 225 225 225 225  30
225 225 225  30  30 225 225  30  30 225 225 225 225 225 225 225
225  30  30 225 225 225 225  30 225 225 225 225 225 225 225 225
 30  30  30  30 225 225 225 225 225 225 225 225 225 225 225 225
 30  30  30  30  30  30  30  30 225 225 225 225 225 225 225 225
225  30  30  30  30  30  30  30  30  30 225 225 225 225 225 225
225  30  30 225 225  30  30  30  30  30  30  30  30 225 225 225
225  30  30 225 225 225 225 225  30  30  30  30  30  30 225 225
225  30  30 225 225 225 225 225 225  30  30  30  30  30  30  30
 30  30  30 225 225 225 225  30  30  30  30  30  30  30  30  30
 30  30  30  30  30 225 225  30  30  30  30 225 225 225 225  30
 30  30  30  30  30  30  30  30  30 225 225 225 225 225 225 225
225 225  30  30  30  30  30  30 225 225 225 225 225 225 225 225
225 225 225 225 225  30  30  30  30  30 225 225 225 225 225 225
225 225 225 225 225 225 225 225  30  30  30 225 225 225 225 225
```

Block 3303: 16 rows × 16 columns, all 225.

| | PRESENT [3] | FORMA [3] | FORMB [3] | FIRST COMPAR-ATOR | SECOND COMPAR-ATOR | PALETTE MEMORY ADDRESS | PALETTE MEMORY | COLNUM | OUTBIT | CHECK |
|---|---|---|---|---|---|---|---|---|---|---|
| INITIAL VALUE | — | 255, 255, 255 | 0, 0, 0 | — | — | — | — | 0 | 1 | 2 |
| PIXEL (a) | 255, 255, 255 | → | → | 0 | — | — | — | → | → | → |
| PIXEL (b) | 255, 255, 255 | → | → | 0 | — | — | — | → | → | → |
| PIXEL (c) | 160, 0, 240 | 160, 0, 240 | 255, 255, 255 | 1 | 1 | 0 | 160, 0, 240 | 1 | → | → |
| PIXEL (d) | 160, 0, 240 | → | → | 0 | — | — | — | → | → | → |
| PIXEL (e) | 255, 255, 255 | 255, 255, 255 | 160, 0, 240 | 1 | 0 | — | — | → | → | → |
| PIXEL (f) | 255, 255, 255 | → | 255, 255, 255 | 0 | 1 | — | — | → | → | → |
| PIXEL (g) | 0, 0, 0 | 0, 0, 0 | → | 1 | 1 | 1 | 0, 0, 0 | 2 | 2 | 4 |
| PIXEL (h) | 0, 0, 0 | → | → | 0 | 0 | — | — | → | → | → |
| PIXEL (i) | 200, 10, 0 | 200, 10, 0 | 0, 0, 0 | 1 | 1 | 10 | 200, 10, 0 | 3 | 3 | → |
| PIXEL (j) | 0, 0, 0 | 0, 0, 0 | 200, 100, 0 | 1 | 0 | — | — | → | → | → |
| PIXEL (k) | 255, 255, 255 | 255, 255, 255 | 0, 0, 0 | 1 | 1 | 11 | 255, 255, 255 | 4 | → | 8 |
| PIXEL (l) | 255, 255, 255 | → | → | 0 | 1 | — | — | → | → | → |
| PIXEL (m) | 160, 0, 240 | 160, 0, 240 | 255, 255, 255 | 1 | 1 | 000 | — | → | → | → |
| ... | ... | ... | ... | ... | ... | ... | ... | ... | ... | ... |

METHOD AND APPARATUS FOR COMPRESSING AND DECOMPRESSING IMAGE DATA

BACKGROUND OF THE INVENTION

1. [Field of the Invention]

This invention relates to a method and apparatus for compressing and decompressing image data. More particularly, the invention relates to a method and apparatus for compressing and decompressing image data, in which a deterioration in image quality is suppressed at the time of compression/decompression processing.

2. [Description of the Related Art]

There is growing demand in DTP (desktop publishing) for better image quality in images created by computer, and progress is being made in providing images having better colorization and higher tonality. The quantity of information involved in such images can be as much as approximately 46 megabytes if printing is performed on size A4 paper at a resolution of 400 dpi in 256 tones and three colors. If image data is converted into code information such as page description language, the amount of information can be reduced. However, time is required to develop the code information into image data and, once the code information is developed, the original image data itself cannot always be faithfully reproduced.

A typical method of compressing a multivalued color image is one that relies upon an ADCT (adaptive discrete cosine transform) recommended by the JPEG (Joint Photographic Experts Group). The ADCT compression method will now be described.

FIG. 39 is a block diagram illustrating the functional configuration of a typical ADCT compressing apparatus. The arrangement includes a color converting unit 3101 in which the color space (NTSC-RGB) of an NTSC system represented by red (R), green (G) and blue (B) is converted into a color space (YCrCb) represented by luminance data Y and two items of color-difference data Cr, Cb. The output of the color converting unit 3101 is applied to a sub-sampling unit 3102 that reduces the amount of color-difference data by utilizing a characteristic based upon the fact that human vision is sensitive to luminance but insensitive to differences in color. More specifically, the sub-sampling unit 3102 uses the mean value of two mutually adjacent items of color-difference data to halve the amount of color-difference data. This output is applied to a DCT unit 3103, which subdivides the image data entered from the sub-sampling unit 3102 into an 8×8 block and uses DCT to transform the image data into a frequency space. This output is applied to a quantizing unit 3104 for dividing each of the resulting 64 DCT coefficients by quantizing values having different step widths. The output of the quantizer is applied to Huffman encoding unit 3105 that divides the 64 quantized DCT coefficients into one DC coefficient and 63 AC coefficients and then encodes each of these coefficients in accordance with a Huffman table recommended by the JPEG. The encoded data is stored in memory along with a header such as quantization table data, Huffman table data, etc., or is transmitted to another apparatus.

FIG. 40 is a block diagram illustrating the functional configuration of a typical ADCT decompressing apparatus. This apparatus includes a Huffman decoding unit 3205 for decoding the encoded data applied thereto and producing quantized data. A reverse-quantizing unit 3204 converts the quantized data, which has been produced by the Huffman decoding unit 3205, into DCT coefficient data. These DCT coefficients obtained as a result of multiplying 64 coefficients by the quantization values of the quantization table data used when quantization when performed by the quantizing unit 3104. The output of the reverse-quantizing unit 3204 is applied to a reverse-DCT unit 3203 for transforming the DCT coefficient data obtained by the reverse quantizing unit 3204 into actual image data. An interpolator 3202 performs simple interpolation by an iterative method, thereby obtaining the Cr and Cb data that was lost by the processing of the sub-sampling unit 3102 at the time of data compression. This output is applied to a color-space converting unit 3201, which converts the YCrCb data into color-space data (e.g., NTSC-RGB) suited to the device for which the output is destined.

However, the above-described ADCT compression method is an irreversible compression method accompanied by loss of data at the time of quantization in the sub-sampling unit 3102 and quantizing unit 3104. Accordingly, the decompressed data is different from the original uncompressed data and, hence, there is a decline in the quality of the image.

The advantage of an image (a computer-produced image) produced by a computer for DTP or the like is the sharpness of its outline and the coloring of a single figure (or character) in a single color without noise. However, when a computer-produced image is processed by the ADCT compression method, the outlines of figures are disturbed, false edges (referred to as "mosquito noise") are produced and changes in color are caused by quantization. Thus, the merits of a computer-produced image cannot be manifested fully. In particular, since the above-described ADCT compression method uses 8×8 block processing, color undergoes a major change at boundaries. When the compression ratio is raised, the AC components are eventually lost, block distortion occurs and resolution is reduced to one eighth.

Though a method is conceivable in which compression is performed upon suppressing quantization to such a degree that the decline in image quality becomes indistinguishable to the eye, a practical compression ratio cannot be achieved with this method when it is applied to a computer-produced image inherently characterized by a large quantity of high-frequency data. Accordingly, a computer-produced image of the kind created by DTP requires compression using a reversible compression method through which a high compression ratio can be obtained.

SUMMARY OF THE INVENTION

An object of the present invention is to provide a method and apparatus for image-data compression and decompression, wherein a multivalued image produced by a computer or the like can be compressed at a high compression ratio while suppressing a decline in image quality.

According to the present invention, the foregoing object is attained by providing a data compression apparatus comprising first memory means for detecting a position at which there is a change in successively entered pixel data and storing the detected position, and second memory means for storing pixel data after the change at the detected position.

In the arrangement described above, the position at which pixel data changes is detected and the resulting information is stored by the first memory means. The pixel data after the change at the detected position is stored by the second memory means.

Further, according to the present invention, the foregoing object is attained by providing a data decompression apparatus comprising first output means, to which first data representing a change position at which pixel data changes is entered. for outputting pixel data, which was outputted previously. until the change position at which pixel data to be outputted changes is detected based upon the first data, and second output means. to which second data representing pixel data is entered when the change position has been detected. for outputting the second data as pixel data after the change at the change position.

In the arrangement described above, first data representing the change position at which pixel data changes is inputted to the first output means, which outputs pixel data identical to that outputted previously so long as the change position at which the pixel data changes is not detected. When the change position at which pixel data changes is detected based upon the first data, the second output means, to which the second data representing the pixel data is applied. outputs the second data as the next item of pixel data.

Other features and advantages of the present invention will be apparent from the following description taken in conjunction with the accompanying drawings. in which like reference characters designate the same or similar parts throughout the figures thereof.

BRIEF DESCRIPTION OF THE DRAWINGS

FIG. 9 is a diagram showing the states of various data when the image data of FIG. 4 is processed;

FIG. 18 is a diagram showing data stored in a third memory of the data compression apparatus according to the fourth embodiment;

FIG. 19 is a diagram showing data stored in a third memory of the data compression apparatus according to the first embodiment;

FIG. 26 is a diagram showing RGB data, which is one example of image data;

FIG. 37 is a diagram showing the states of various data when the image data of FIG. 31 is processed;

DESCRIPTION OF THE PREFERRED EMBODIMENTS

Preferred embodiments of the present invention will now be described in detail in accordance with the accompanying drawings.

[First Embodiment]
<Data Compression Apparatus>

A data compression apparatus according to a first embodiment of the invention will now be described.

Figure 1:
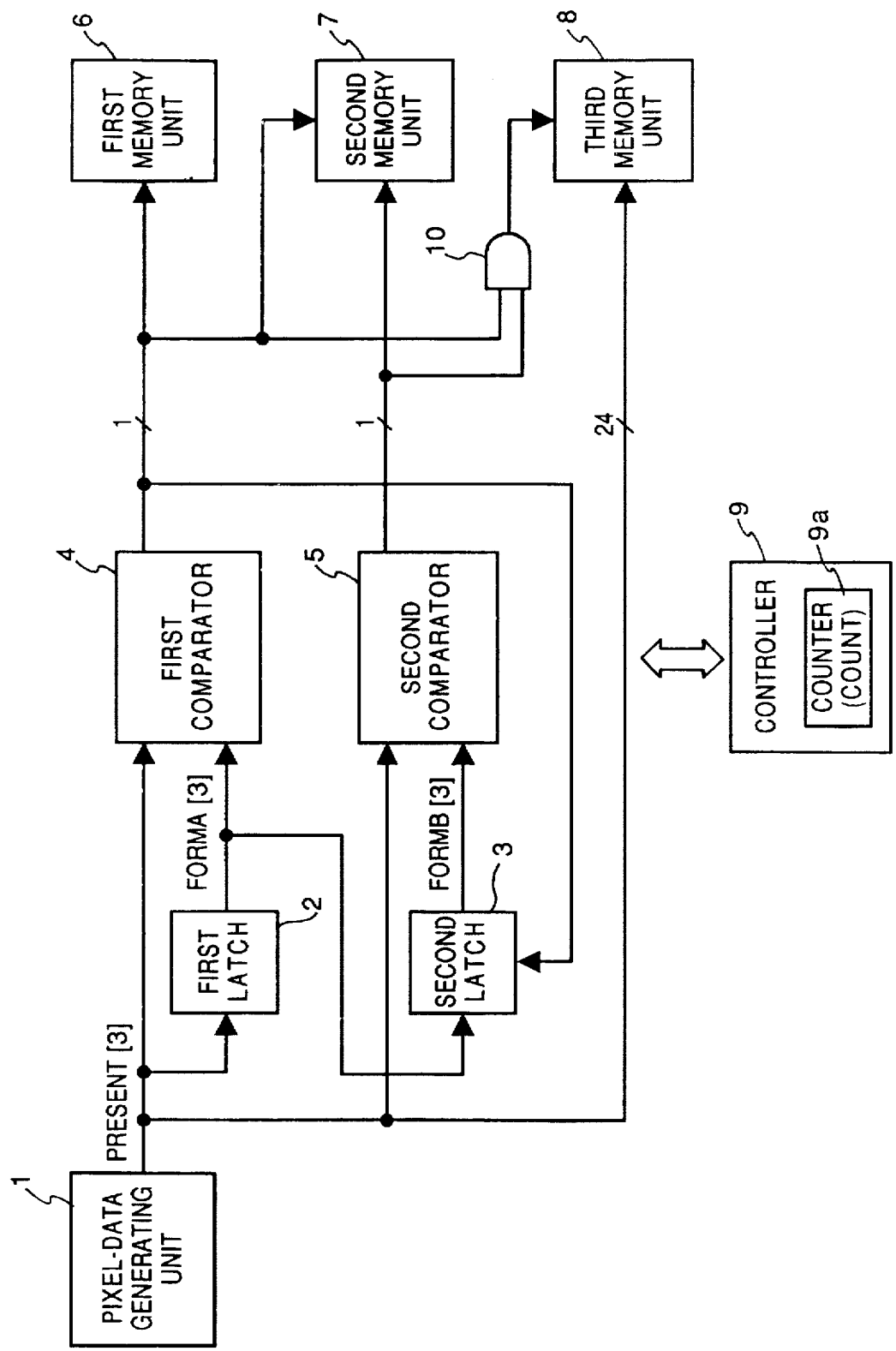
FIG. 1 is a block diagram illustrating the general configuration of a data compression apparatus according to a first embodiment of the present invention.

FIG. 1 is a block diagram showing the functional configuration of a data compression apparatus according to the first embodiment. As shown in FIG. 1, the apparatus includes a pixel-data generator 1 that generates pixel data of 24 bits per pixel in an NTSC-RGB format, a first latch 2 for latching the pixel data outputted by the pixel-data generator 1, a second latch 3 for latching the pixel data outputted by the first latch 2, a first comparator 4 for comparing the pixel data outputted by the pixel-data generator 1 and the pixel data latched in the first latch 2 and outputting "0" when the two items of compared data are equal and "1" when the two items of compared data are different, a second comparator 5 for comparing the pixel data outputted by the pixel-data generator 1 and the pixel data latched in the second latch 3 and outputting "0" when the two items of compared data are equal and "1" when the two items of compared data are different, a first memory unit 6 equipped with a memory having a depth of one bit for storing the results of comparison performed by the first comparator 4, a second memory unit 7 equipped with a memory having a depth of one bit for storing the results of comparison performed by the second comparator 4, a third memory unit 8 equipped with a memory having a depth of 24 bits for storing the pixel data outputted by the pixel-data generator, and a controller 9 for controlling the operation timing of each of the components mentioned above, controlling the write addresses of each of the memory units and setting initial values in the latch units. The controller 9 has a counter 9a for counting the number of processed pixels.

The operation of the data compression apparatus constructed as set forth above will now be described with reference to the flowcharts of FIGS. 2 and 3.

Figure 2:
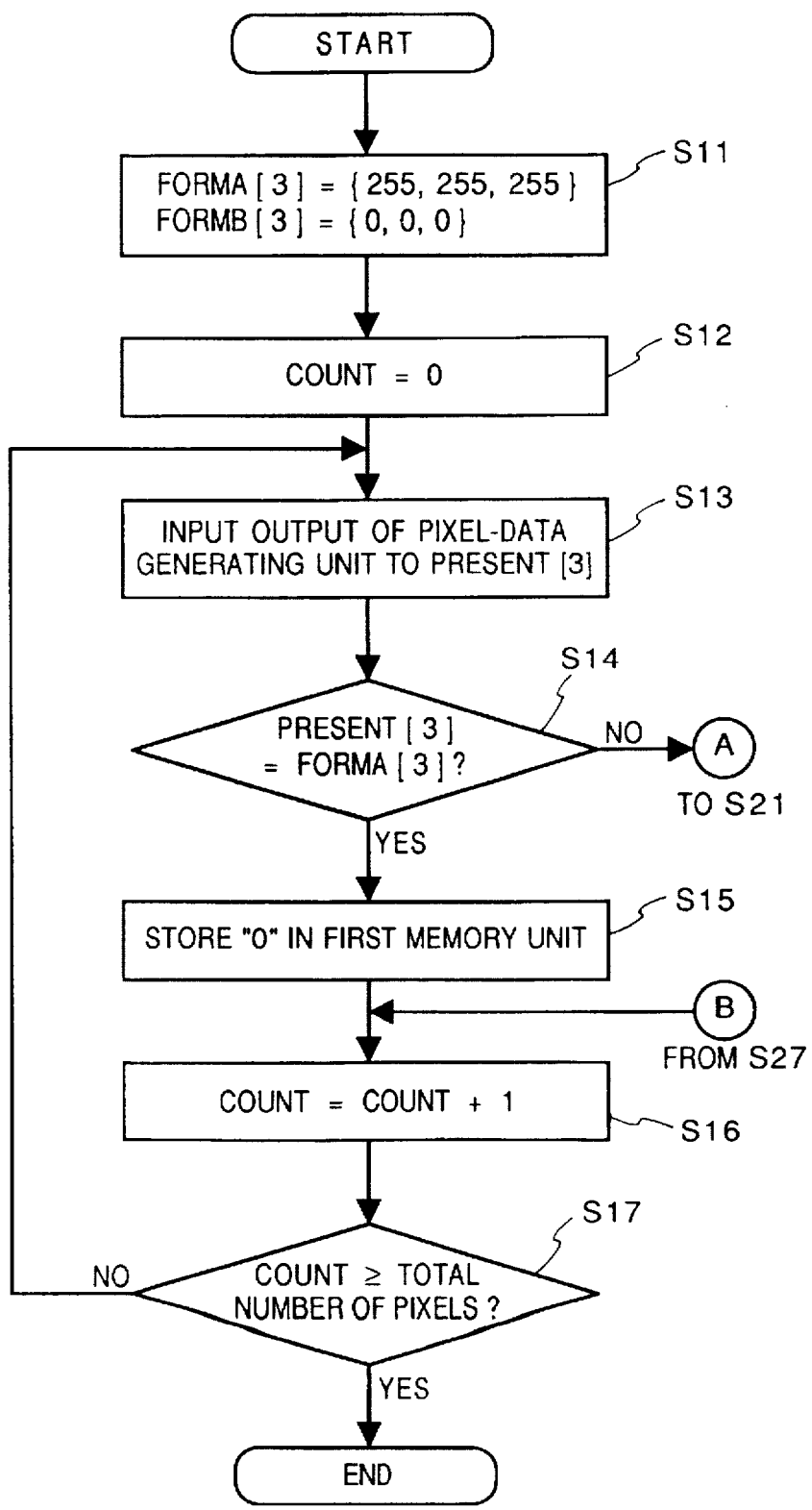
FIG. 2 is a flowchart illustrating the processing procedure of the data compression apparatus according to a first embodiment.
Figure 3:
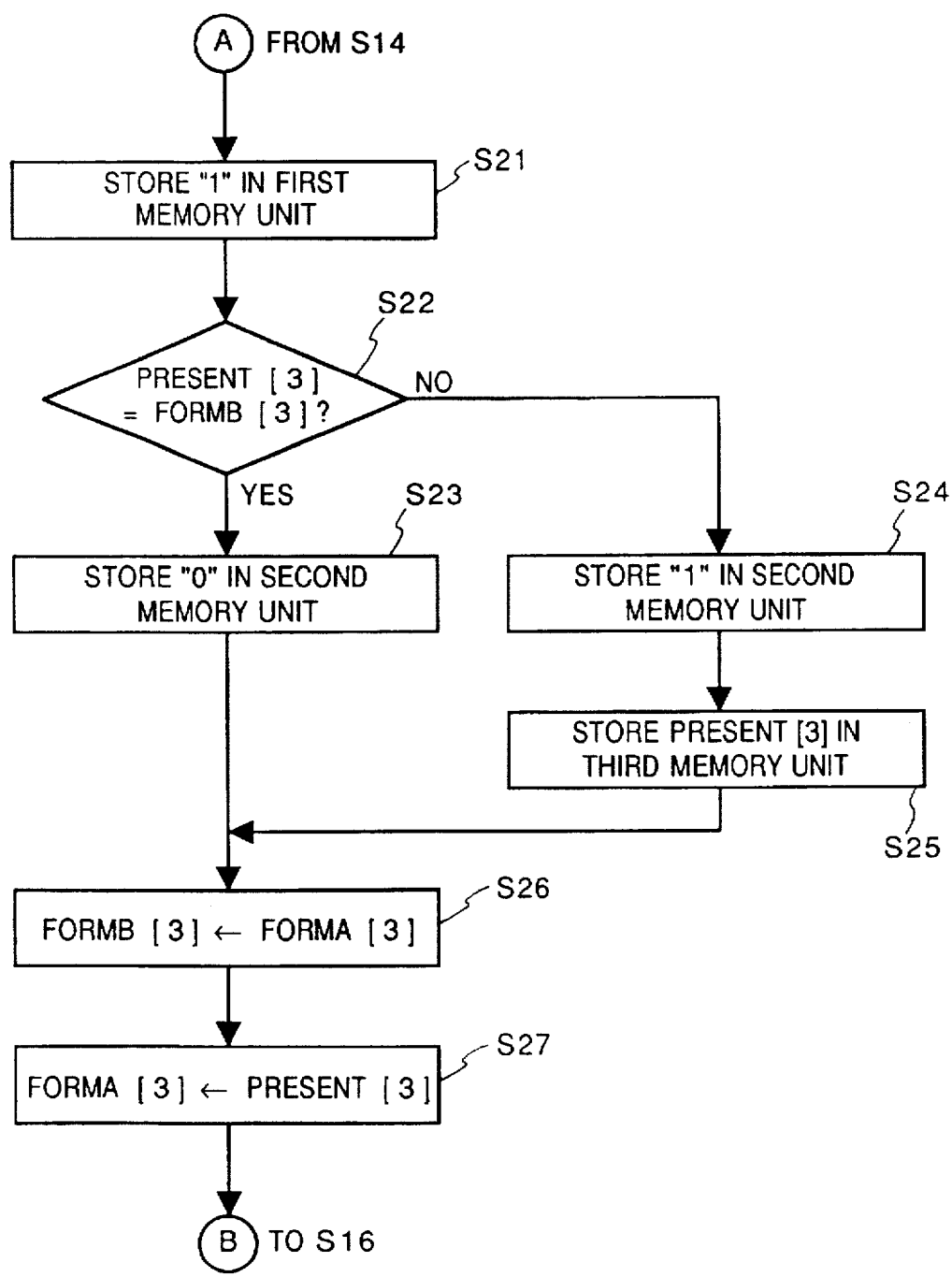
FIG. 3 is a flowchart illustrating the processing procedure of the data compression apparatus according to a first embodiment.

FIGS. 2 and 3 are flowcharts illustrating the processing procedure executed by the data compression apparatus according to the first embodiment. In the description that follows, color data latched by the first latch 2 is represented by FORMA [3], and the color data latched by the second latch 3 is represented by FORMB [3]. Further, the pixel data presently being outputted by the pixel-data generator 1 is represented by PRESENT [3]. The items of data FORMA [3], FORMB [3] and PRESENT [3] are data in the NTSC-RGB format. These items of data possess a 1×3 array structure having R, G, B data. Further, the value of the count in the counter 9a is represented by COUNT.

The initial settings of the first latch 2 and second latch 3 are performed at step S11. That is, FORMA [3] and FORMB [3] are set to initial values. In the data compression apparatus of this embodiment, FORMA [3], FORMB [3] are set to initial values of {255,255,255} (white) and {0,0,0} (black), respectively, based on the supposition that an ordinary image is composed of a large amount of black on a white background. Next, at step S12, the value (COUNT) in counter 9a, which counts the number of pixels that have been processed, is reset to zero. This is followed by step S13, at which pixel data (PRESENT [3]) is entered from the pixel-data generating unit 1. The first comparator 4 compares PRESENT [3] and FORMA [3] at step S14. The program proceeds to step S15 if the result of comparison is that PRESENT [3] and FORMA [3] are equal and to step S21 in FIG. 3 if the result of comparison is that these are unequal.

Step S15 calls for "0", namely the result of comparison performed by the first comparator 4, to be stored in the first memory unit 6. Then, at step S16, COUNT is incremented and it is determined at step S17 whether the processing of all pixels has ended. More specifically, if COUNT is equal to or greater than the total number of pixels, it is judged that the processing of all pixels has ended and data compression processing is terminated. If COUNT is less than the total number of pixels, this means that some pixel data has not yet been processed and, hence, the program returns to step S13 so that the foregoing processing is repeated.

Processing in the case where PRESENT [3]≠FORMA [3] holds will now be described with reference to the flowchart of FIG. 3.

At step S21 in FIG. 3, "1", which is the result of comparison performed by the first comparator 4, is stored in the first memory unit 6. The second comparator 5 compares PRESENT [3] and FORMB [3] at step S22. The program proceeds to step S23 if the result of comparison is that PRESENT [3]=FORMB [3] holds and to step S24 in FIG. 3 if the result of comparison is that PRESENT [3]≠FORMB [3] holds.

At step S23, "0", which is the result of comparison performed by the second comparator 5, is stored in the second memory unit 7, after which the program proceeds to step S26.

At step S24, "1", which is the result of comparison performed by the second comparator 5, is stored in the second memory unit 7. Then, at step S25, PRESENT [3], which is the output value of the pixel-data generating unit 1, is stored in the third memory 8.

FORMA [3] is substituted for FORMB [3] at step S26, and PRESENT [3], which is outputted by the pixel-data generating unit 1, is substituted for FORMA [3]. In the foregoing processing, the contents of FORMB [3] and FORMA [3] are interchanged. To describe this in terms of FIG. 1, the output of the first latch 2 is latched by the second latch 3 (step S26), then the output of the pixel-data generating unit 1 is latched by the first latch 2 (step S27). The program then proceeds to step S16 (FIG. 2), where the above-described processing is executed.

The operation of this data compression apparatus will be described in further detail by discussing a specific example.

Figure 4:
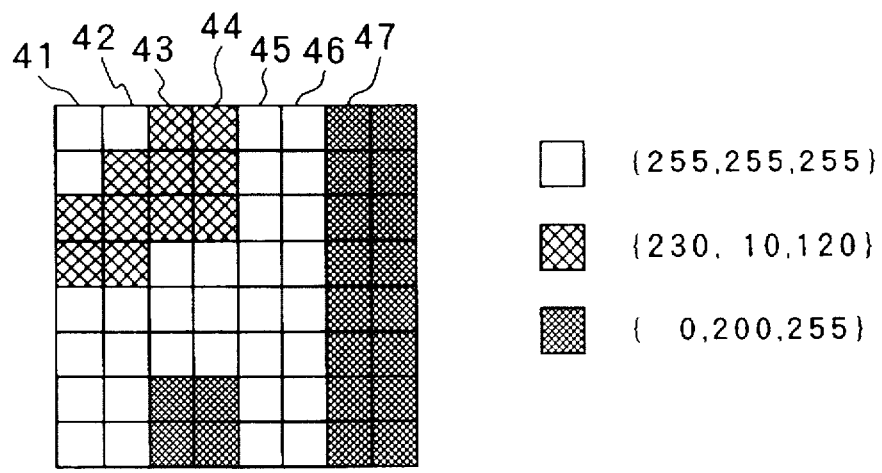
FIG. 4 is a diagram showing one example of image data.

FIG. 4 is an example of NTSC-RGB data to undergo data compression processing. On a first scanning line, pixels 41, 42, 45 and 46 are pixels having data {R,G,B}={255,255, 255}. Similarly, pixels 43, 44 are pixels having data {230, 10,120}, and pixel 47 is a pixel having data {0,200,255}.

Figure 5:
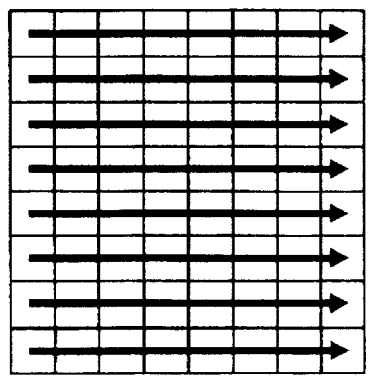
FIG. 5 is a diagram showing the order of pixels that undergo data compression processing.

FIG. 5 is a diagram showing the order of processing of pixels by the data compression apparatus of this embodiment. As shown in FIG. 5, the processing of pixel data is executed in accordance with the order of raster scanning.

FIG. 9 illustrates the states of PRESENT [3], FORMA [3], FORMB [3], COUNT, the output to the first memory unit 6, the output to the second memory unit 7 and the output to the third memory unit 8 in the data compression processing of this embodiment. It should be noted that FIG. 9 illustrates the states of the various data that prevail at the moment the processing of each pixel ends, namely the moment at which step S16 ends.

First, FORMA [3], FORMB [3] and COUNT are set to initial values (steps S11, S12 in FIG. 2). Next, PRESENT [3] is entered from the pixel-data generating unit 1 (step S13). Since the pixel data of pixel 41 is outputted by the pixel-data generating unit 1, initially PRESENT [3] is equal to {255, 255,255}. Next, the first comparator 14 compares PRESENT [3] and FORMA [3] (step S14). Here PRESENT [3] and FORMA [3] both have the data {255,255,255} so that PRESENT [3] and FORMA [3] are equal. Accordingly, the program proceeds to step S15, at which the first comparator 4 delivers "0" as its output. This "0" logic is stored in the first memory unit 6 (step S15). Since this ends the processing for pixel 41, COUNT is incremented (step S16), whereupon the condition COUNT=1 is established. Since the processing of all pixels is not yet finished, the program proceeds to step S13 (step S17).

Since the next pixel 42 also is {255,255,255}, processing similar to that for pixel 41 is executed so that the status of the logic stored in the first memory 6 now becomes "00".

Since the next pixel 43 is different from the preceding pixel, the processing procedure changes. Now PRESENT |3|, which is outputted by the pixel-data generating unit 1, has data {230,10,120} (step S13). Since FORMA |3| is {255,255,255}, PRESENT |3| and FORMA |3| differ in value and the output "1" of the first comparator 4 is stored in the first memory unit 6 (steps S14, S21).

Furthermore, since PRESENT |3| differs also from FORMB |3|, which is equal to {0,0,0}, the output "1" of the second comparator 5 is stored in the second memory unit 7 (steps S22, S24). In addition, PRESENT |3| (24 bits) outputted by the pixel-data generating unit 1 is stored in the third memory unit 8 (step S25). The data in each of the memory units 6-8 at this point in time is as follows:

first memory unit 6: (001)

second memory unit 7: (1)

third memory unit 8: (111001100000101001111000)

Next, the data of FORMB |3| is updated to the data of FORMA |3|, and the data of FORMA |3| is updated to the data of PRESENT |3|. More specifically, first the data of FORMA |3| is stored in FORMB |3| (step S26), then the data of PRESENT |3| is stored in FORMA |3| (step S27). Accordingly, at this time we have FORMB |3|={255,255,255}, FORMA |3|={230,10,120}. Since the processing of all pixels is not yet complete after COUNT is incremented, the program returns to step S13 (steps S16, S17).

The next pixel 44 is the same as pixel 43, and therefore PRESENT |3| and FORMA |3| are equal, as a result of which the first comparator 4 delivers its output "0" to the first memory 6, where this logic value is stored.

Next, processing is executed with regard to the pixel 45. Owing to the pixel data outputted by the pixel-data generating unit 1, PRESENT |3| becomes {255,255,255} (step S13). Accordingly, PRESENT |3| differs from FORMA |3|, which is equal to {230,10,120}, and therefore the output "1" of the first comparator 4 is stored in the first memory unit 6 (steps S14, S21). Next, since PRESENT |3| and FORMB |3| are equal, the output "0" of the second comparator 5 is delivered to the second memory unit 7 (steps S22, S23).

Next, processing is executed for updating the data of FORMA |3| to the data of PRESENT |3|, just as in the case of pixel 43, so that FORMB |3|={230,10,120} and FORMA |3|={255,255,255} are established (steps S26, S27). When COUNT is incremented, the processing of the present five pixels ends and therefore COUNT=5 is attained. Since the processing of all pixels is still unfinished, the program returns to step S13 (steps S16, S17). The data in the memory units 6-8 at this time is as follows:

first memory unit 6: (0010101)

second memory unit 7: (101)

third memory unit 8: (111001100000101001111000)

Since pixel 46 has data the same as that of pixel 45, PRESENT |3| and FORMA |3| are equal, and the output "0" of the first comparator 4 is stored in the first memory 6.

The processing of the next pixel 47 is executed in the same manner as that of the pixel 43 described earlier, and the outputs to the memory units 6, 7, 8 with regard to this pixel are "1", "1" and "00000000(R)11001000(G)11111111(B)", respectively. The states of memories 6-8 at this time are as follows:

first memory unit 6: (0010101)

second memory unit 7: (101)

third memory unit 8: (111001100000101001111000 00000000110010001111111)

When the foregoing processing is repeated, the pixel data at the end of processing of all pixels in FIG. 4 will be composed of 329 bits. Since the original image data is composed of 8×8 pixels×3 colors×8 bits=1536 bits, this means that the data is compressed to about 1/4.7.

<Data Decompression Apparatus>

Described next will be a data decompression apparatus in which the data compressed by the data compression apparatus described above is restored to the original image data.

Figure 6:
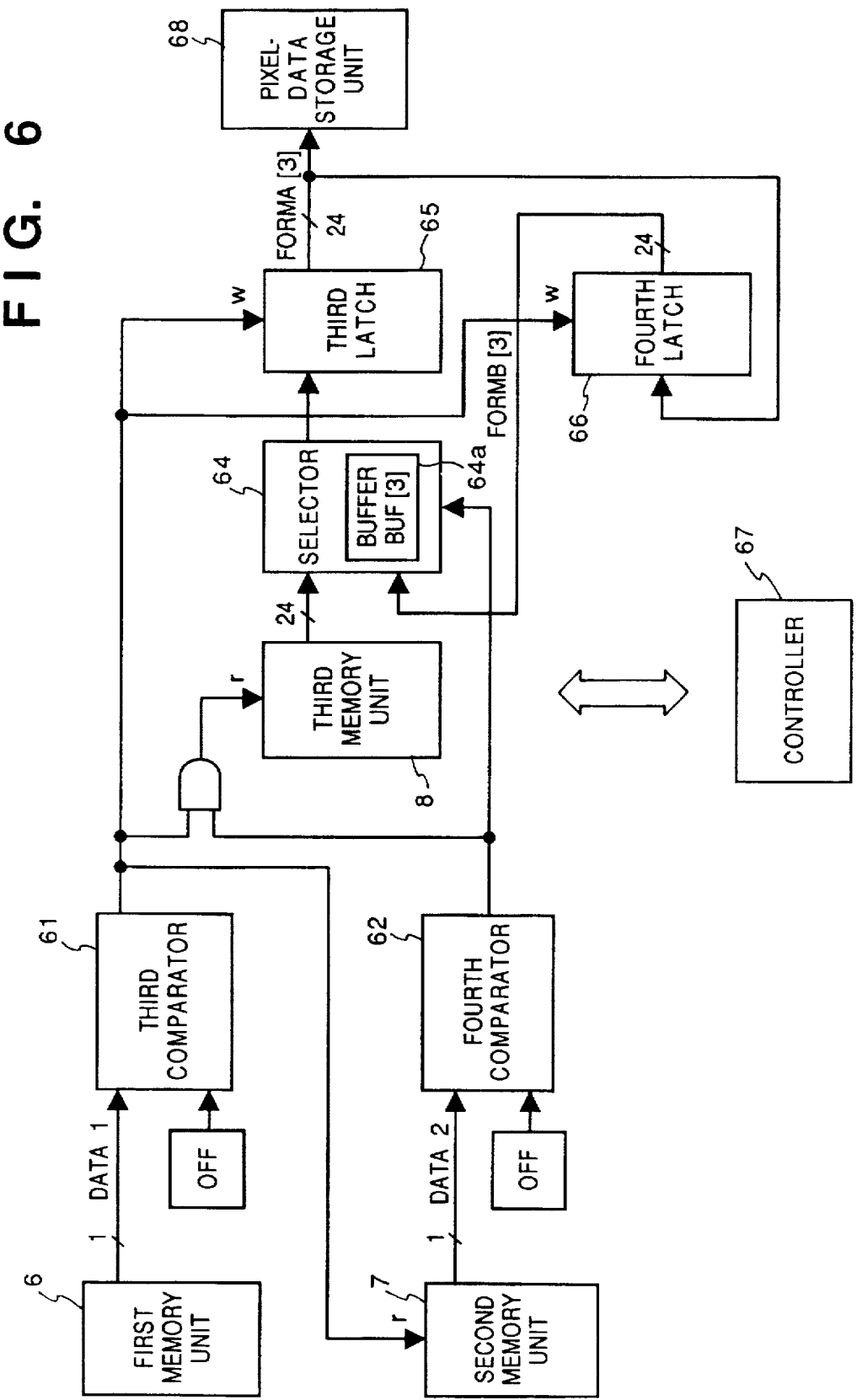
FIG. 6 is a block diagram illustrating the general configuration of a data decompression apparatus according to a first embodiment of the present invention.

FIG. 6 is a block diagram illustrating the functional configuration of a data decompression apparatus according to the first embodiment of the invention. Elements in FIG. 6 having functions similar to those of the elements in FIG. 1 are designated by like reference numerals and need not be described again. The arrangement of FIG. 6 includes a third comparator 61 for comparing the one-bit data read out of the first memory unit 6 with "0" (OFF) and delivering "0" when the two compared items of data are equal and "1" when the two items of data are not equal, and a fourth comparator 62 for comparing the one-bit data read out of the second memory unit 7 with "0" (OFF) and delivering "0" when the two compared items of data are equal and "1" when the two items of data are not equal.

A selector 64 selects and delivers the data output of either the third memory unit 8 or a fourth latch 66 and holds this data output in a buffer 64a. A third latch 65 latches the output data from the selector 64 and delivers it to a pixel-data storage unit 68. The fourth latch 66 is for latching the output data of the third latch 65.

A controller 67 controls the operating timing of each of these elements as well as the addressing of each of the memories. The pixel-data storage unit 68 stores the pixel data generated by data decompression processing.

The operation of the data decompression apparatus constructed as set forth above will now be described with reference to the flowcharts of FIGS. 7 and 8.

Figure 7:
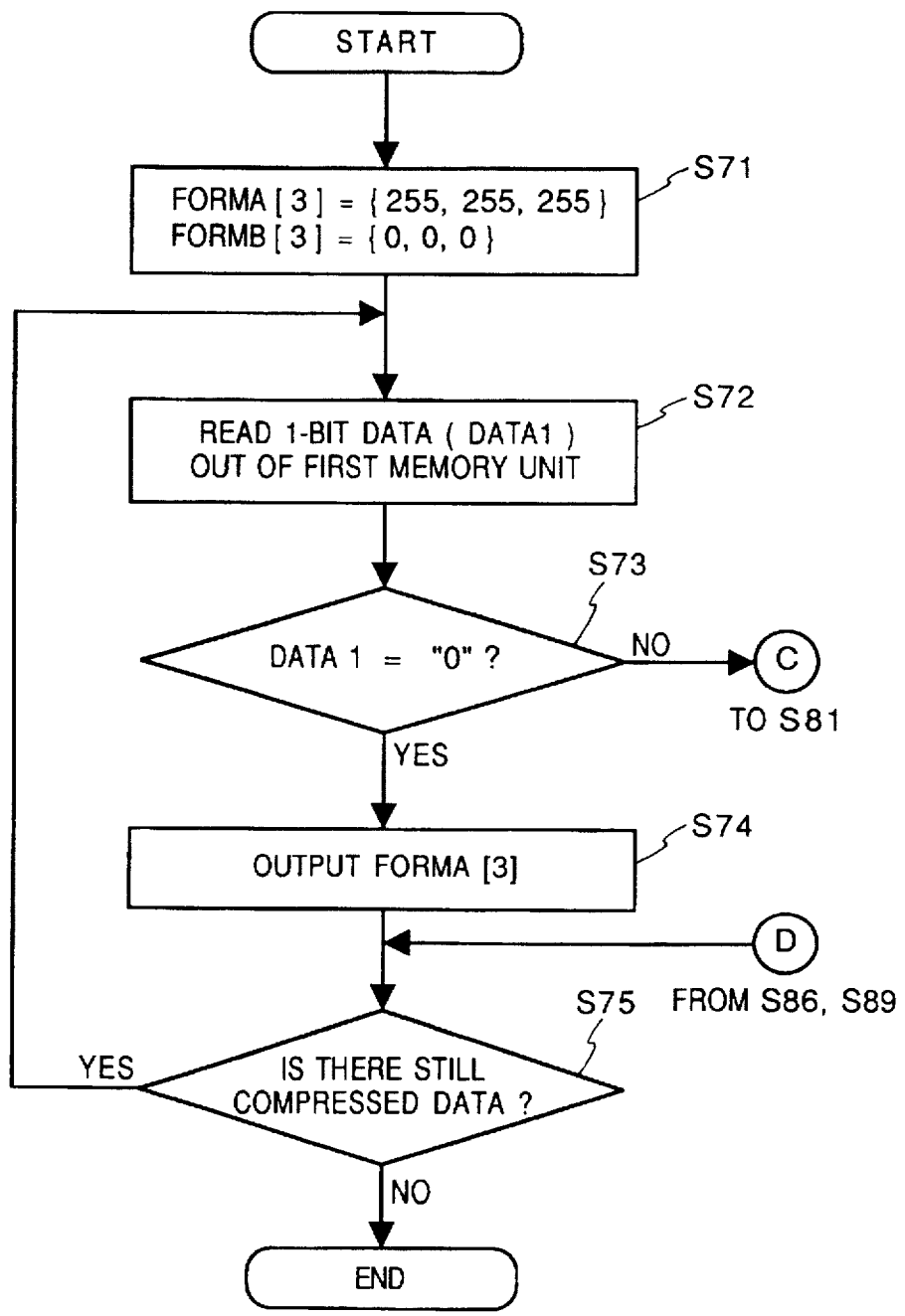
FIG. 7 is a flowchart illustrating the processing procedure of the data decompression apparatus according to a first embodiment.
Figure 8:
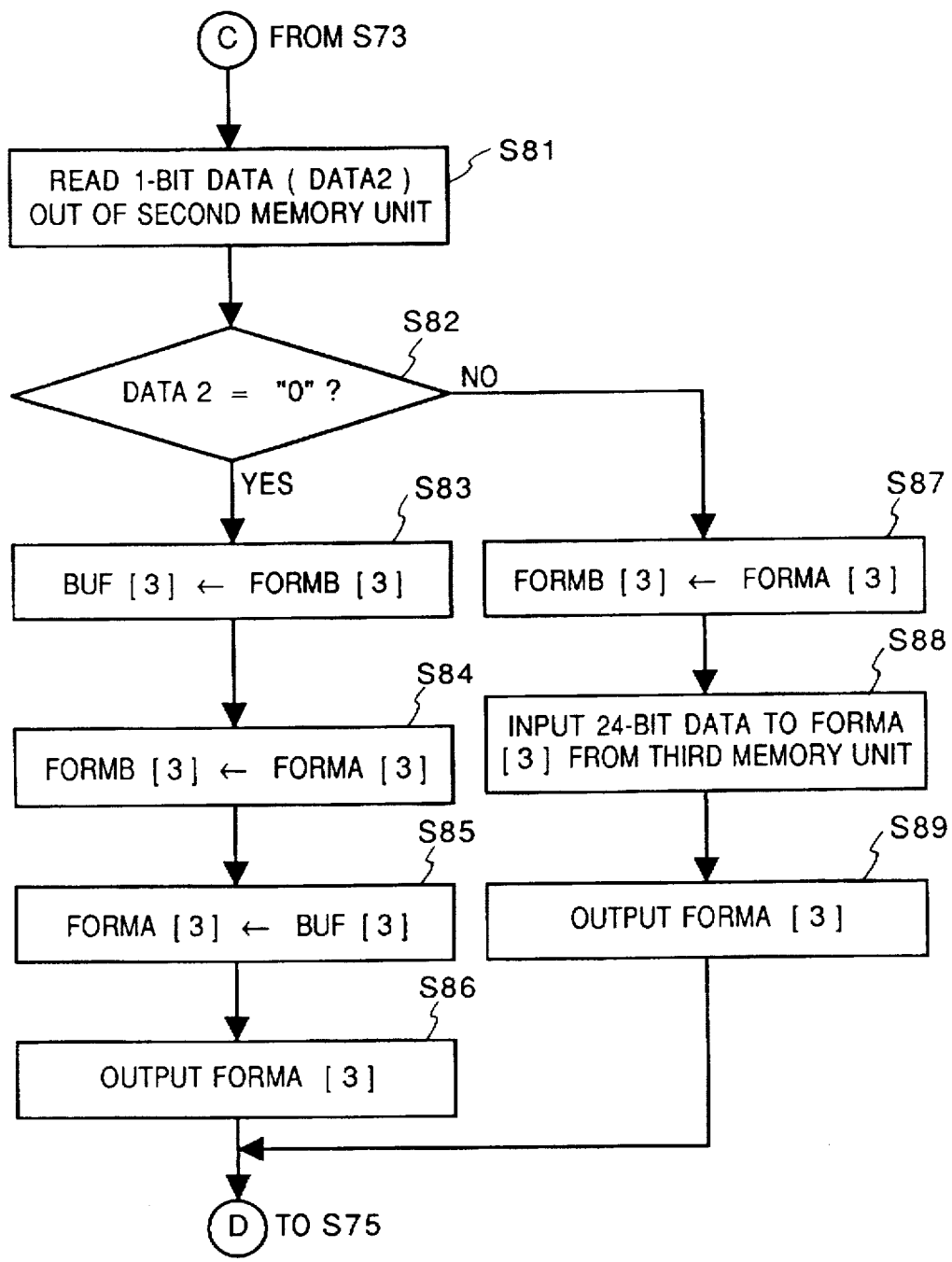
FIG. 8 is a flowchart illustrating the processing procedure of the data decompression apparatus according to a first embodiment.

FIGS. 7 and 8 are flowcharts illustrating the processing procedure executed by the data decompression apparatus of the first embodiment. In the description that follows, FORMA |3| represents the data latched by the third latch 65, and FORMB |3| represents the data latched by the fourth latch 66. Further, let DATA1 and DATA2 represent the one-bit data read out of the first and second memory units 6 and 7, respectively.

The third latch 65 and fourth latch 66 are initialized at step S71, as a result of which FORMA |3| and FORMB |3| are set to initial values. It is required that these initial values be made the same as those at the time of compression. In this embodiment, therefore, we have FORMA |3|={255,255,255}, FORMB |3|={0,0,0}. The one-bit data is read out of the first memory unit 6 and this data is made DATA1 at step S72. This is followed by step S73, at which it is judged by the third comparator 61 whether the DATA1 is "0" or not. If the result of comparison is that DATA1=0 holds, then the program proceeds to step S74. When DATA1≠0 holds, the program proceeds to step S81 in FIG. 8.

At step S74, FORMA |3| is stored in the pixel-data storage unit 68 as the pixel of this position. This is followed by step S75, at which it is determined whether compressed data still remains. If such data still remains, the program proceeds to step S72 and the foregoing processing is repeated. If there is no compressed data left, the present data decompression processing is terminated.

Processing for the case in which DATA1=1 holds will be described with reference to the flowchart of FIG. 8. The fact that the value of DATA1=1 means that the data of the pixel at this position has a value different from that of the data of the preceding pixel. At step S81 in FIG. 8, the one-bit data is read out of the second memory 7 and this data is treated as DATA2. Next, at step S82, the fourth comparator 62 performs a comparison to determine whether DATA2=0 holds. The program proceeds to step S83 when DATA2=0 holds and to step S87 when DATA2≠0 holds.

The fact that DATA2=0 holds means that the pixel data at this position is the same as the pixel data of FORMB |3|. Accordingly, the data of FORMB |3| is stored in the pixel-data storage unit 68. First, after the items of data FORMA |3| and FORMB |3| are interchanged at steps S83, S84, S85, FORMA |3| is outputted at step S86. The program then proceeds to step S75.

The processing operation of steps S83 to S86 will be described with reference to the block diagram of FIG. 6. Upon receiving the output "0" from the fourth comparator 62, the selector 64 holds the output (FORMB |3|) from the fourth latch 66 in the buffer 64a (BUF |3|). Next, in order to interchange the data, the output data of the third latch 65 is latched in the fourth latch 66 to update FORMB |3|, the data being held in the buffer 64a of the selector 64 is latched in the third latch 65 to update FORMA |3| and the data FORMA [3] that has been latched in the third latch 65 is stored in the pixel-data storage unit 68. Thus, FORMB [3] that prevailed prior to updating is outputted as the pixel data and the interchange of the data of FORMA [3] and FORMB [3] is executed.

In a case where DATA2=1 holds, this means that the pixel data at this position possesses new pixel data that is neither FORMA |3| nor FORMB [3]. Accordingly, the new pixel data is read out of the third memory 6 and stored in the pixel-data storage unit 68, and the updating of the data of FORMA [3] and FORMB [3] is executed. First, at step S87, the value of FORMA |3| is substituted for FORMB |3|. Next, at step S88, eight bits of data for each of the colors R, G, B, for a total of 24 bits of data, are read out of the third memory 8 and substituted for FORMA [3]. By outputting FORMA [3] at step S89, the pixel data extracted from the third memory 8 is outputted as the pixel data of this position. The program then proceeds to step S75.

The processing operation of steps S87 to S89 will be described with reference to the block diagram of FIG. 6. Since DATA1=DATA2=1 holds, the outputs of the third comparator 61 and fourth comparator 62 both become "1" and new pixel data (24 bits) is outputted from the third memory 8. At this time the output "1" from the fourth comparator 62 is received and the selector 64 selects and outputs the pixel data outputted by the third memory 8. The output data of the third latch 65 is latched in the fourth latch 66, whereby FORMB [3] is updated to FORMA |3|. Thereafter, the output data of the selector 64 is latched in the third latch 65, whereby FORMA |3| is updated.

An actual example in which compressed data is decompressed will be described in accordance with the foregoing flowcharts. The data in each of the memory units indicated below is data obtained as a result of applying compression processing to the image data, which is illustrated in FIG. 4, in the data compression apparatus set forth above.

first memory unit 6: (0010101 . . .)

second memory unit 7: (101 . . .)

third memory unit 8: (111001100000101001111000 000000001100100011111111)

At the start, FORMA |3| and FORMB |3| are set to initial values (step 71). Next, the one-bit data (DATA1) is extracted from the first memory unit 6. Here, since DATA1=0 holds, it is understood that this pixel is equal to FORMA |3|; hence, {255,255,255} is outputted (steps S73, S74). Since the one-bit data (DATA1) read out of the first memory unit 6 next also is "0", {255,255,255} is outputted in similar fashion. Thus, the pixel data of pixels 41, 42 in FIG. 4 is stored in the pixel-data storage unit 68.

Next, since the data (DATA1) read out of the first memory unit 6 is "1", the one-bit data (DATA2) is read out of the second memory unit 7 (steps S72, S73, S81). Here, since DATA2=1 holds, FORMA |3| is substituted for FORMB |3| and the relation FORMB |3|={255,255,255} is established (steps S82, S87). The 24-bit data is then read out of the third memory unit 7 and substituted for FORMA |3| (step S88). Since the data that has been read out of the third memory unit 8 is {230,10,120}, FORMA |3|={230,10,120} is established and FORMA |3| is outputted as the data at this position (step S89). Since data remains in the first memory unit 6, the program returns to step S72. Thus, the pixel data {230,10,120} is stored in the pixel-data storage unit 68.

The next item of one-bit data of the first memory unit 6 is substituted for DATA1 (step S72). When this is done, the pixel at this position is equal to FORMA |3| since DATA1 is "0". Accordingly, FORMA |3|={230,10,120} is outputted as the pixel data (step S74). Since there is still unprocessed data in the first memory unit 6, the program returns to step S72. At this point in time, the data will have been reconstituted up to the pixel data of pixel 44.

When the next item of one-bit data (DATA1) is read out of the first memory unit 6, the relation DATA1=1 is established and therefore the pixel at this position differs from FORMA |3| (steps S72, 73). Accordingly, the one-bit data (DATA2) of the second memory unit 7 is read out (step S81). Since DATA2=0holds, the pixel at this position is equal to FORMB [3]. As a result, FORMB [3]={255,255,255} is outputted as the pixel data. In actuality, first FORMA [3] and FORMB |3| are interchanged (steps S83 to S85) and the relations FORMA |3|={255,255,255}, FORMB |3|={230, 10,120} are established. By outputting FORMA |3| to the pixel-data storage unit 68, FORMB [3] that prevailed prior to updating is stored in the pixel-data storage unit 68 as the pixel data of pixel 45.

When the above-described decompression processing is executed for all of the compressed data, the RGB data of FIG. 4 can be restored without being changed in any manner.

When a 16×16 RGB image shown in FIG. 26 is processed by the data compression apparatus described above, the data after processing becomes data of 354 bits. This means that data is compressed to 1/17.4 with respect to the original data. If the same image data were to be compressed using the ADCT compression method mentioned earlier in the description of the prior art, the compression ratio would be 1/7.7. Accordingly, the data compression method of this embodiment surpasses the ADCT compression method in terms of compression ratio. Furthermore, whereas the ADCT method is such that the image after decompression is inferior to the original image, the compression/decompression method according to this embodiment is a reversible compression method and, hence, there is no decline in image quality.

Thus, as described above, the apparatus for compressing/ decompressing the image data according to the first embodiment employs a reversible compression method and is characterized by having a high compression ratio as well. In particular, the invention exhibits outstanding effects when applied to images, such as computed-produced images, in which pixels having identical data are contiguous in one region.

[Second Embodiment]

In the first embodiment set forth above, the memory units are three separate units. However, these can be combined into a single memory. If the data of FIG. 4 were to be compressed with such an arrangement, the data after compression would be as follows:

001111100110000010100111100001001100000000011001 00011111111 . . .

If the above data following compression is correlated with the pixels of FIG. 4, the result is as follows:

pixel 41: 0 pixel 42: 0 pixel 43: 111110011000001010011111000 pixel 44: 0 pixel 45: 10 pixel 46: 0 pixel 47: 110000000011001000011111111

For example, in the data of pixel 43, the first bit corresponds to the data stored in the first memory unit, the second bit corresponds to the data stored in the second memory unit, and the ensuing 24 bits correspond to the data stored in the third memory.

The flowchart for compression in this case assumes that the first through third memory units of FIGS. 2 and 3 have been combined into a signal memory. Similarly, the flowchart for decompression in this case assumes that the first through third memory units of FIGS. 7 and 8 have been combined into a signal memory.

[Third Embodiment]

In the first embodiment described above, the amount of data stored in the second and third memory units changes depending upon the image subjected to compression processing. In particular, if the third memory unit does not have an adequate memory capacity, there is the danger that a situation may arise in which all of the compressed data cannot be stored. Accordingly, in a third embodiment, an image-data compression/decompression apparatus that stores pixel data whose bit length is changed in dependence upon the memory capacity of the third memory unit will be described.

<Data Compression Apparatus>

Figure 10:
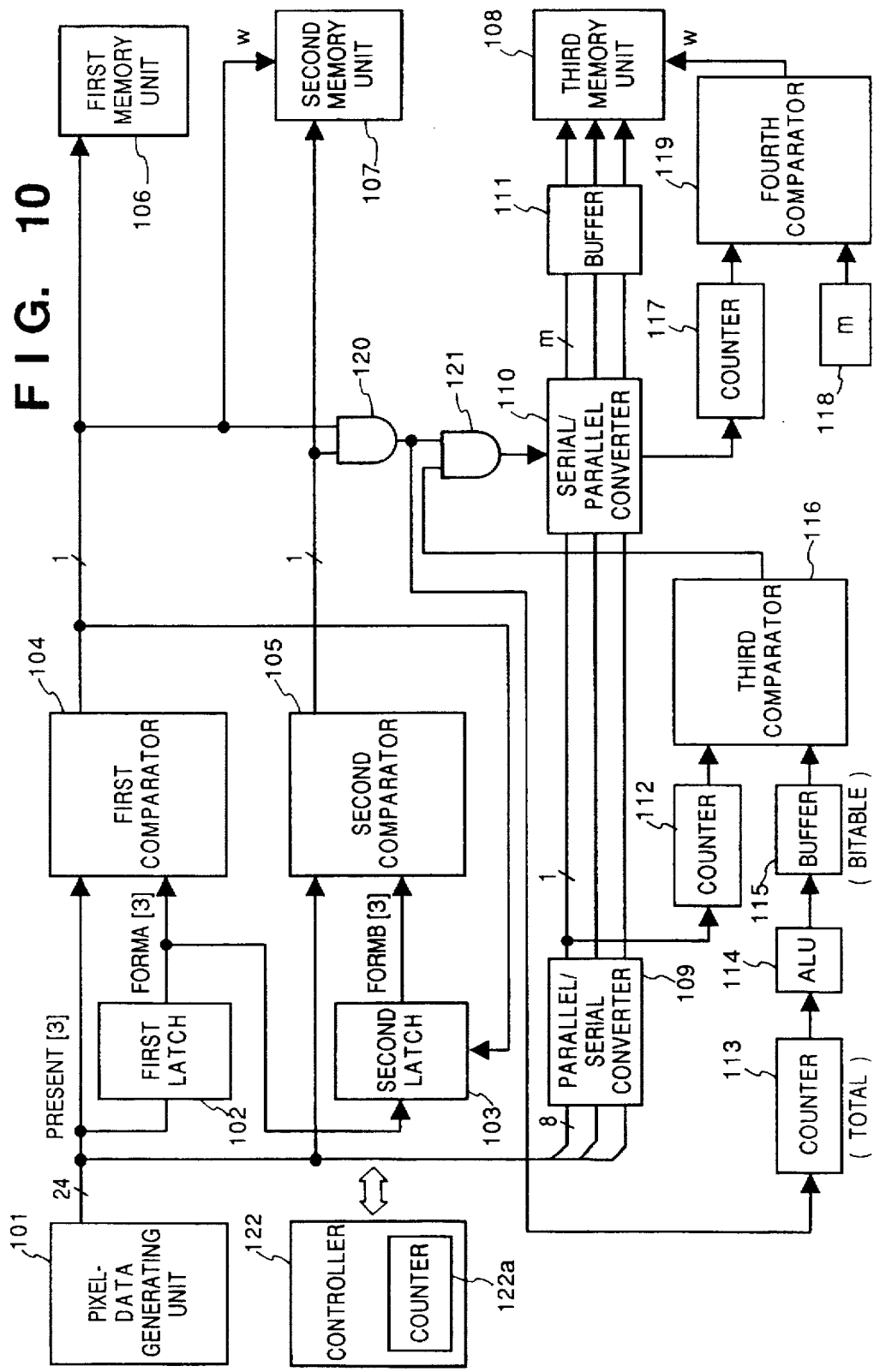
FIG. 10 is a block diagram illustrating the general configuration of a data compression apparatus according to a fourth embodiment of the present invention.

FIG. 10 is a block diagram showing the functional configuration of a data compression apparatus according to the third embodiment. In FIG. 10, reference numerals 101~108 correspond to the reference numerals 1~8 in the first embodiment and the elements designated by them need not be described again.

Numeral 109 denotes a parallel/serial converter for converting parallel data of 8 bits×3 colors (24 bits) outputted by the pixel-data generating unit 101 into serial data of each color. Numeral 110 denotes a serial/parallel converter for converting the serial data, which is outputted by the parallel/serial converter 109, into parallel data corresponding the bit depth possessed by the third memory unit 108. The parallel data obtained from the serial/parallel converter 110 is stored in the third memory 108 via a buffer 111.

Numeral 112 denotes a counter for counting the bits of the serial data outputted by the third memory unit 108. Numeral 113 denotes a counter for counting the number of times the outputs of the first comparator 104 and second comparator 105 become logical "1". On the basis of the value of the count in counter 113, an arithmetic and logic unit (ALU) 114 calculates the number of bits that the pixel data stored in the third memory unit 108 can attain. A buffer 115 holds the result of calculation performed by the ALU 114. A third comparator 116 outputs "1" when the value in buffer 115 is greater than the value in counter 112 and "0" in other cases.

Numeral 117 denotes a counter for counting the number of bits that have been converted into parallel data in the data that has entered the serial/parallel data converter 110 from the parallel/serial converter 109. Numeral 118 denotes a constant generator that has been set to the bit depth m of the third memory unit 108. A fourth comparator 119 compares the value of the count in counter 117 with the value from the constant generator 118 and outputs "1" when the two compared values are equal.

Numeral 122 denotes a controller for controlling the operating timing of each of the above-mentioned components as well as the write addresses of each of the memory units. The data compression operation described below is executed by control of operation timing of each of the components performed by the controller 122. Further, the controller 122 has a counter 122a for counting solely the pixels that have been processed.

The operation of the data compression apparatus constructed as set forth above will now be described with reference to the flowcharts of FIGS. 11 through 14. As in the first embodiment, let FORMA [3] represent the data latched by the first latch 102, FORMB [3] the data latched by the second latch 103 and PRESENT [3] the pixel data generated by the pixel-data generating unit 101. Further, let COUNT represent the value of the count in the counter 122a within the controller 122, and let TOTAL represent the value of the count in the counter 113.

The initial settings of the first latch 102 and third latch 103 are performed at step S101 so that FORMA [3] and FORMB [3] are set to initial values. In this embodiment, as in the case of the first embodiment, FORMA [3], FORMB [3] are set to initial values of {255,255,255} (white) and {0,0,0} (black), respectively, based on the supposition that an ordinary image is composed of a large amount of black on a white background. Next, at step S102, the value (COUNT) in counter 122a, which counts the number of pixels that have been processed, is set to zero. This is followed by step S103, at which the counter 113 is reset and the count TOTAL is set to zero.

At step S104, the pixel data is read out of the pixel-data generating unit 101 (PRESENT [3]). PRESENT [3] and FORMA [3] are compared at step S105. The program proceeds to step S106 if the two are equal and to step S111 in FIG. 12 if the result of comparison is that these are unequal.

PRESENT [3] and FORMB [3] are compared at step S111 and the program proceeds to step S113 if the two are equal. When the two are found to be unequal at step S111, the program proceeds to step S112, at which TOTAL is incremented. This is executed by having the counter 113 count the output "1" from an AND gate 121.

The data of FORMA [3] is substituted for FORMB [3] at step S113, and then the value of PRESENT [3] is substituted for FORMA [3] at step S114. Processing then shifts to step S106 in FIG. 11.

Figure 11:
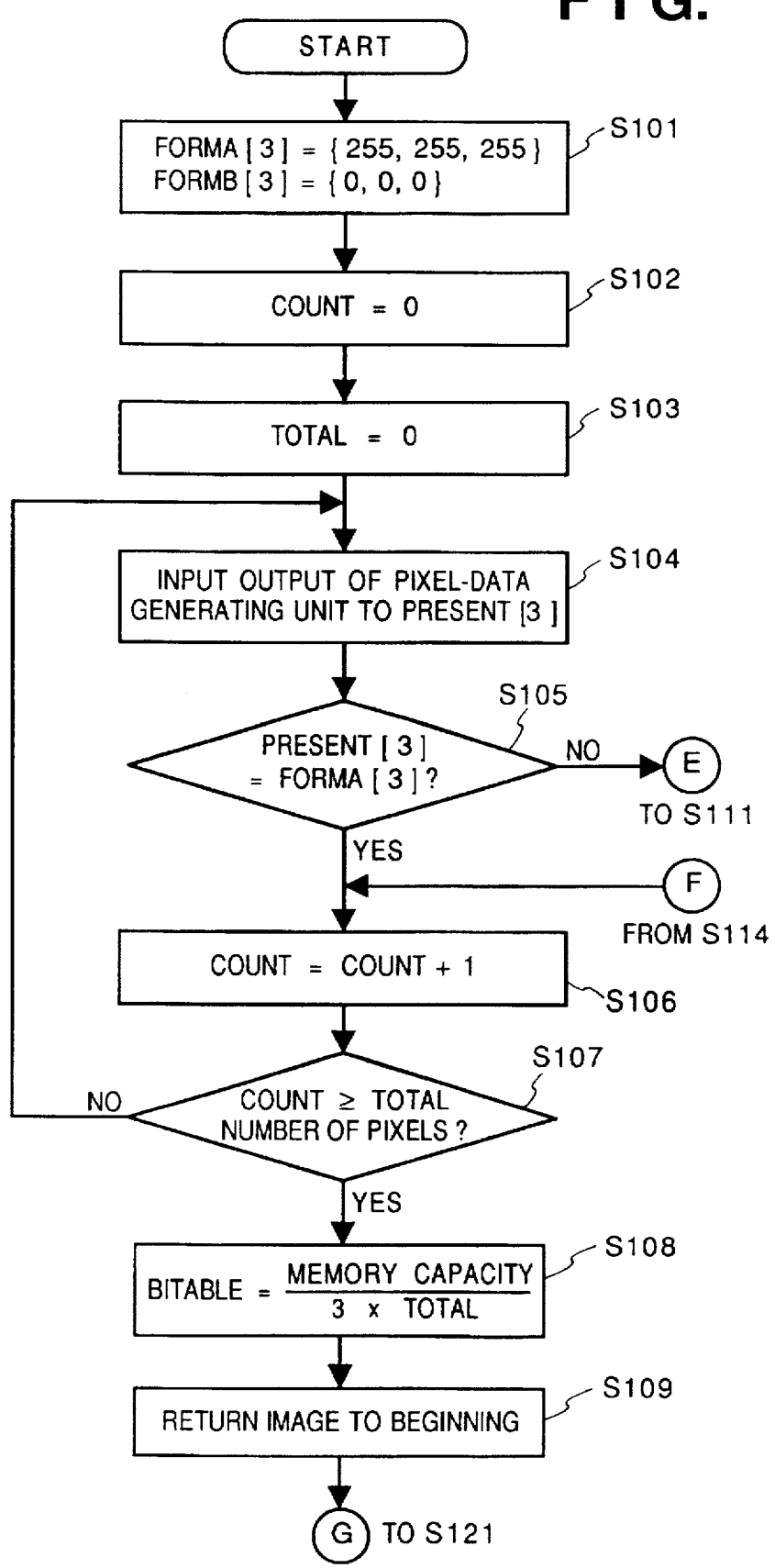
FIG. 11 is a flowchart illustrating the processing procedure of the data compression apparatus according to the second embodiment.
Figure 12:
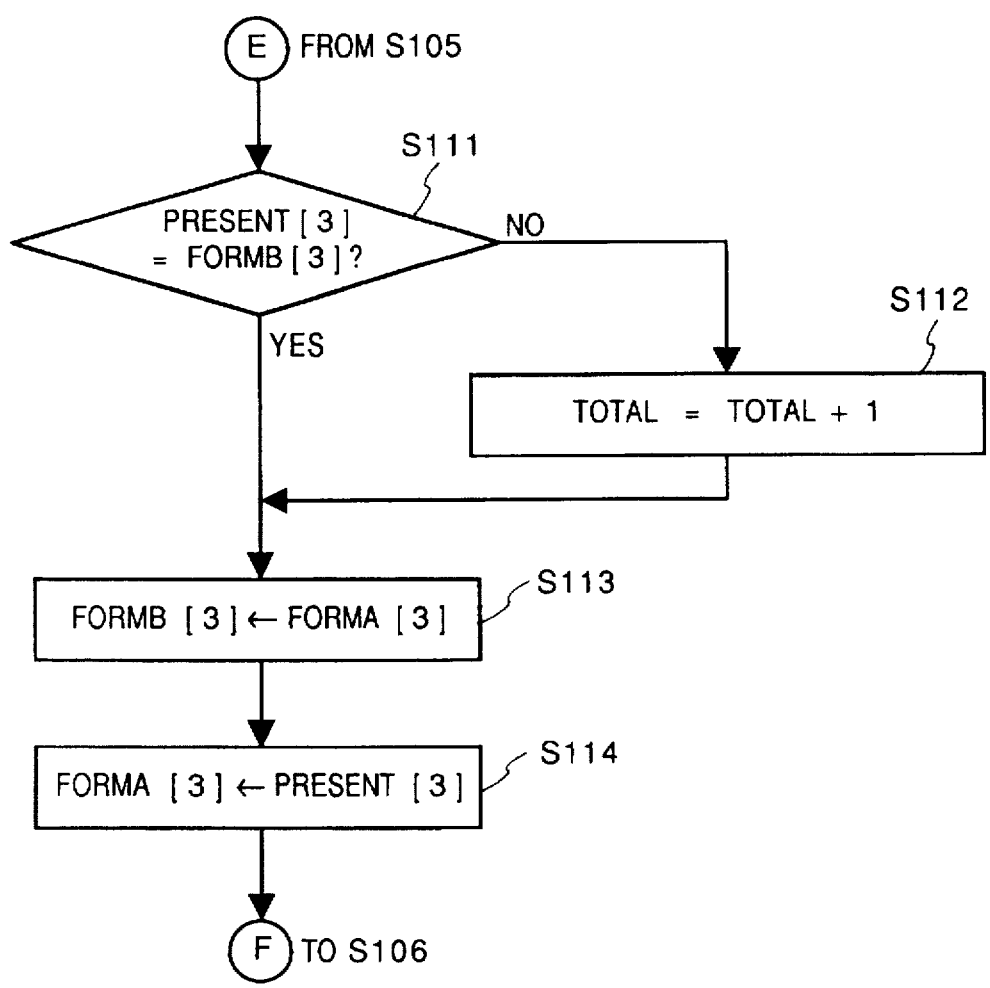
FIG. 12 is a flowchart illustrating the processing procedure of the data compression apparatus according to the fourth embodiment.
Figure 13:
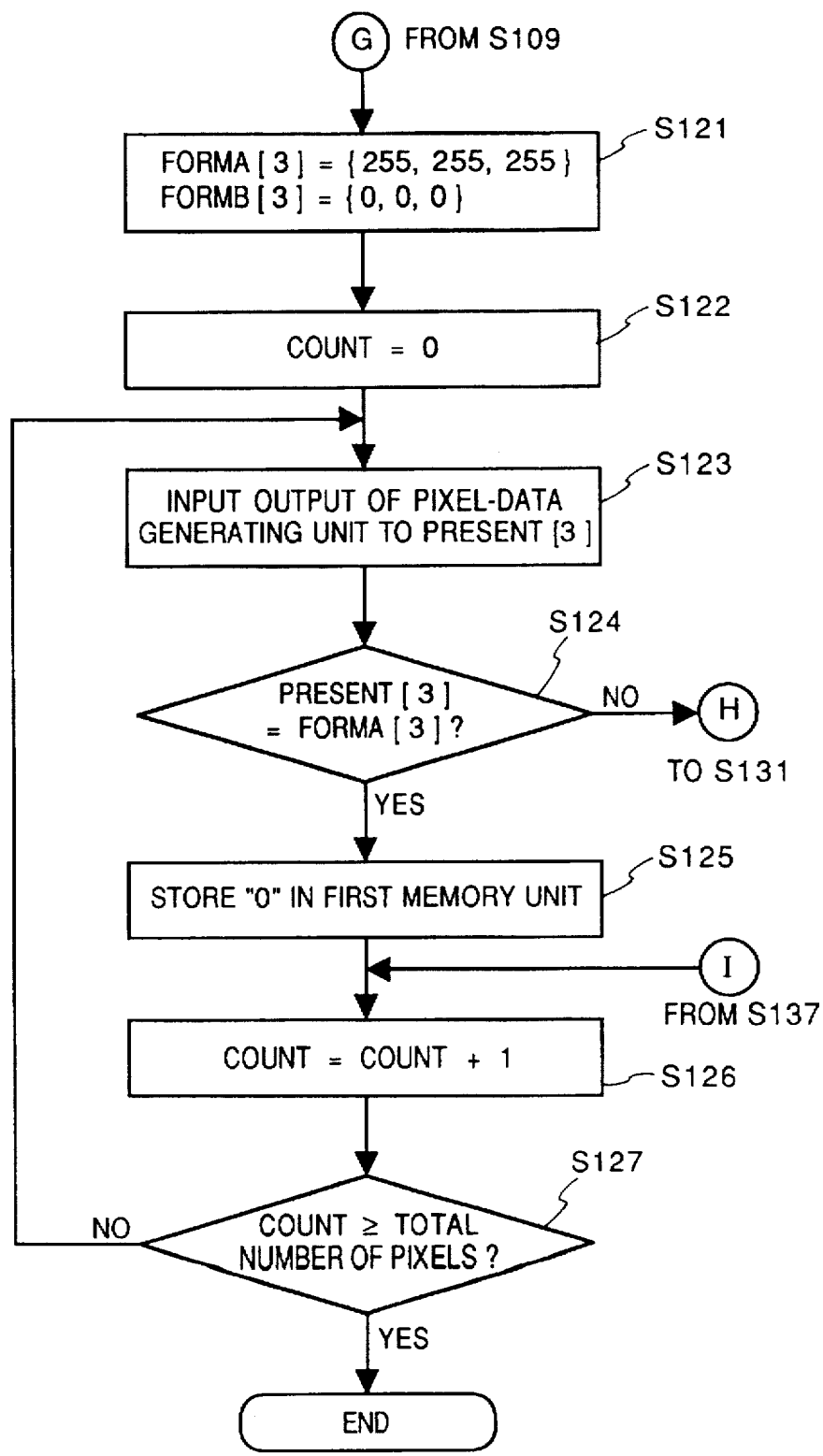
FIG. 13 is a flowchart illustrating the processing procedure of the data compression apparatus according to the fourth embodiment.
Figure 14:
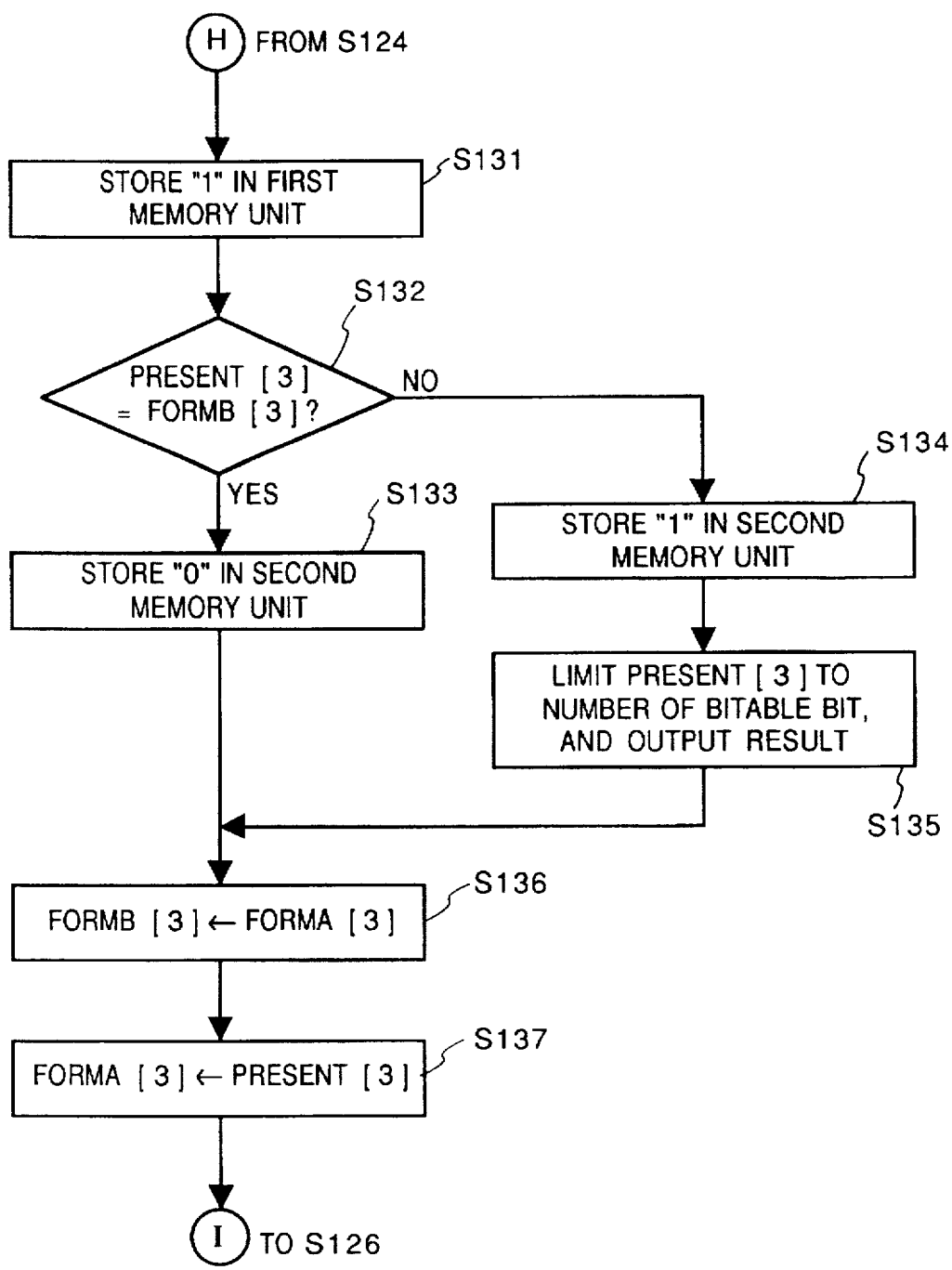
FIG. 14 is a flowchart illustrating the processing procedure of the data compression apparatus according to the fourth embodiment.

At step S106 in FIG. 11, COUNT is incremented, thereby counting the number of pixels that have been processed. The total number of pixels and COUNT are compared at step S107, whereby it is determined whether the processing of all pixels has been completed. If the processing of all pixels is still unfinished, then the program returns to step S104 and the foregoing processing is repeated. If the processing of all pixels is finished, the program proceeds to step S108.

The number of pixels allowable for the image is calculated at step S108 and BITABLE is let stand for this value. BITABLE is obtained by dividing the memory capacity of memory unit 108 by the 3×TOTAL. More specifically, the value of TOTAL obtained through the foregoing processing represents the number of items of pixel data to be stored in the third memory unit 108. The number of bits of the pixel data per pixel capable of being stored by the third memory unit 108 is calculated based upon the value of TOTAL. In terms of the block diagram of FIG. 10, a prescribed operation is executed by the ALU 114 using the value (TOTAL) in the counter 113, and the result of the operation is held in the buffer 115 as the allowable number of bits (BITABLE).

The image is returned to the beginning at step S109. This is processing for resetting the readout address regarding the pixel-data generating unit 101 and reading the same pixel data out again from the beginning. The program then proceeds to step S121, at which data compression processing is executed.

Steps S121 to S127 and S131 to S137 are in line with steps S11 to S17 and S21 to S27, respectively, in the first embodiment. The only difference from the first embodiment is the processing of a step S135 (which corresponds to step S25 in the first embodiment), and therefore only this step will be described here.

At step S135, the number of bits in each item of color data of PRESENT |3| is limited by the number of bits represented by the value of BITABLE obtained at step S108, after which the limited number of bits is delivered to the third memory unit 108. This will be described with reference to the block diagram of FIG. 10. The parallel/serial converter 109 converts the pixel data (8 bits×3) read out of the pixel-data generating unit 101 into serial data for each and every pixel. The counter 112 counts the number of bits outputted by the parallel/serial converter 109. The third comparator 116 compares the value of the count in counter 112 with the allowable number of bits (BITABLE) held in the buffer 115 and delivers the result of the comparison to the serial/parallel converter 110 via the AND gate 121. On the basis of the output from the third comparator 116, the serial/parallel converter 110 converts the data constituted by the higher order bits up to the allowable number of bits into parallel data and discards the remaining lower order bits. The counter 117 counts the number of bits that have been subjected to the parallel conversion. When the value of this count coincides with the bit depth of the third memory unit 108, the fourth comparator 119 delivers the result "1". In response to this result outputted by the fourth comparator 119, the third memory unit 108 stores the converted output of the serial/parallel converter 110 via the buffer 111.

Since the number of bits of the data in PRESENT |3| is thus limited by the value of BITABLE before being stored in the third memory unit 108, a prescribed memory capacity cannot be exceeded.

Figures 15, 16, 17:
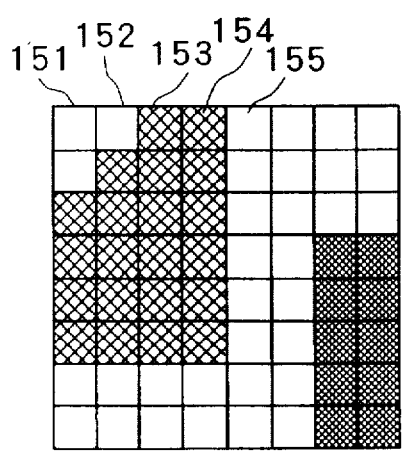
FIG. 15 is a diagram showing one example of image data.
FIG. 16 is a diagram showing data stored in a first memory.
FIG. 17 is a diagram showing data stored in a second memory.

A case will now be described in which an image illustrated in FIG. 15 is processed by the data compression apparatus of the third embodiment set forth above. It will be assumed that the image shown in FIG. 15 is one portion of an image produced by a computer, and that each pixel has a depth of eight bits for each of the colors R, G, B. Further, it will be assumed that the memory capacity of the third memory unit 108 is 128 bits.

First, FORMA |3|, FORMB |3|, COUNT and TOTAL are initialized (steps S101 to S103).

Next, the number of items of pixel data stored in the third memory unit is counted through steps S104~S109 and steps S111~S114. In the case of pixels 151 and 152, PRESENT |3|={255,255,255} holds. Since this is equal to FORMA |3|, only the value of COUNT is incremented. In the case of the next pixel 153, PRESENT |3|={230,10,120} holds. Since this differs from both FORMA |3| and FORMB |3|, the current PRESENT |3| must be written in the third memory unit 108. Accordingly, the value of TOTAL is incremented and the values of FORMA |3|, FORMB |3| are updated (steps S112~S114). Since PRESENT |3|=FORMA |3| at the next pixel 154, only COUNT is incremented. Next, when the pixel 155 enters, the relation PRESENT |3|≠FORMA |3| is established. However, since PRESENT |3|=FORMB |3| holds, the values of FORMB |3| and FORMA |3| are updated only, and the value of TOTAL is not changed (steps S111, S113, S114).

When the foregoing processing is executed for all of the image data of FIG. 15, the relation TOTAL=8 is attained. Next, the processing of step S108 is executed in order to decide the number of bits (BITABLE) of pixel data capable of being stored in the third memory unit 108.

In the third embodiment, the numbers of bits capable of being stored are the same for the colors R, G, B. Therefore, the allowable number of bits for each color of the pixel data is given by the following:

BITABLE=(allowable memory capacity of third memory unit)/(3× TOTAL)

In this example, the allowable memory capacity of the third memory unit is equal to 128 (bits), and TOTAL=8 holds. Accordingly, we have BITABLE=5.

Next, each of the components is initialized and compression processing is applied to the image of FIG. 15. This compression processing is similar to that of the first embodiment except for the fact that the number of bits of data for every color of each pixel is limited by the value of BITABLE (=5) before being stored in the third memory unit 108.

When the data compression processing ends, the content of the first memory unit 106 becomes as shown in FIG. 16 and the content of the second memory unit 107 becomes as shown in FIG. 17. It should be noted that the contents of the first memory unit 106 and second memory unit 107 are the same as in the case where processing is performed in accordance with the compression method of the first embodiment. The symbol "*" in FIG. 17 represents that there is no data.

The data stored in the third memory unit 108 is illustrated in FIG. 18. It will be understood that each item of data has a data length of five bits. For purposes of reference, the data stored in the third memory unit 108 in a case where processing is performed in accordance with the compression method of the first embodiment is illustrated in FIG. 19. In FIG. 19, 8 bits×3×8=192 bits, but in FIG. 18, we have 5 bits×3×8=120 bits. Accordingly, it will be appreciated that the pixel data in accordance with FIG. 18 will fit in 128 bits, which is the allowable memory capacity of the third memory unit 108.

<Data Decompression Apparatus>

A data decompression apparatus for applying decompression processing to the data, which has been compressed by the data compression apparatus set forth above, to restore this data to the original image data will now be described.

Figure 20:
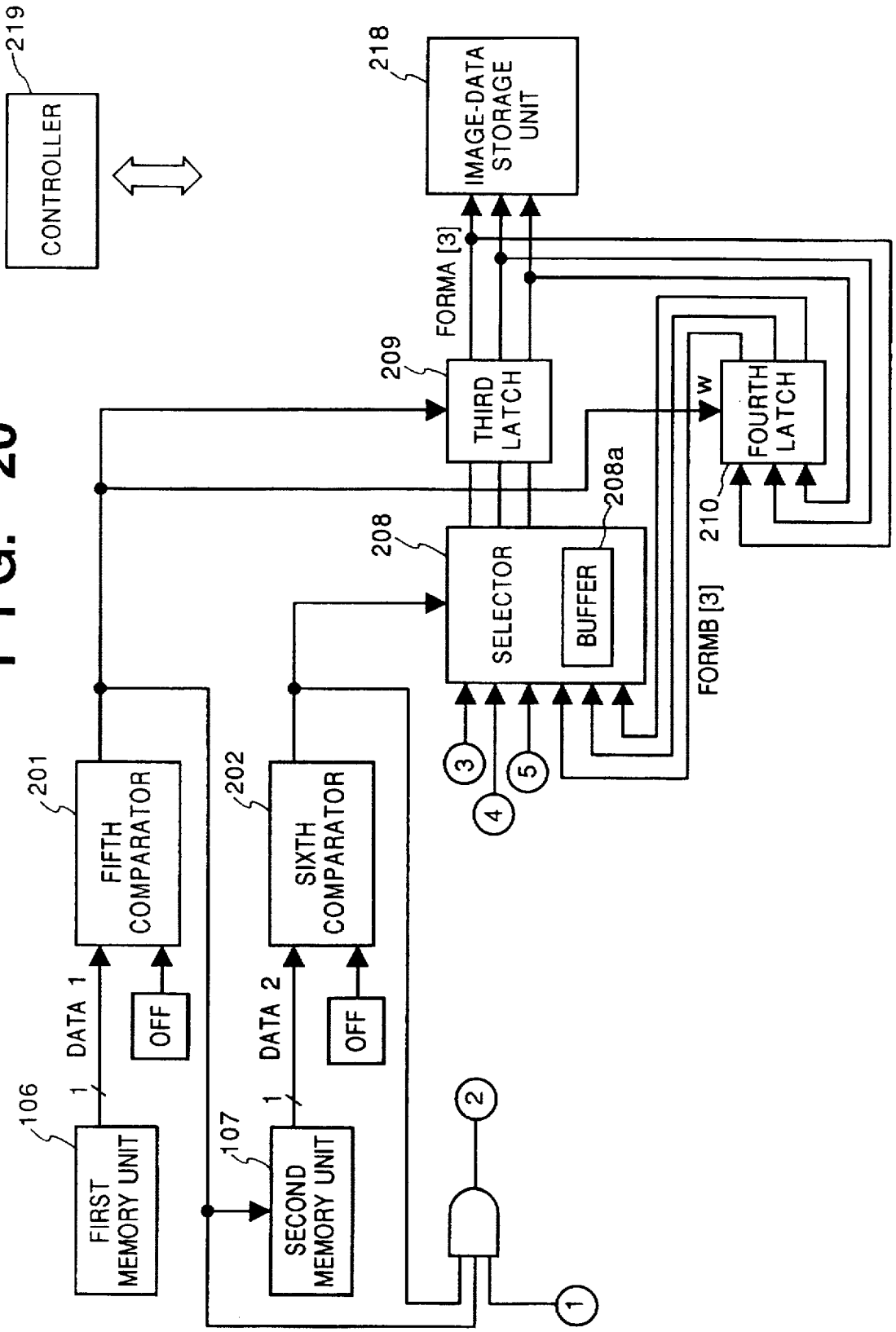
FIG. 20 is a block diagram illustrating the general configuration of a data decompression apparatus according to a fourth embodiment of the present invention.
Figure 21:
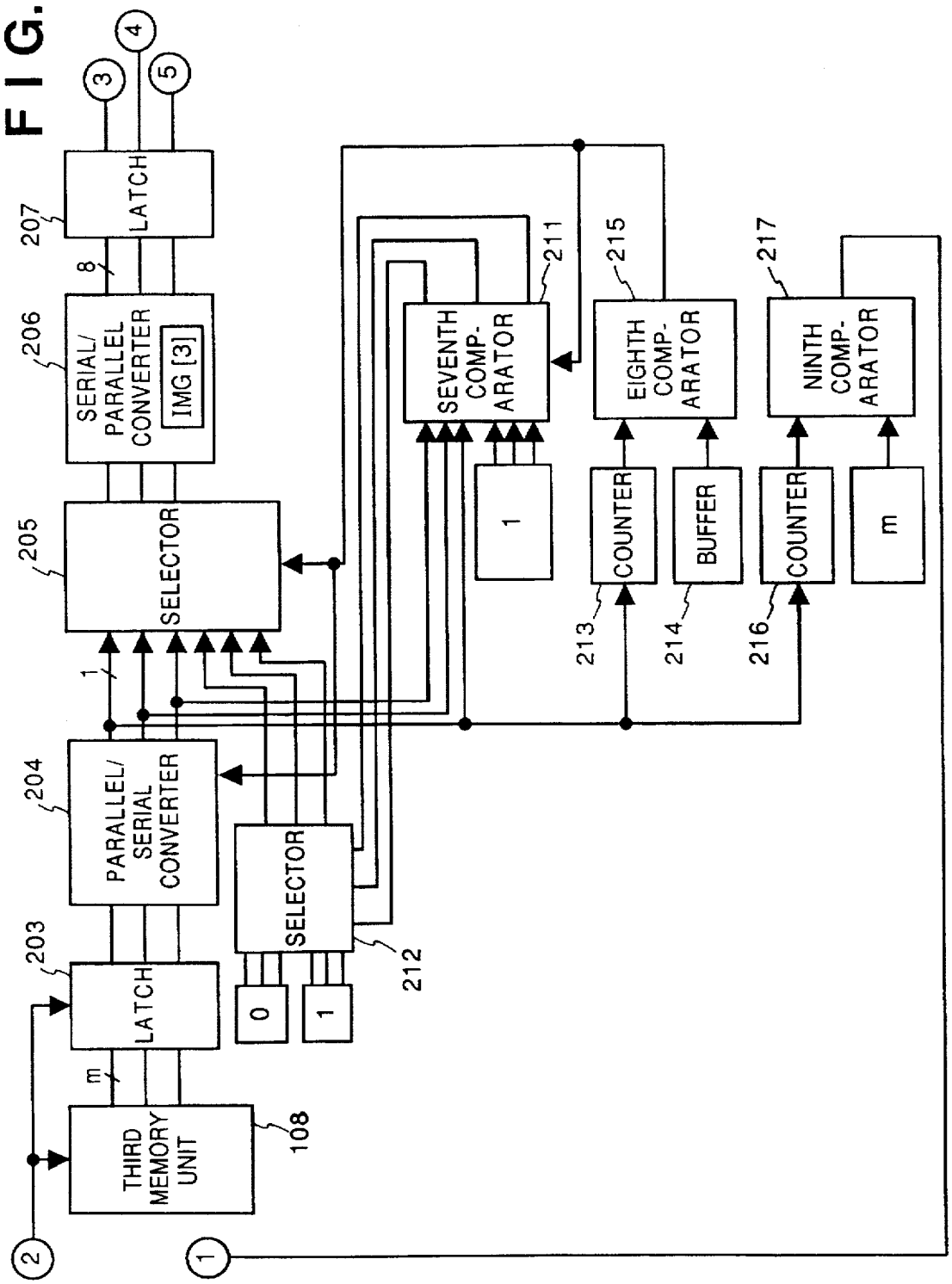
FIG. 21 is a block diagram illustrating the general configuration of a data decompression apparatus according to a fourth embodiment of the present invention.

FIGS. 20 and 21 are block diagrams showing the functional configuration of the data decompression apparatus according to the third embodiment. Numeral 201 denotes a fifth comparator for outputting "1" as the result of comparison when the output value from the first memory unit 106 is "1". Numeral 202 denotes a sixth comparator for outputting "1" as the result of comparison when the output value from the second memory unit 107 is "1".

A latch 203 latches the data read out of the third memory unit 108. A parallel/serial converter 204 converts the data that has been latched in the latch 203 into serial data color by color. A selector 205 selects and outputs either the serial data from the parallel/serial converter 204 or the data from the selector 212. A serial/parallel converter 206 converts the serial data inputted via the selector 205 into parallel data. A latch 207 latches the output of the serial/parallel converter 206. A selector 208 selects either the data held in latch 207 or the data held in a fourth latch 210. The selector 208 has a buffer 208a for holding the data selected. A third latch 209 latches the output of the selector 208 and delivers the latched data to a pixel-data storage unit 218. The fourth latch 210 latches the output data from the third latch 209.

A seventh comparator 211 delivers "1" when the serial data of each color outputted by the parallel/serial converter 204 is "1". In response to the result delivered by the seventh comparator 211, the selector 212 selects either "0" or "1" and delivers this logic to the selector 205. It should be noted that the seventh comparator 211 has its timing controlled by the controller 219, etc., in such a manner that the comparison is executed only with respect to a bit that becomes the most significant bit when the parallel conversion is made.

A counter 213 counts the number of bits outputted by the parallel/serial converter 204. A buffer 214 holds the value of BITABLE obtained by the data compression apparatus described above. An eighth comparator 215 compares the value in counter 213 and the value in the buffer 214 and delivers "1" as the result of comparison when the value in the counter 213 exceeds the value held in the buffer 214.

A counter 216 counts the number of bits outputted by the parallel/serial converter 204. A ninth comparator 217 compares the value in the counter 216 with the bit depth m of the third memory unit 108 and delivers "1" as the result of comparison when the value in counter 216 becomes greater than m. In response to this output, the data is read out of the third memory unit 108.

The pixel-data storage unit 218 stores the pixel data produced by the data decompression processing. A controller 219 executes timing control of each of the foregoing components as well as addressing control of each of the memory units.

The operation of the data decompression apparatus constructed as set forth above will now be described with reference to the flowcharts of FIGS. 22 to 24.

Figure 22:
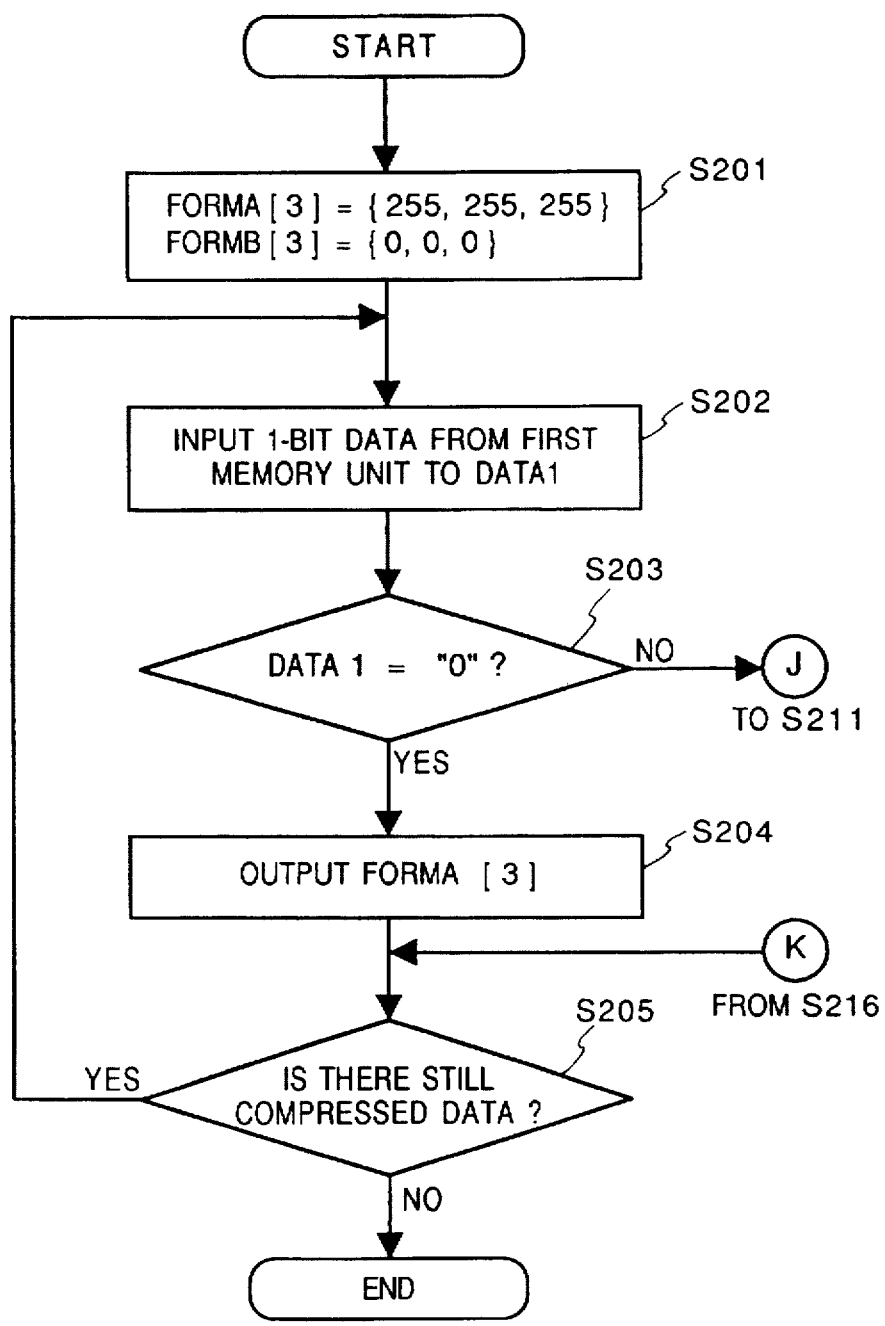
FIG. 22 is a flowchart illustrating the processing procedure of the data decompression apparatus according to the fourth embodiment.
Figure 23:
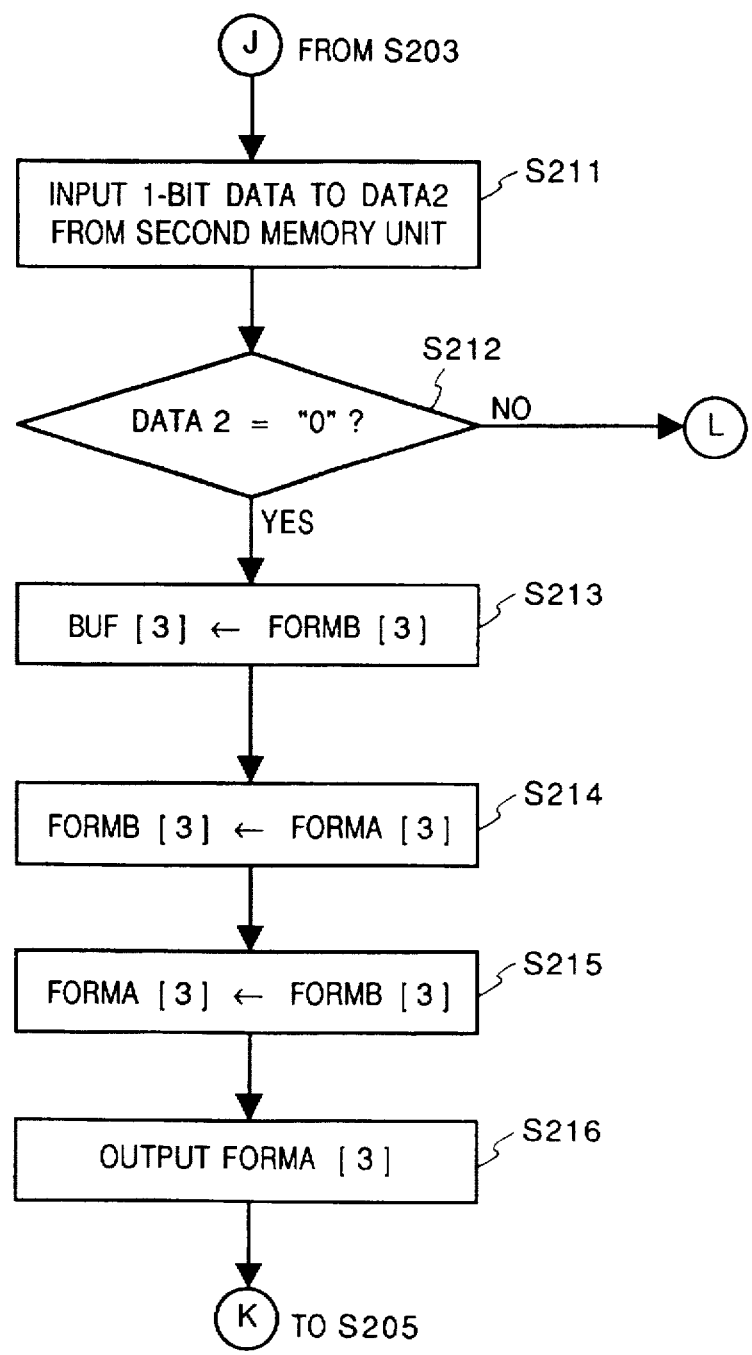
FIG. 23 is a flowchart illustrating the processing procedure of the data decompression apparatus according to the fourth embodiment.
Figure 24:
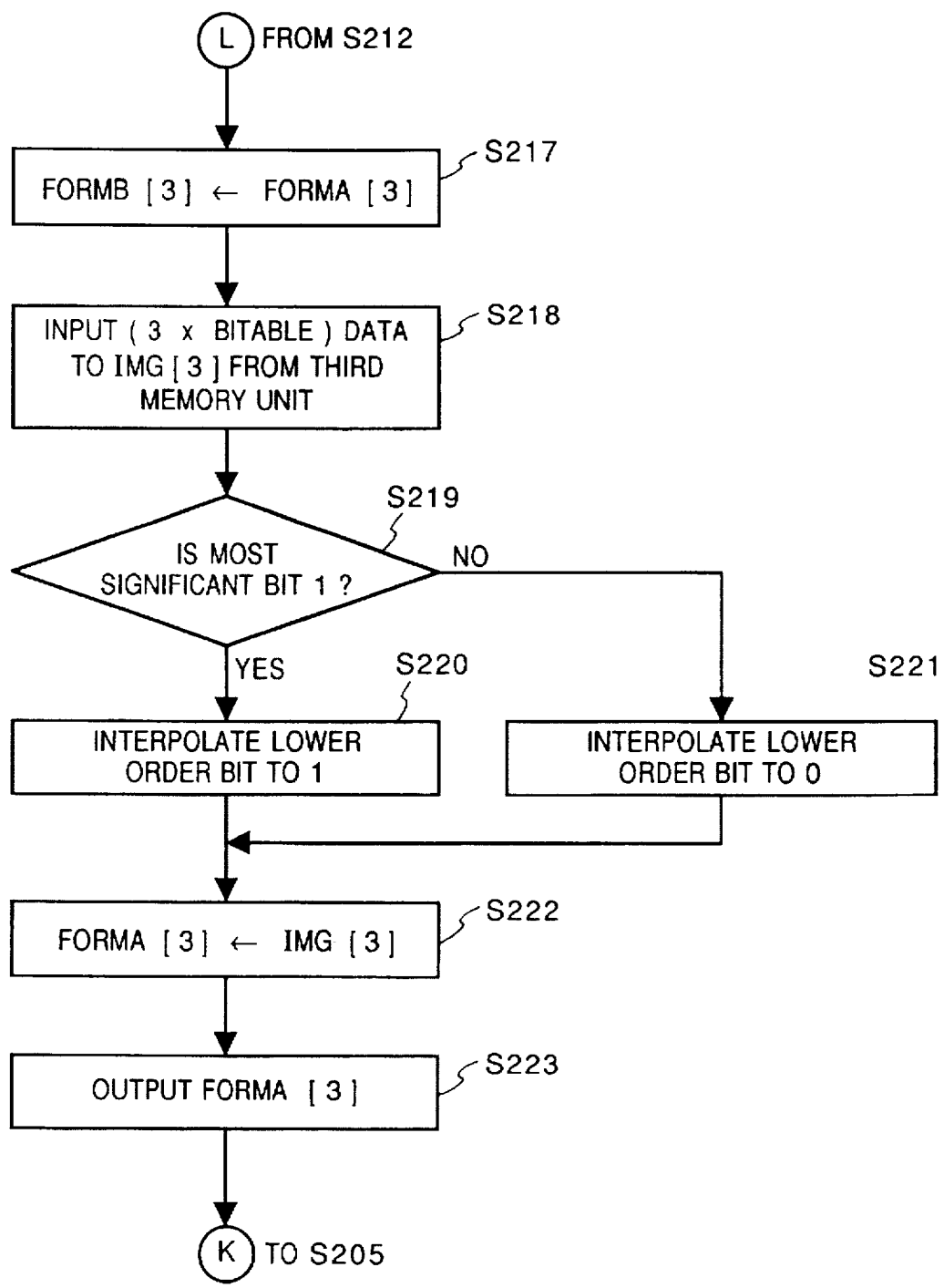
FIG. 24 is a flowchart illustrating the processing procedure of the data decompression apparatus according to the fourth embodiment.

FIGS. 22–24 are flowcharts representing the processing procedure executed by the data compression apparatus of the third embodiment. In the description that follows, FORMA |3| represents the data latched by the third latch 209, and FORMB |3| represents the data latched by the fourth latch 210. Further, let DATA1 and DATA2 represent the data read out of the first and second memory units 106 and 107, respectively.

Steps S201 to S205 correspond to steps S71 to S75 of the first embodiment. Further, steps S211 to S217 and step S223 correspond to steps S81 to S87 and step S89 of the first embodiment. Accordingly, the processing of steps S218 to S222, which differs from that of the first embodiment, will be described here.

At step S218, the data is read out of the third memory unit 108 and only the number of bits of the value of BITABLE is stored in IMG |3|. In order to recover the number of bits of the original image data, the following interpolation processing is executed:

It is determined at step S219 whether the most significant bit of the data of each color in IMG |3| is "1". The program proceeds to step S220 if the MSB is "1" and to step S221 if the MSB is "0". At step S220, "1" is substituted for all of the remaining lower order bits of IMG |3|. At step S221, "0" is substituted for all of the remaining lower order bits. The processing of steps S219–S221 described above is executed separately for the data of each color of IMG |3|. Thus, data corresponding to the bit length of the original pixel data is stored in IMG |3|, and therefore the content of IMG |3| is substituted for FORMA |3| at step S222.

In accordance with the interpolation method described above, it is possible to hold the maximum value and minimum value of the data. For example, when eight-bit data is limited to five-bit data, the maximum value 255 becomes 31 and the minimum value 0 becomes 0. If these five bits of data are simply interpolated as "0" to recover eight bits, we have 255→31→248, 0→0→0 and the maximum value becomes 248. If the five bits of data are simply interpolated as "1" to recover the eight-bit data, we have 255→31→255, 0→0→7 and the minimum value becomes 7. Accordingly, if the most significant bit is 1, then 1 is interpolated. When the lower order bit is 0 again, 0 is interpolated. Accordingly, we have 255→31→255, 0→0→0 and the maximum value 255 and minimum value 0 are maintained.

The processing of steps S217 to S223 will now be described in conformity with the block diagram of FIGS. 20 and 21. First, the results of the comparison operations delivered by the fifth comparator 201, the sixth comparator 202 and the ninth comparator 217 are processed by an AND gate 219, whereby a signal request readout is sent to the third memory unit 108. The data read out of the third memory unit 108 is parallel data of 8×3 bits and is latched by the latch 203. The data is then translated into serial data color by color by means of the parallel/serial converter 204.

The seventh comparator 211 compares the output data from the parallel/serial converter 204 with "1" and delivers the result of comparison to the selector 212. The output ("0" or "1") of the selector 212 is decided by the result of comparison. It should be noted that the seventh comparator 211 is controlled by the result of comparison from the eighth comparator 215 as well as by the controller 219 so that the comparison is executed with regard to serial data that becomes the most significant bit when the parallel conversion is made.

The parallel/serial converter 204 outputs serial data during the time that the output of the eighth comparator 215 is "0", and the selector 205 delivers this serial data to the serial/parallel converter 206. More specifically, the selector 205 delivers the serial data of the BITABLE portion to the serial/parallel converter 206. With regard to the remaining bit portion, the selector 205 selects the output value from the selector 212 and delivers it to the serial/parallel converter 206. Interpolation processing for the lower order bits discarded at the time of compression is executed in the manner described above. The result is outputted from the serial/parallel converter 206 as the pixel data of each color. This is latched by the latch 207. The ninth comparator 217 compares the number of bits outputted by the parallel/serial converter 204 and the bit depth possessed by the third memory unit and issues a readout request for readout of the next item of data from the third memory unit 108.

It should be noted that while a method has been considered in which the value of BITABLE in the buffer 214 is attached to the beginning of the third memory unit 108 as a header at the time of compression and is extracted at the time of decompression, the invention is not limited to such an arrangement.

Figure 25:
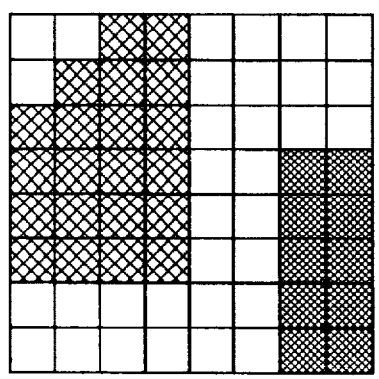
FIG. 25 is a diagram showing an image obtained as the result of decompression processing performed by the data decompression apparatus of the fourth embodiment.

When the compressed data illustrated in FIGS. 17, 18 and 19 is subjected to decompression processing by the data decompression apparatus described above, image data of the kind shown in FIG. 25 is obtained. When the data of each pixel is compared with the original image of FIG. 15, it will be seen that the data {230,10,120} has changed to {231,8, 120} and that the data {0,200,255} has changed to {0,207, 255} as a result of interpolation processing. However, edges are preserved and portions of the original image that are of a single color are still of a single color after the transformation.

In an image that contains high frequencies, such as an image produced by a computer, a certain number of tones is required by the human eye. It will suffice if this is four bits (16 tones). Five bits (32 tones) is even better. Accordingly, a change in color to the extent described does not result in a decline in image quality.

In accordance with the apparatus for compressing/decompressing image data in the third embodiment described above, the image data can be compressed in such a manner that the amount of data after compression is adjusted to the prescribed memory capacity of the apparatus.

[Fourth Embodiment]

In the third embodiment set forth above, three memory units, namely the first through third memory units, are used. However, these can be combined into a single memory.

With such an arrangement, the unused portion of the second memory unit 107 that is wasted because it is not employed in the third embodiment can be used in order to store the color data of the third memory. In this case, the arithmetic expression of BITABLE is $$\text{BITABLE} = \{C'-(x+y)\}/(3 \times \text{TOTAL})$$

where C' represents the allowable memory capacity, x the number of pixels, y the number of times PRESENT [3] and FORMA [3] differ, and TOTAL the number of times PRESENT [3] differs from FORMA [3] and FORMB [3]. In order to count y, it will suffice to increment y immediately prior to step S111 in FIG. 12.

By virtue of the arrangement described above, the number of bits of each item of pixel data at compression of the image data in FIG. 15 is as follows: Since C'=64+64+128=256 (bits), x=64, y=19, TOTAL=8, we have $$\text{BITABLE} = \{248-(64+19)\}/(3 \times 8) = 6.8$$

and the number of allowable bits is increased from five bits to six bits in this embodiment. Accordingly, compression is possible with an even smaller change in color.

[Fifth Embodiment]

In the third and fourth embodiments described above, data having the same number of bits for each of the colors R, G, B is stored. In the fifth embodiment, a method will be described in which the data stored has a different number of bits for each color.

In this case, a calculation is performed to determine how many bits can be used per pixel. This calculation is expressed by $$\text{BITABLE} = C(\text{allowable memory capacity})/\text{TOTAL}$$

If the image of FIG. 15 is processed, C=128, TOTAL=8 will hold and therefore the allowable number of bits will be 16 bits per pixel. These bits are allocated to each of the colors while assigning an order of priority. For example, five bits are allocated to R, six bits to G and five bits to B, as a result of which a memory having one extra bit can be used for the data of color G.

If an arrangement is adopted in which a single memory is used (rather than three individual memories), we have $$\text{BITABLE} = \{C'-(x+y)\}/\text{TOTAL}$$

If numerical values are inserted in this equation and the image of FIG. 15 is processed, we have C'=256, x=64, y=19 and TOTAL=8, so that BITABLE=20.6 is the result. Accordingly, the allowable number of bits is 20 bits per pixel. These bits are distributed among each of the colors so that R can take on seven bits, G seven bits and B six bits. As a result, a change in color at the time of restoration can be suppressed even further.

[Sixth Embodiment]

Figure 27:
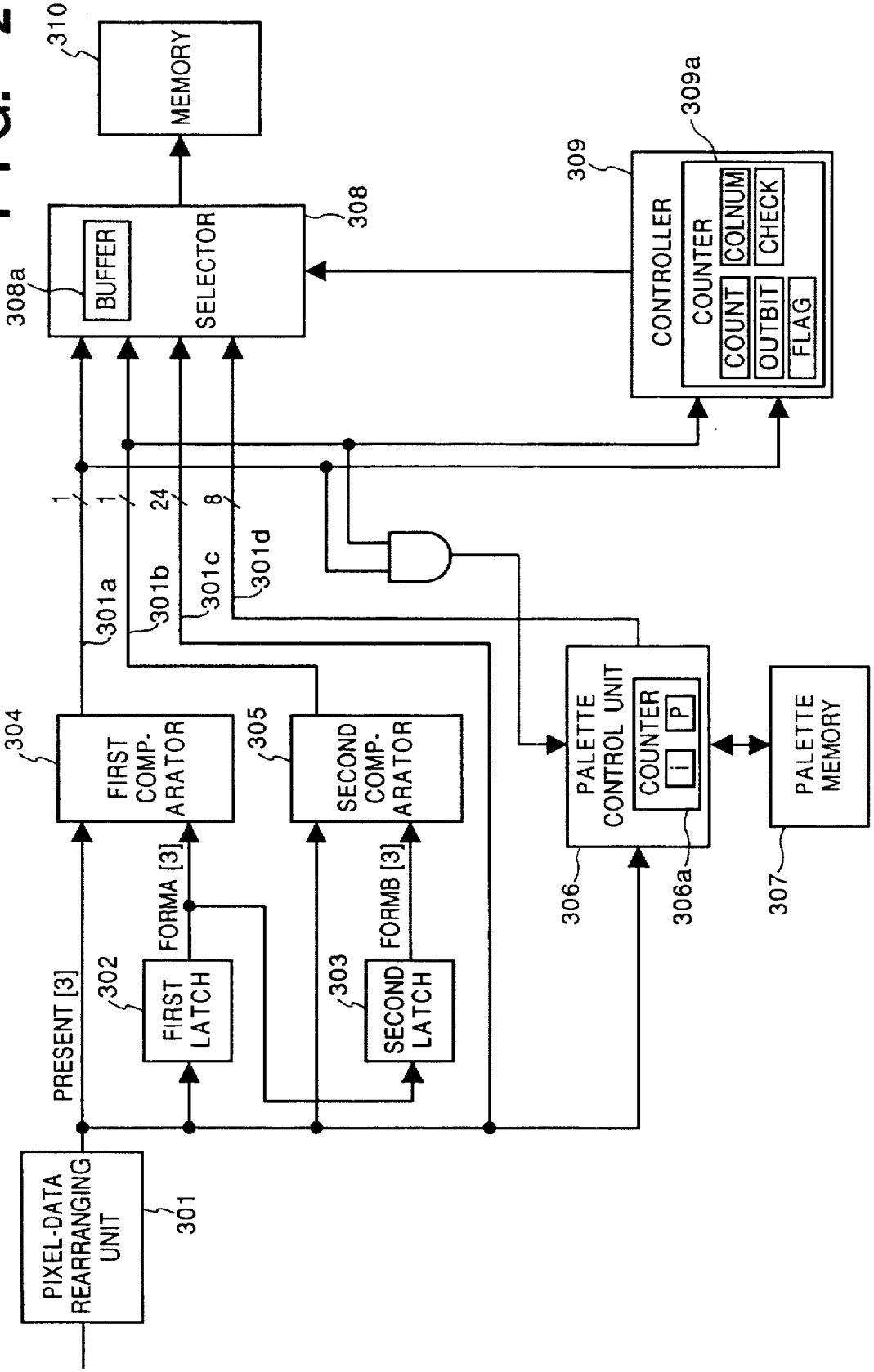
FIG. 27 is a block diagram illustrating the functional configuration of a data compression apparatus according to a sixth embodiment of the present invention.

FIG. 27 is a block diagram illustrating the functional configuration of a data compression apparatus according to a sixth embodiment of the invention. This apparatus includes an image-data rearranging unit for outputting pixel data, which is composed of 24 bits per pixel, as a signal 301c in the NTSC-RGB format. Also included are a first latch 302 for latching the pixel data outputted by the pixel-data rearranging unit 301, a second latch 303 for latching the pixel data outputted by the first latch 302, a first comparator 304 for comparing the pixel data outputted by the pixel-data rearranging unit 301 and the pixel data latched in the first latch 302 and outputting "0" as a signal 301a when the two items of compared data are equal and "1" as the signal 301a when the two items of compared data are different, and a second comparator 305 for comparing the pixel data outputted by the pixel-data rearranging unit 301 and the pixel data latched in the second latch 303 and outputting "0" as a signal 301b when the two items of compared data are equal and "1" as the signal 301b when the two items of compared data are different.

Numeral 306 denotes a palette control unit, which is operated by an AND signal between the signals 301a and 301b, for determining whether the pixel data from the pixel-data rearranging unit 301 is present in a palette memory 307 (sometimes termed a "storage unit" hereinafter). If the pixel data is present, then the palette number is outputted as a signal 301d. If the pixel data is not present, then this pixel data is registered in the palette memory 307 anew and the palette number of this pixel data is outputted as the signal 301d. The palette memory 307 is capable of storing 2m items of 24-bit pixel data. It should be noted that the number of pixels capable of being stored in the palette memory 307 is referred to as a limit value and is 256 (m=8) in this embodiment. Numeral 308 denotes a selector for selecting one of the signals 301a, 301b, 301c and 301d and storing it in a buffer 308a. When data having the depth of a memory 310 has accumulated in the buffer 308a, this data is delivered to the memory 310. A controller 309 is for controlling the operation timing of each of the components mentioned above based upon the states of the signals 301a and 301b. In particular, the controller 309 controls the selection of each of the signals in the selector 308 as well as the number of effective bits when the signal 301d is selected. The controller 309 has a counter 309a for counting COUNT, COLUMN, etc. The operation and role of the counter 309a will become clear later from a description given in connection with the flowcharts. The memory 310 stores the output of the selector 308 in successive fashion.

The operation of the data compression apparatus constructed as set forth above will now be described with reference to the flowcharts of FIGS. 28 through 30.

Figure 28:
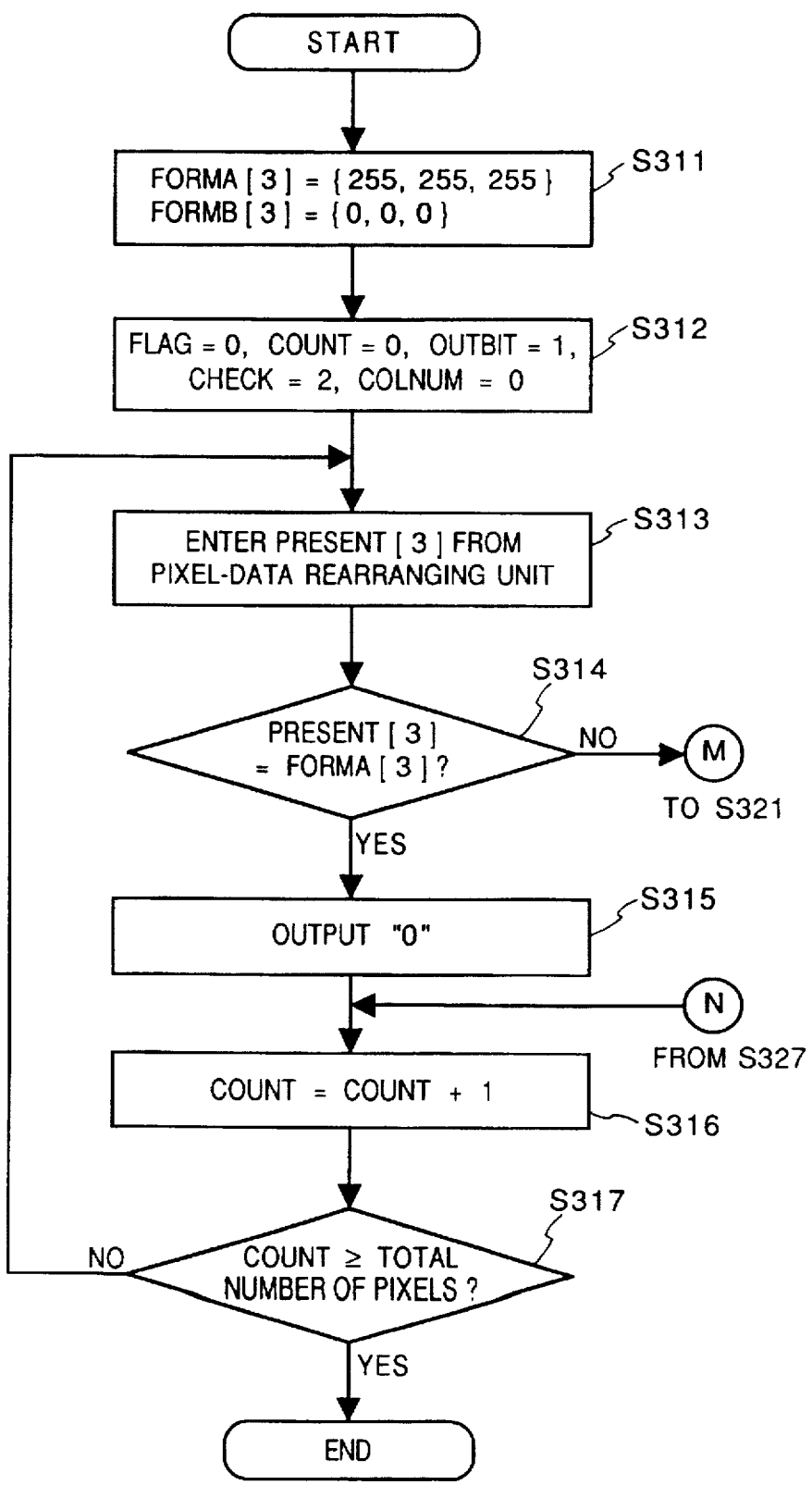
FIGS. 28, 29 and 30 are flowcharts illustrating the processing procedure of the data compression apparatus according to a sixth embodiment.
Figure 29:
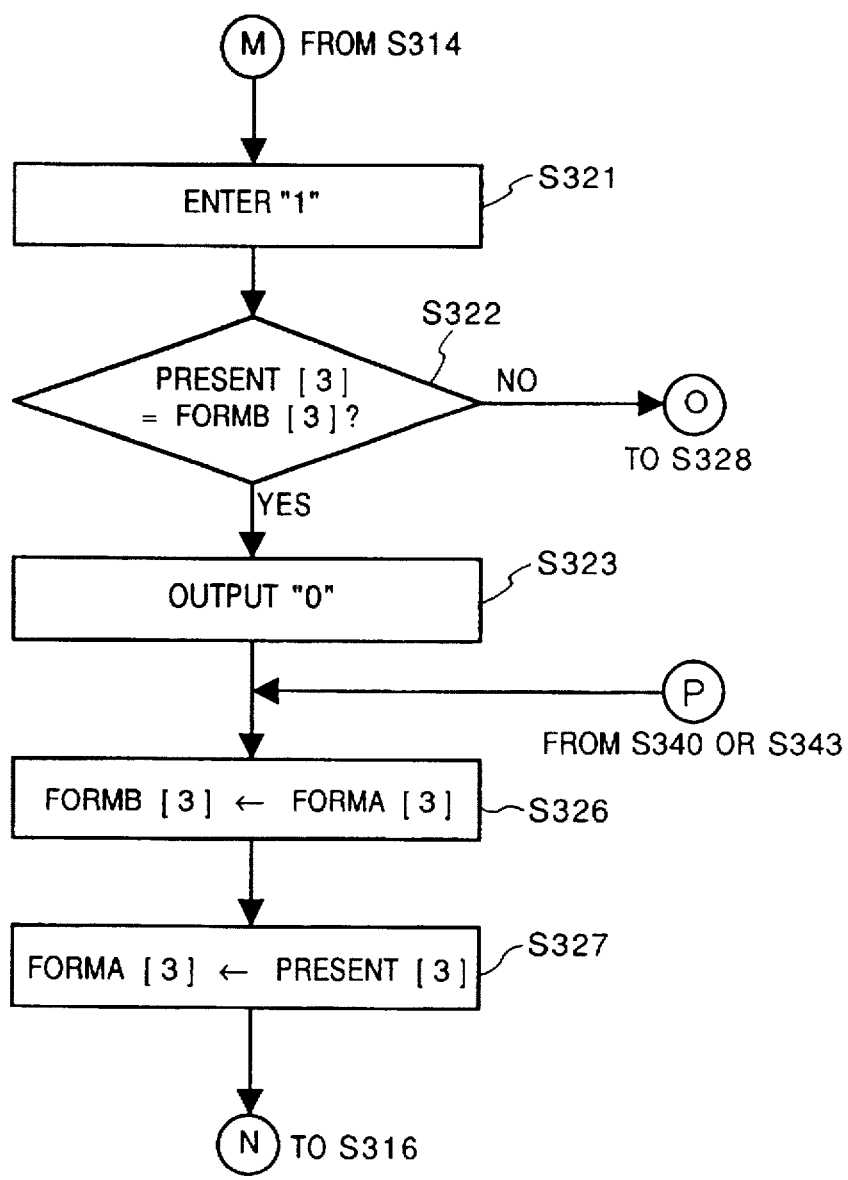
Figure 30:
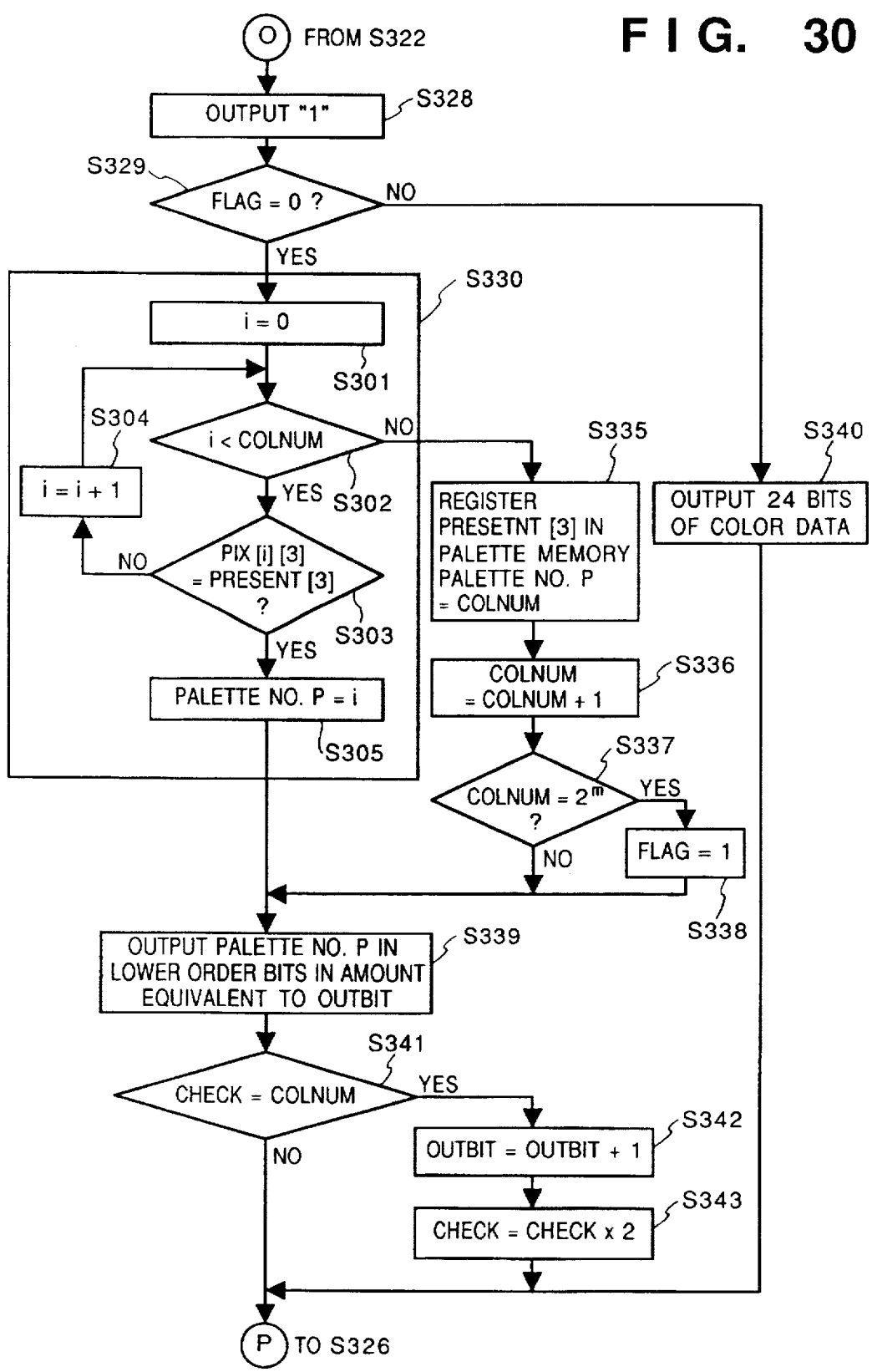

FIGS. 28 through 30 are flowcharts illustrating the processing procedure executed by the data compression apparatus according to this embodiment. In the description that follows, pixel data latched by the first latch 302 is represented by FORMA |3|, and the pixel data latched by the second latch 303 is represented by FORMB |3|. Further, the pixel data outputted by the pixel-data rearranging unit 301 is represented by PRESENT |3|. The items of data FORMA |3|, FORMB |3| and PRESENT |3| are data in the NTSC-RGB format. These items of data possess a 1×3 array structure having R, G, B data.

The initial settings of the first latch 302 and second latch 303 are performed at step S311. That is, FORMA |3| and FORMB |3| are set to initial values. In this embodiment also, as in the first embodiment described earlier, FORMA |3|, FORMB |3| are set to initial values of {255,255,255} (white) and {0,0,0} (black), respectively. Next, at step S312, the counter COUNT, which is for counting the number of pixels that have been processed, and a counter COLNUM, which is for counting the number of items of pixel data that have appeared so far, are reset to zero. Further, a FLAG that becomes 1 when COLNUM exceeds the limit value 256 of the palette memory is set to 0, OUTBIT, which represents the bit length to be outputted as a palette number, is set to 1, and CHECK, which is for establishing the timing at which OUTBIT is incremented, is set to 2. It should be noted that COUNT, COLNUM, OUTBIT, CHECK and FLAG are provided in the counter 309a.

The pixel data (PRESENT |3|) is entered from the pixel-data rearranging unit 301 at step S313. The first comparator 304 compares PRESENT |3| and FORMA |3| at step S314. The program proceeds to step S315 if the result of comparison is that PRESENT |3| and FORMA |3| are equal and to step S321 in FIG. 29 if the result of comparison is that these are unequal.

Step S315 calls for "0", namely the result of comparison performed by the first comparator 304, to be stored in the buffer 308a of the selector 308, after which the program proceeds to step S316.

At step S16, COUNT is incremented and it is determined at step S317 whether the processing of all pixels has ended. More specifically, if COUNT is equal to or greater than the total number of pixels, it is judged that the processing of all pixels has ended and data compression processing is terminated. If COUNT is less than the total number of pixels, this means that some pixel data has not yet been processed and, hence, the program returns to step S313 so that the foregoing processing is repeated.

Processing in the case where PRESENT |3| ≠FORMA |3| holds will now be described with reference to the flowchart of FIG. 29.

At step S321 in FIG. 29, "1", which is the result of comparison performed by the first comparator 304, is stored in the buffer 308a of selector 308. The second comparator 305 compares PRESENT |3| and FORMB |3| at step S322. The program proceeds to step S323 if the result of comparison is that PRESENT [3]=FORMB |3| holds and to step S328 in FIG. 30 if the result of comparison is that PRESENT |3|≠FORMB |3| holds.

At step S323, "0", which is the result of comparison performed by the second comparator 305, is stored in the buffer 308a of selector 308, after which the program proceeds to step S326.

At step S326, FORMA |3| is stored in FORMB |3|, and PRESENT |3|, which is data presently being outputted by the pixel-data rearranging unit 301, is stored in FORMA |3| at step S327. The program then proceeds to step S317 in the flowchart of FIG. 28 and the processing described above is executed.

Processing in the case where PRESENT |3|≠FORMB |3| holds will now be described with reference to the flowchart of FIG. 30.

At step S328 in FIG. 30, "1", which is the result of comparison performed by the second comparator 305, is stored in the buffer 308a of selector 308. Next, at step S329, it is determined whether FLAG is zero or not, whereby it may be determined whether COLNUM has attained the limit value of the palette memory. The program proceeds to step S330 if the limit value has not been attained and to step S340 if it has been attained.

It is determined at step S330 whether the pixel data PRESENT |3| has already been registered in the palette memory. More specifically, it is determined whether pixel data (PIX|i||3|) that has been stored at address i of the palette memory 307 agrees with PRESENT |3| (step S303). If the two agree, then address i is substituted for the palette number P (step S305). If the two do not agree, then i is incremented (step S304) and a comparison with the data at the next address i is executed. The foregoing processing is executed a number of times equivalent to the number (COLNUM−1) of items of pixel data that have appeared thus far (step S302). When the palette memory 307 does not have pixel data that agrees with PRESENT |3|, the program proceeds to step S335 in order that PRESENT |3| may be stored in the palette memory 307 as new pixel data.

At step S335, PRESENT |3| is registered at the address of palette memory 307 indicated by COLNUM and the value of COLNUM is substituted for the palette number P. COLNUM is incremented at step S336.

It is determined at step S337 whether COLNUM has attained the limit value of the palette memory 307. If the limit value has been attained, the program proceeds to step S338 and 1 is substituted for FLAG.

At step S339, the palette number P is outputted in an amount equivalent to OUTBIT on the lower order side. It is determined at step S341 whether CHECK and COLNUM are equal. If they are equal, the program proceeds to step S342, where OUTBIT is incremented, and then to step S343, at which CHECK is updated to CHECK×2. For example, when pixel data is stored at address 1 of palette memory 307, the relation COLNUM=2 is established (step S336). At this point in time, CHECK=2 holds and COLNUM=CHECK=2 is established. As a result, OUTBIT is incremented and OUTBIT=2 is established (step S342). Accordingly, from the processing of the next item of pixel data, the signal representing the palette memory address employs the two lower order bits. The value CHECK for incrementing OUTPUT is doubled to 4 at step S343.

If FLAG is found to be 0 at step S329, i.e., if the number of items of pixel data that have appeared exceeds the limit value of the palette memory 307, the program proceeds to step S340 and the 24 bits of pixel data (signal 301c) are stored in the buffer 308a as is without using the palette memory 307.

When data in an amount equivalent to the depth of the memory 311 has accumulated in the buffer 308a of the selector 308, the data within the buffer 308a is outputted to and stored in the memory 311. (This processing, however, is not illustrated in the flowcharts.) Thus, the compressed data is stored in the memory 311 and palette memory 307.

Figure 31:
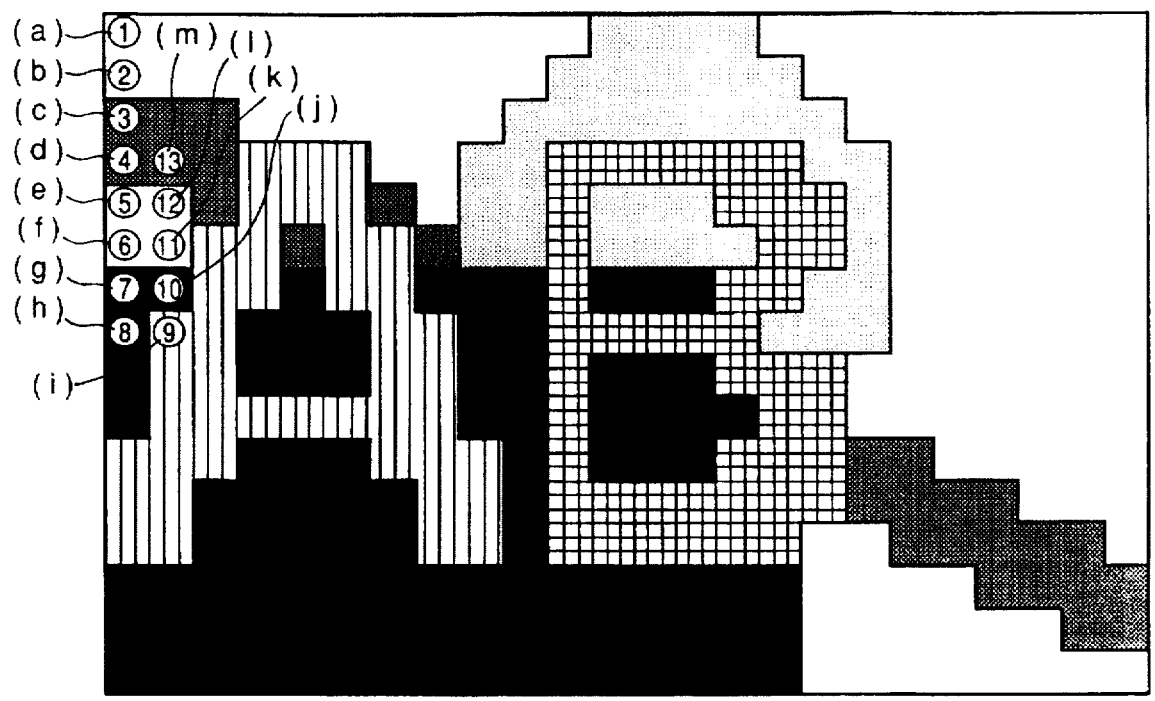
FIG. 31 is a diagram showing one example of an image that undergoes compression.

The operation performed by the data compression apparatus will now be described with reference to a specific example. FIG. 31 is an example of NTSC-RGB data that undergoes data compression processing.

Figure 32:
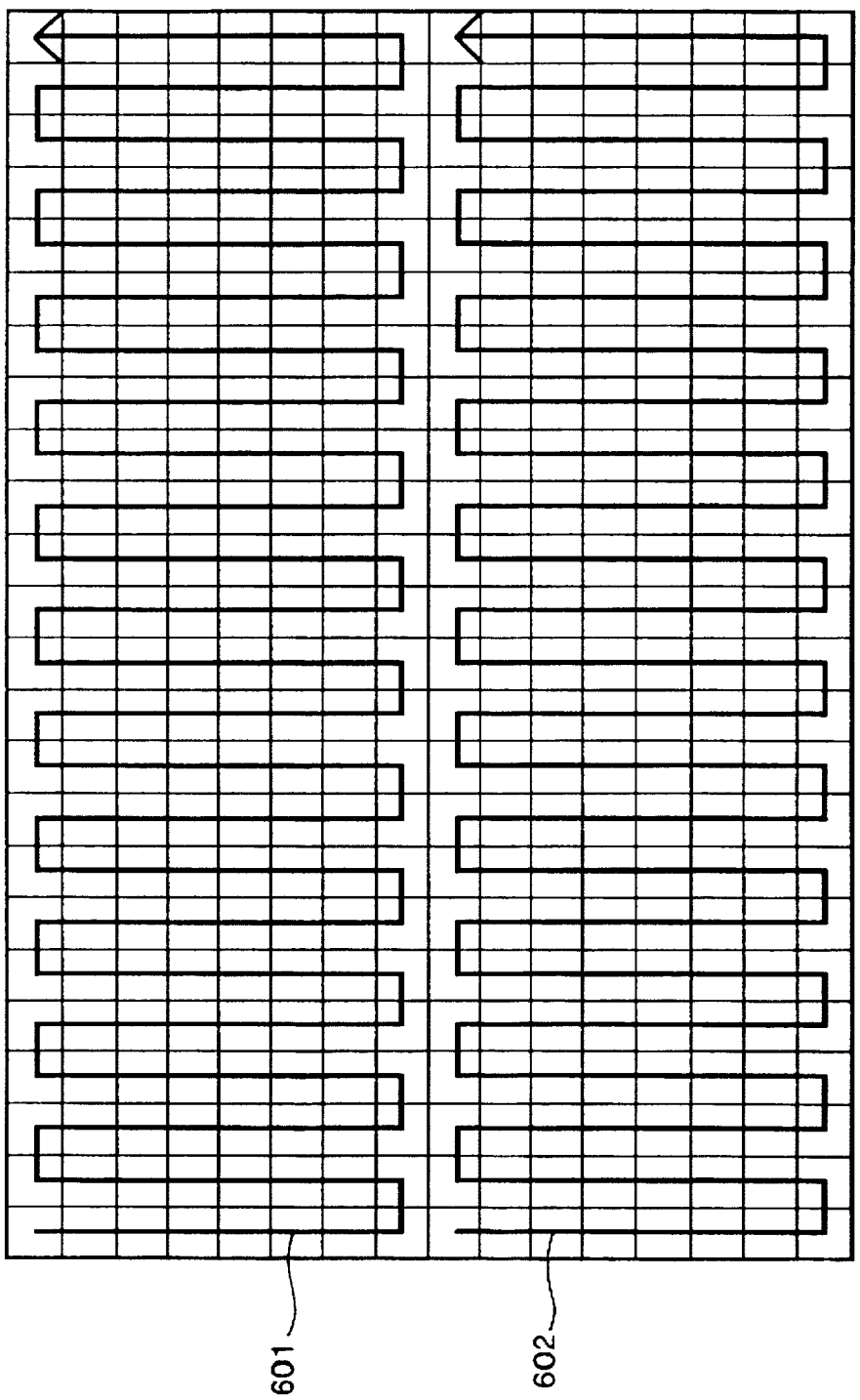
FIG. 32 is a diagram showing the processing sequence of pixels in a data compression apparatus according to the sixth embodiment.

FIG. 32 is a diagram for describing the processing sequence of pixels in accordance with the data compression apparatus of this embodiment. Two-dimensional data illustrated in FIG. 32 rearranged in zigzag fashion and processed. By performing processing in zigzag fashion at a depth of eight pixels, image data turnover is greater in comparison with processing in a raster-type scanning sequence, and therefore the efficiency of compression is improved. Furthermore, combined use with ADCT processing when pictures or the like read by a scanner are mixed in with the image data is simplified. The above-described processing for rearranging data is executed by the image-pixel rearranging unit 301 of FIG. 27. FIG. 37 illustrates the states of various data that prevail at the moment the processing of each pixel ends, namely the moment at which step S316 ends.

First, FORMA |3|, FORMB |3|, COUNT, FLAG and COLNUM are set to initial values (steps S311, S312). Next, PRESENT |3|, which represents the currently prevailing value, is entered from the pixel-data rearranging unit 301 (step S313). The data of pixel (a) is {255,255,255}, and therefore PRESENT |3|={255,255,255} is established. Next, the first comparator 304 compares PRESENT |3| and FORMA |3| (step S314). Here PRESENT |3| and FORMA |3| both have the data {255,255,255} so that PRESENT |3| and FORMA |3| are equal. Accordingly, the program proceeds to step S315, at which the first comparator 304 delivers "0" as its output. Here the selector 308 stores this value in the buffer 308a. Since this ends the processing for pixel (a), COUNT is incremented (step S316), whereupon the condition COUNT=1 is established. Since the processing of all pixels is not yet finished, the program proceeds to step S313 (step S17).

The next pixel (b) has a value identical with that of pixel (a), and processing similar to that applied to pixel (a) is executed. Next, the data of pixel (c) outputted by the pixel-data rearranging unit 301 has a value of {160,0,240}, and therefore PRESENT |3|={160,0,240} is established. Next, PRESENT [3] and FORMA |3|={255,255,255} are compared (step S314). Since these have different values, the first comparator 304 delivers "1" and the selector 308 stores this in the buffer 308a (step S321).

Furthermore, the second comparator 305 compares PRESENT [3] and FORMB |3|={0,0,0} (step S322). Since these have different values, the second comparator 305 delivers "1" and the selector 308 stores this in the buffer 308a (step S328).

FLAG, which indicates whether COLNUM has attained the limit value of the palette memory 307, is checked at step S328. Since FLAG=0 holds at this time, it is judged that COLNUM has not attained the limit value of the palette memory 307, and the program proceeds to step S330. Here it is determined whether the data of PRESENT [3] has already been registered within the palette memory 307. At this point in time, COLNUM=0 holds and even not even a single item of pixel data has been registered in the palette memory 307. The program proceeds to step S335 as a result.

At step S335, the data {160,0,240} of PRESENT [3] is registered at address 0 (=COLNUM) of the palette memory 307 and 0 is substituted for the palette number P. COLNUM is then incremented (step S336). Next, it is determined whether COLNUM has attained the limit value (256) of the palette memory 307 (step S337). Since COLNUM=1 holds at this time, this means that the limit value has not been attained. Accordingly, the program proceeds to step S339 without any processing being executed. Since OUTBIT=1 holds at this time, the lower order bit of palette number P=0 is outputted and stored in the buffer 308a (step S339).

It is determined at step S341 whether COLNUM is equal to CHECK. Here COLNUM=1, CHECK=2 hold and the two are unequal. As a result, the program proceeds to step S326 without any processing being executed.

Next, the data of FORMA |3| and FORMB |3| is updated. That is, FORMA |3| is stored in FORMB |3| and PRESENT |3| is stored in FORMA |3| (steps S326, S327). Thus, the relations FORMA |3|={160,0,240} and FORMB |3|={255,255,255} are established.

The status of the data stored in the buffer 308a at this point in time is as follows:

(0) (0) (1/1/0)

(In order to facilitate reading, the output regarding one item of pixel data is enclosed by parentheses, and outputs within one item of pixel data are demarcated by slash marks.)

The content of the palette memory is as follows: content at address <00000000>=10100000/00000000/11110000

Since the next pixel (d) has data identical with that of FORMA |3|, the first comparator outputs "0" and the selector 308 stores this in the buffer 308a.

The data of the next pixel (e) is {255,255,255}, which is different from the data of FORMA |3| but the same as the data of FORMB |3|. Accordingly, the first comparator 304 outputs "1", the second comparator 305 outputs "0" and the selector 308 stores these in the buffer 308a. Thereafter, the data of FORMA |3| and FORMB |3| are interchanged so that the relations FORMA |3|={255,255,255}, FORMB |3|={160,0,240} are attained.

Since the next pixel (f) has data identical with that of FORMA |3|, the first comparator outputs "0" and the selector 308 stores this in the buffer 308a.

Since the next pixel (g) possesses different data, the processing procedure changes.

The data of pixel (g) outputted by the pixel-data rearranging unit 301 has a value of {0,0,0}, and therefore the relation PRESENT |3|={0,0,0} is established (step S313). Next, PRESENT [3] and FORMA |3|={255,255,255} are compared (step S314). Since these have different values, the first comparator 304 outputs "1" and the selector 308 stores this in the buffer 308a (step S321).

Furthermore, the second comparator 305 compares PRESENT |3| and FORMB |3|={160,0,240} (step S322). Since these have different values, the second comparator 305 outputs "1" and the selector 308 stores this in the buffer 308a (step S328).

FLAG, which indicates whether COLNUM has attained the limit value of the palette memory 307, is checked at step S328. Since FLAG=0 holds at this time, it is judged that COLNUM has not attained the limit value of the palette memory 307, and the program proceeds to step S330. Here it is determined whether the data of PRESENT |3| has already been registered within the palette memory 307. At this point in time, COLNUM=1 holds and the pixel data at address 0 of the palette memory 307 is {160,0,240}. Accordingly, the data of PRESENT [3] has not been registered and the program proceeds to step S335 as a result.

At step S335, the data {0,0,0} of PRESENT [3] is registered at address 1 (=COLNUM) of the palette memory 307 and 1 is substituted for the palette number P. COLNUM is then incremented (step S336). Next, it is determined whether COLNUM has attained the limit value (256) of the palette memory 307 (step S337). Since COLNUM=2 holds at this time, this means that the limit value has not been attained. Accordingly, the program proceeds to step S339 without any processing being executed. Since OUTBIT=1 holds at this time, the lower order bit of palette number P=1 is outputted and stored in the buffer 308a (step S339).

It is determined at step S341 whether COLNUM is equal to CHECK. Here COLNUM=2, CHECK=2 hold and the two are equal. As a result, the program proceeds to step S342, at which OUTBIT is incremented. CHECK×2=4 is then substituted for CHECK (step S343). As a result, the relations OUTBIT=2, CHECK=4 are established.

Next, the data of FORMA |3| and FORMB |3| is updated. That is, FORMA |3| is stored in FORMB |3| and PRESENT |3| is stored in FORMA |3| (steps S326, S327). Thus, the relations FORMA |3|={0,0,0} and FORMB |3|={255,255,255} are established.

The status of the data stored in the buffer 308a at this point in time is as follows:

(0) (0) (1/1/0) (0) (1/0) (0) (1/1/1)

The content of the palette memory is as follows:

content at address <00000000> =
10100000000000011110000 content at address <00000001> =
00000000000000000000000

Since the next pixel (h) has data identical with that of FORMA |3|, the first comparator outputs "0" and the selector 308 stores this in the buffer 308a.

The data of pixel (i) outputted by the pixel-data rearranging unit 301 has a value of {200,010,0}, and therefore the relation PRESENT |3|={200,10,0} is established (step S313). Next, PRESENT |3| and FORMA |3|={0,0,0} are compared (step S314). Since these have different values, the first comparator 304 outputs "1" and the selector 308 stores this in the buffer 308a (step S321).

Furthermore, the second comparator 305 compares PRESENT |3| and FORMB |3|={255,255,255} (step S322). Since these have different values, the second comparator 305 outputs "1" and the selector 308 stores this in the buffer 308a (step S328).

FLAG, which indicates whether COLNUM has attained the limit value of the palette memory 307, is checked at step S328. Since FLAG=0 holds at this time, it is judged that COLNUM has not attained the limit value of the palette memory 307, and the program proceeds to step S330. Here it is determined whether the data of PRESENT |3| has already been registered within the palette memory 307. At this point in time, COLNUM=2 holds and the items of pixel data at addresses 0, 1 of the palette memory 307 are {160,0,240} and {0,0,0}, respectively. Accordingly, the data of PRESENT |3| has not been registered and the program proceeds to step S335 as a result.

At step S335, the data {200,10,0} of PRESENT |3| is registered at address 2 (=COLNUM) of the palette memory 307 and 2 is substituted for the palette number P. COLNUM is then incremented (step S336). Next, it is determined whether COLNUM has attained the limit value (256) of the palette memory 307 (step S337). Since COLNUM=3 holds at this time, this means that the limit value has not been attained. Accordingly, the program proceeds to step S339 without any processing being executed. Since OUTBIT=2 holds at this time, the two lower order bits (10) of palette number P=2 are outputted and stored in the buffer 308a (step S339).

It is determined at step S341 whether COLNUM is equal to CHECK. Here COLNUM=3, CHECK=4 hold and the two are unequal. As a result, the program proceeds to step S326 without any processing being executed.

Next, the data of FORMA |3| and FORMB |3| is updated. That is, FORMA |3| is stored in FORMB |3| and PRESENT |3| is stored in FORMA |3| (steps S326, S327). Thus, the relations FORMA |3|={200,10,0} and FORMB |3|={0,0,0} are established.

The status of the data stored in the buffer 308a at this point in time is as follows:

(0) (0) (1/1/0) (0) (1/0) (0) (1/1/1) (0) (1/1/10)

The content of the palette memory is as follows:

content at address <00000000> =
10100000000000011110000 content at address <00000001> =
00000000000000000000000 content at address <00000010> =
11001000000010100000000

The data of the next pixel (j) is {0,0,0}, which is different from the data of FORMA |3| but the same as the data of FORMB |3|. Accordingly, the first comparator 304 outputs "1", the second comparator 305 outputs "0" and the selector 308 stores these in the buffer 308a. Thereafter, the data of FORMA |3| and FORMB |3| are interchanged so that the relations FORMA |3|={0,0,0}, FORMB |3|={200,10,0} are attained.

The data of pixel (k) outputted by the pixel-data rearranging unit 301 has a value of {255,255,255}, and therefore the relation PRESENT |3|={255,255,255} is established (step S313). Next, PRESENT |3| and FORMA |3|={0,0,0} are compared (step S314). Since these have different values, the first comparator 304 outputs "1" and the selector 308 stores this in the buffer 308a (step S321).

Furthermore, the second comparator 305 compares PRESENT |3| and FORMB |3|={200,10,0} (step S322). Since these have different values, the second comparator 305 outputs 11111 and the selector 308 stores this in the buffer 308a (step S328).

FLAG, which indicates whether COLNUM has attained the limit value of the palette memory 307, is checked at step S328. Since FLAG=0 holds at this time, it is judged that COLNUM has not attained the limit value of the palette memory 307, and the program proceeds to step S330. Here it is determined whether the data of PRESENT |3| has already been registered within the palette memory 307. At this point in time, COLNUM=3 holds and the items of pixel data at addresses 0, 1, 2 of the palette memory 307 are {160,0,240}, {0,0,0} and {200,10,0}, respectively. Accordingly, the data of PRESENT |3| has not been registered and the program proceeds to step S335 as a result.

At step S335, the data {255,255,255} of PRESENT |3| is registered at address 3 (=COLNUM) of the palette memory 307 and 3 is substituted for the palette number P. COLNUM is then incremented (step S336). Next, it is determined whether COLNUM has attained the limit value (256) of the palette memory 307 (step S337). Since COLNUM=4 holds at this time, this means that the limit value has not been attained. Accordingly, the program proceeds to step S339 without any processing being executed. Since OUTBIT=1 holds at this time, the two lower order bits (11) of palette number P=3 are outputted and stored in the buffer 308a (step S339).

It is determined at step S341 whether COLNUM is equal to CHECK. Here COLNUM=4, CHECK=4 hold and the two are equal. As a result, the program proceeds to step S342, at which OUTBIT is incremented. CHECK×2=4 is then substituted for CHECK (step S343). As a result, the relations OUTBIT=3, CHECK=8 are established.

Next, the data of FORMA |3| and FORMB |3| is updated. That is, FORMA |3| is stored in FORMB |3| and PRESENT |3| is stored in FORMA |3| (steps S326, S327). Thus, the relations FORMA |3|={255,255,255} and FORMB |3|={0,0,0} are established.

The status of the data stored in the buffer 308a at this point in time is as follows:

(0) (0)(1/1/0)(0)(1/0) (0) (1/1/1) (0) (1/1/10) (1/0) (1/1/11)

The content of the palette memory is as follows:

content at address <00000000> =
10100000000000011110000 content at address <00000001> =
000000000000000000000000 content at address <00000010> =
110010000000101000000000 content at address <00000011> =
111111111111111111111111

Since the next pixel (1) has data identical with that of FORMA [3], the first comparator outputs "0" and the selector 308 stores this in the buffer 308a.

The data of pixel (m) outputted by the pixel-data rearranging unit 301 has a value of {160,0,240}, and therefore the relation PRESENT [3] ={160,0,240} is established (step S313). Next, PRESENT [3] and FORMA [3]={255,255, 255} are compared (step S314). Since these have different values, the first comparator 304 outputs "1" and the selector 308 stores this in the buffer 308a (step S321).

Furthermore, the second comparator 305 compares PRESENT [3] and FORMB [3]={0,0,0} (step S322). Since these have different values, the second comparator 305 outputs "1" and the selector 308 stores this in the buffer 308a (step S328).

FLAG, which indicates whether COLNUM has attained the limit value of the palette memory 307, is checked at step S328. Since FLAG=0 holds at this time, it is judged that COLNUM has not attained the limit value of the palette memory 307, and the program proceeds to step S330. Here it is determined whether the data of PRESENT [3] has already been registered within the palette memory 307. At this point in time, COLNUM=4 holds and the items of pixel data at addresses 0, 1, 2 3 of the palette memory 307 are checked. Since the data {160,0,240} has already been registered at address 0, 0 is substituted for palette number P and the program proceeds to step S339. Since OUTBIT=3 at this time, the three lower order bits (=000) of palette number P=3 are outputted (step S339).

It is determined at step S341 whether COLNUM is equal to CHECK. Here COLNUM=4, CHECK=8 hold and the two are not equal. As a result, the program proceeds to step S327 without processing being executed.

The status of the data stored in the buffer 308a at this point in time is as follows:

(0) (0) (1/1/0) (0) (1/0) (0) (1/1/1) (0) (1/1/10) (1/0) (1/1/11) (0) (1/1/000)

The content of the palette memory is not changed.

By repeatedly applying the foregoing processing to the image of FIG. 31, the following code data is obtained:

(0) (0) (1/1/0) (0) (1/0) (0) (1/1/1) (0) (1/1/10) (1/0) (1/1/11) (0) (1/1/000) (0) (1/0) (0) (0) (0) (1/0) (0) (0) (1/1/00) (0) (0) (1/1/001) (1/0) (0) (0) (0) (1/1/011) (0) (0) (0) (0) (0) (1/0) (0) (1/1/000) (1/1/001) (0) (0) (1/1/010) (0) (0) (0) (1/1/011) (0) (0) (0) (0) (0) (0) (1/1/000) (1/1/010) (0) (0) (0) (1/1/001) (1/1/000) (1/1/011) (0) (0) (0) (0) (0) (0) (1/1/100) (0) (0) (1/1/001) (0) (0) (0) (1/0) (0) (0) (0) (1/1/001) (0) (0) (1/0) (0) (1/1/101) (0) (0) (0) (0) (0) (1/1/001) (1/1/100) (0) (1/1/101) (1/0) (0) (0) . . .

The content of the palette memory is as follows:

content at address <00000000> =
10100000000000011110000

-continued content at address <00000001> =
000000000000000000000000 content at address <00000010> =
110010000000101000000000 content at address <00000011> =
111111111111111111111111 content at address <00000100> =
000000000000000011111111 content at address <00000101> =
000010101000111001111000

When the number of items of image data that have appeared reaches 256 colors, the relation COLNUM=256 is established. Since this is not allowed by the palette memory, the flag is raised at step S338. Then, in subsequent processing, 24 bits of the image data of PRESENT [3] are outputted (step S340) rather than the address signal (1~8 bits) of the palette memory.

<Data Decompression Apparatus>

Described next will be a data decompression apparatus in which the data compressed by the data compression apparatus described above is restored to the original image data.

Figure 33:
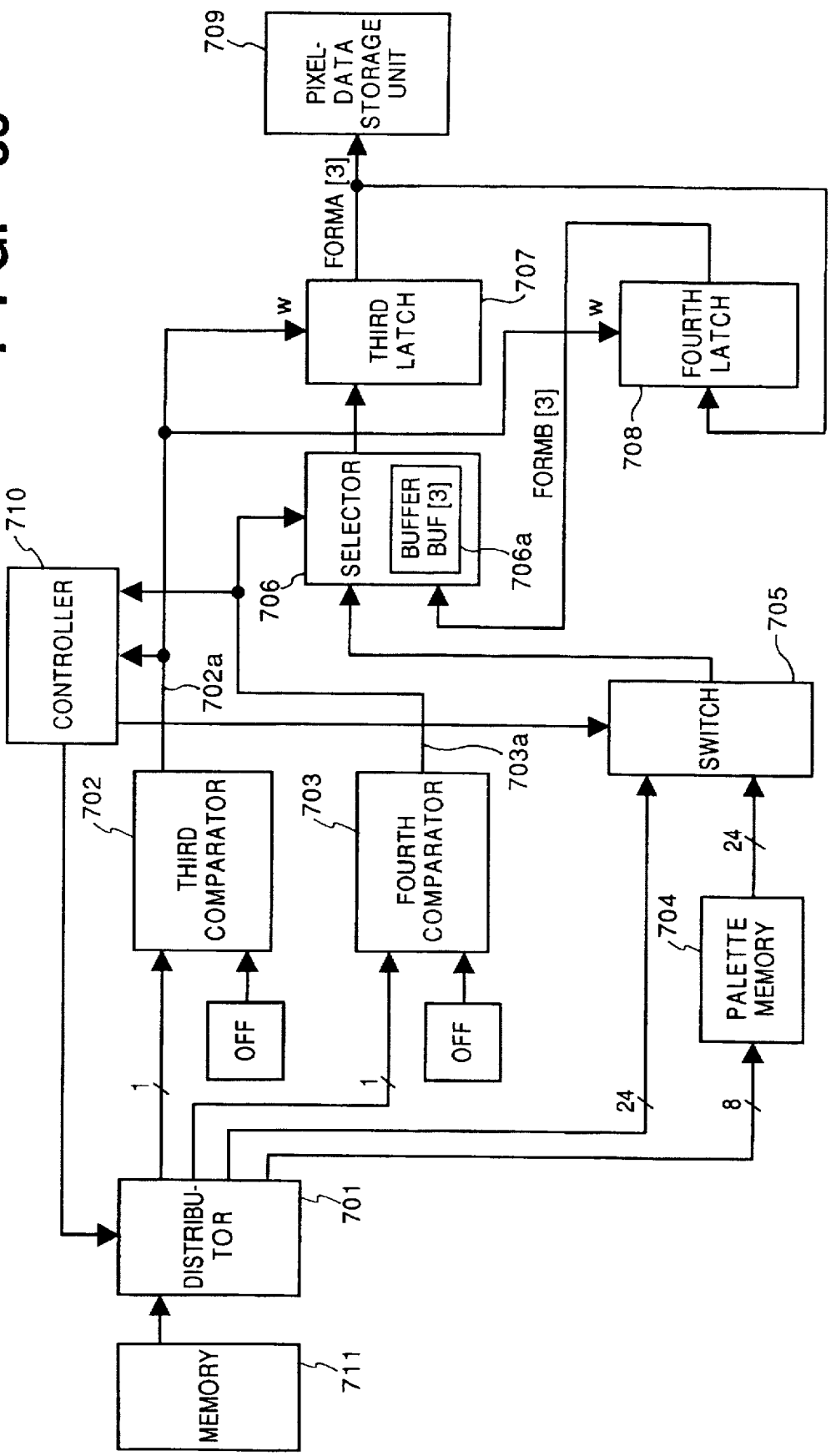
FIG. 33 is a block diagram illustrating the functional configuration of a data decompression apparatus according to the sixth embodiment.

FIG. 33 is a block diagram showing the functional configuration of the data decompression apparatus according to the sixth embodiment. Numeral 701 denotes a distributor for subdividing the data read out of the memory 711 into bit units and, under the control of a controller 710, for distributing the data to a third comparator 702, fourth comparator 703, palette memory 704 or switch 705. When the data is distributed to the palette memory 704, interpolation of the data is carried out as well (this will be described later). The third comparator 702 is for comparing the one-bit data received from the distributor 701 with "0" and delivering "0" as a signal 702a when the two compared items of data are equal and "1" as the signal 702a when the two items of data are not equal. The fourth comparator 62 compares the one-bit data received from the distributor with "0" and delivers "0" as a signal 703a when the two compared items of data are equal and "1" as the signal 703a when the two items of data are not equal. The palette memory 704 outputs 24-bit pixel data that has been stored at an address designated by eight-bit data received from the distributor 701. The limit value of the palette memory 704 is assumed to be 256. Under the control of the controller 710, the switch 705 changes over between 24-bit pixel data from the distributor 701 and the 24-bit pixel data from the palette memory 704. The pixel data from the switch 705 and the pixel data from the fourth latch 708 enter the selector 706, which selects either of these items of pixel data depending upon the output signal 703a of the fourth comparator 703. A third latch 707 latches the pixel data, which is the output of the selector 706, with the signal 702a serving as a write signal. A fourth latch 708 latches the output pixel data of the third latch 707, with the signal 702a serving as a write signal. Numeral 709 denotes a pixel-data storage unit for holding the output of the third latch at a location corresponding to this pixel data. The controller 710 controls the operation timing of each component based upon the states of the signals 702a and 703a. The controller 710 controls the number of bits of each signal within the distributor 701 and performs interpolation of the data, which is distributed to the palette memory 704, within the distributor 701.

The operation of the data decompression apparatus constructed as set forth above will now be described with reference to the flowcharts of FIGS. 34~36.

Figure 34:
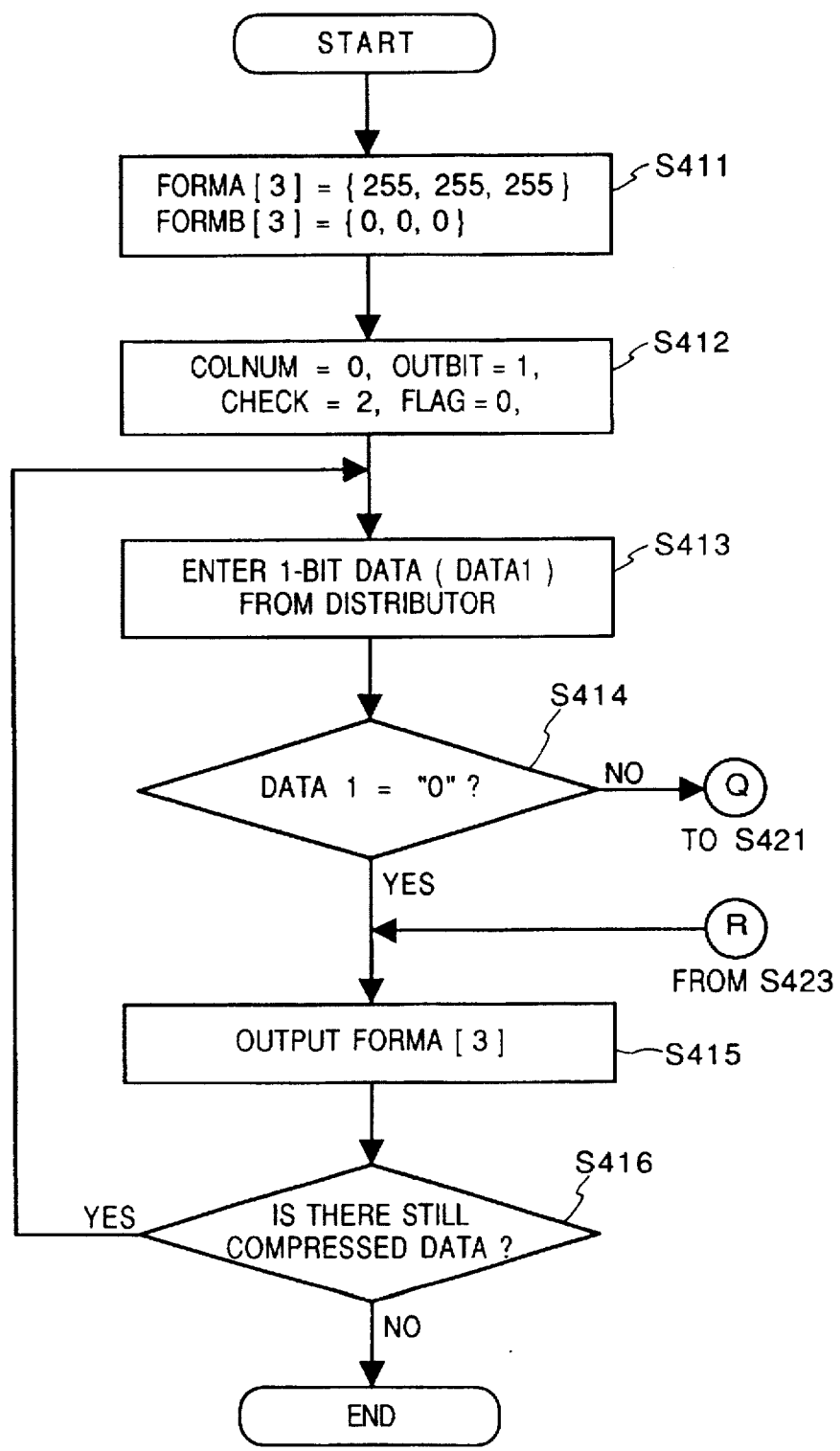
FIGS. 34, 35 and 36 are flowcharts illustrating the processing procedure of the data decompression apparatus according to a sixth embodiment.
Figure 35:
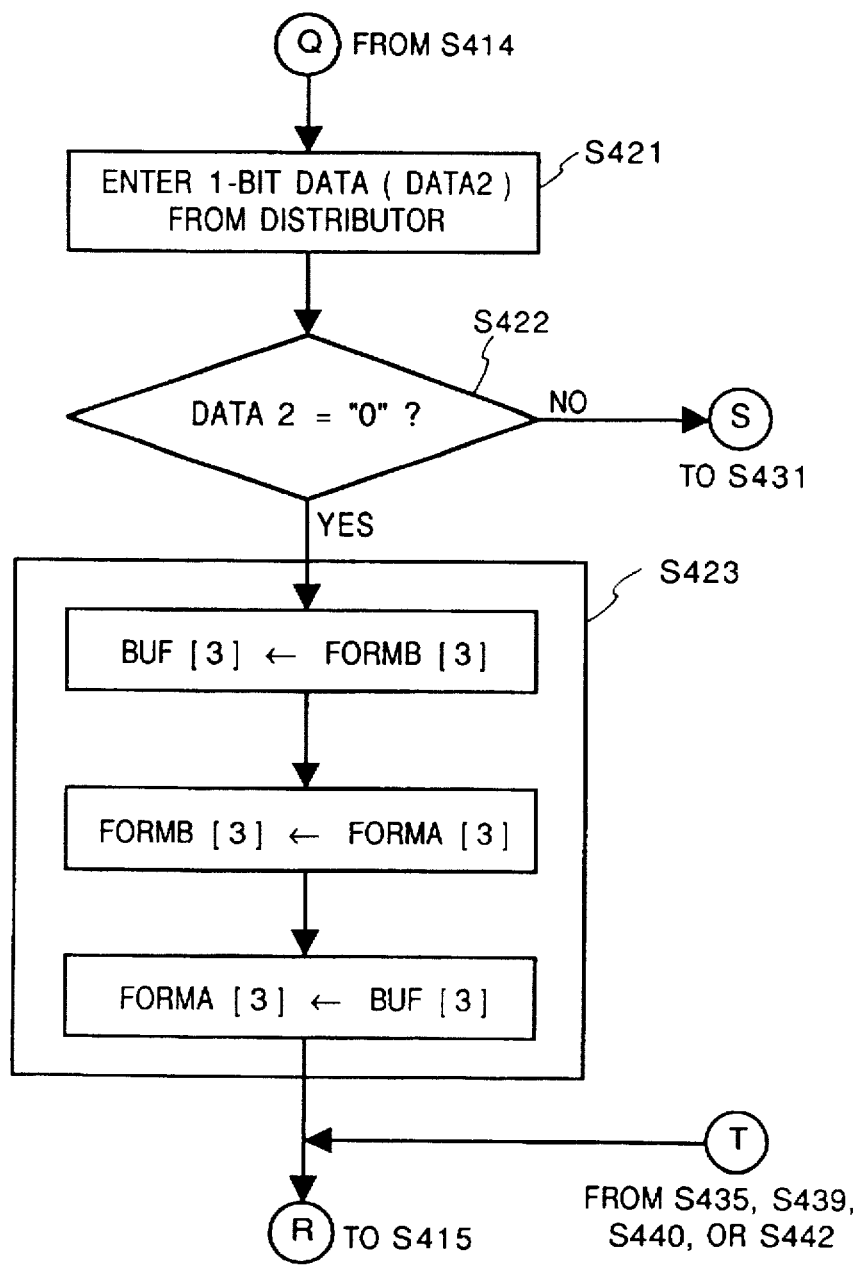
Figure 36:
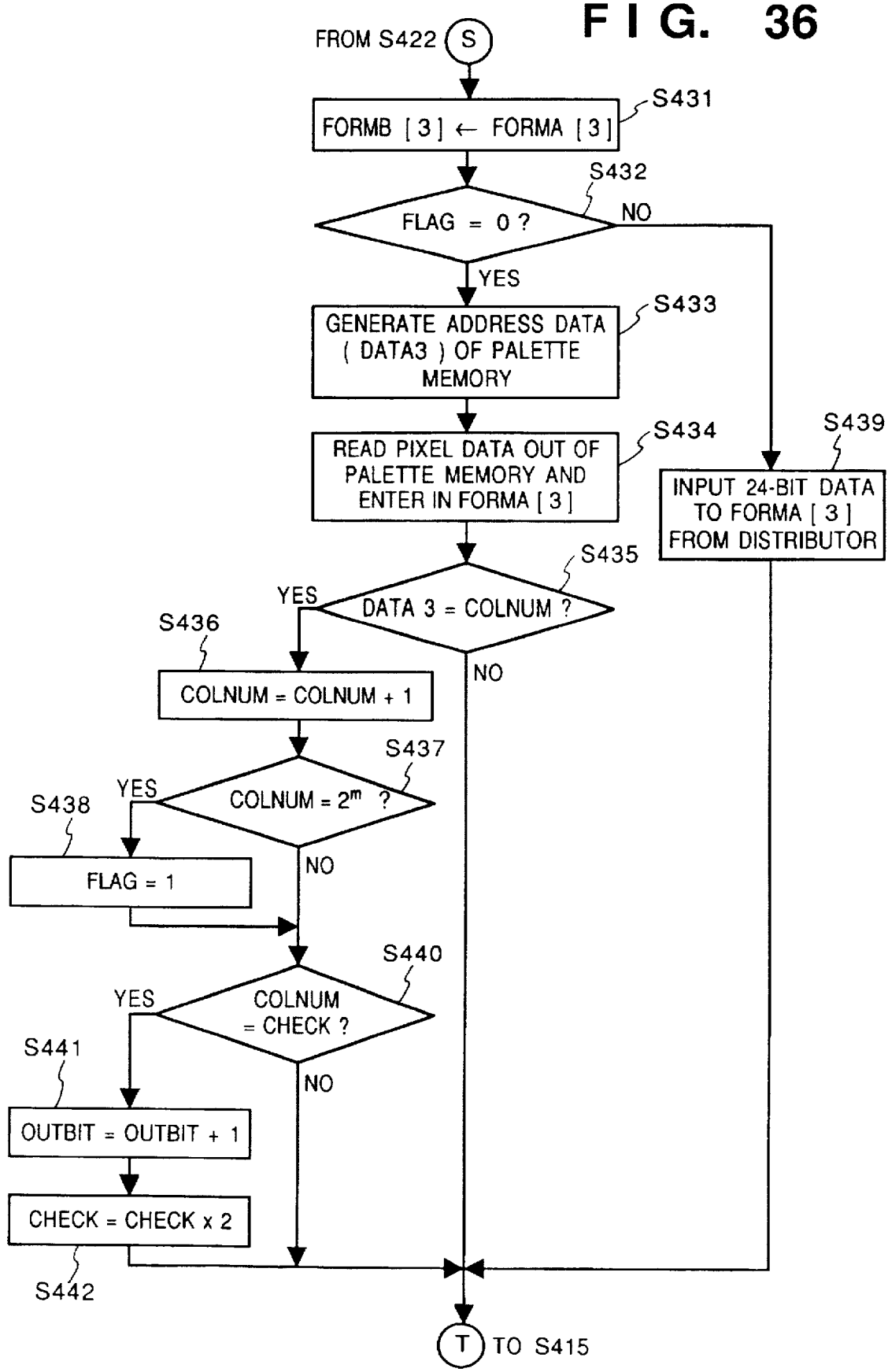

FIGS. 34 through 36 are flowcharts illustrating the processing procedure executed by the data decompression apparatus of the sixth embodiment. In the description that follows, FORMA |3| represents the data latched by the third latch 707, and FORMB |3| represents the data latched by the fourth latch 708.

The third latch 707 and fourth latch 708 are initialized at step S411, as a result of which FORMA |3| and FORMB |3| are set to initial values. It is required that these initial values be made the same as those at the time of compression. In this embodiment, therefore, we have FORMA |3|={255,255, 255} and FORMB |3|={0,0,0}. COLNUM, which counts the items of pixel data that have appeared, is set to 0 and FLAG, which indicates that COLNUM has exceeded the allowance of the palette memory, is reset at step S412. Furthermore, OUTBIT, which represents the output bit length, is set to 1, and CHECK, which is for establishing the timing at which OUTBIT is incremented, is set to 2. Next, the one-bit data is read out of the distributor 701 and this data is made DATA1 at step S413. This is followed by step S414, at which it is judged by the third comparator 61 whether DATA1 is "0" or not. If the result of comparison is that DATA1=0 holds, then the program proceeds to step S415. When DATA1≠0 holds, the program proceeds to step S421 in FIG. 34.

At step S415, FORMA |3| is outputted as the pixel data of this position and this is stored in the pixel-data storage unit 709. This is followed by step S416, at which it is determined whether compressed data still remains. If such data still remains, the program returns to step S413 and the foregoing processing is repeated. If there is no compressed data left, the present data decompression processing is terminated.

Processing for the case in which DATA1=1 holds will be described with reference to the flowchart of FIG. 35. The fact that the value of DATA1=1 means that the data of the pixel at this position has a value different from that of the color data of the preceding pixel. At step S421, the next item of one-bit data is read out of the distributor 701 and this data is treated as DATA2. Next, at step S422, the fourth comparator 703 performs a comparison to determine whether DATA2=0 holds. The program proceeds to step S423 when DATA2=0 holds and to step S431 when DATA2≠0 holds (FIG. 36).

The fact that DATA2=0 holds means that the pixel at this position is the same as the color data of FORMB |3|. Accordingly, the data of FORMA [3] and the data of FORMB |3| are interchanged, after which the program proceeds to step S415. At this step, the data of FORMA |3| (the data of FORMB |3| prior to updating) is outputted and stored in the pixel-data storage unit 709.

The operation for executing the processing of step S423 will be described with reference to the block diagram of FIG. 33.

Since the output of the fourth comparator 703 is "0", the selector 706 holds the output (FORMA |3|) from the fourth comparator 708 in BUF |3|. Next, FORMB |3| is updated to FORMA |3| by latching the output data of the third latch 707 in the fourth latch 708. In addition, the data BUF |3| held in the selector 706 is latched by the third latch 707, as a result of which the data of FORMB [3] prior to updating is stored in FORMA |3|. The data latched in the third latch 707 is stored in the pixel-data storage unit 709. Thus, the data of FORMB |3| prior to updating is outputted as the pixel data, and the data of FORMA |3| and FORMB |3| are interchanged.

If the relation DATA2=1 holds, the pixel at this position possesses data that differs from FORMA |3| and FORMB |3|. If FLAG=0 holds, an address of the palette memory 704 is read out of the distributor 701, the pixel data that has been stored at this address is delivered to the pixel-data storage unit 709, and updating of the data of FORMA |3| and FORMB |3| is executed. If FLAG=1 holds, the pixel data is read out of the distributor 701 and this is stored in the pixel-data storage unit 709.

First, at step S431, the value of FORMA |3| is substituted for FORMB |3|. Next, at step S432, it is determined whether FLAG is 0 or not, i.e., whether COLNUM has attained the limit value 256 of the palette memory or not. If the limit value has not been attained, the program proceeds to step S433. If the limit value has been attained, the program proceeds to step S439.

Next, at step S433, data in the number of bits indicated by OUTBIT is extracted from the distributor 701, 0 is interpolated as the higher order bit of the data, eight-bit data is produced as this is inputted to DATA3. The pixel data that has been stored at the address of palette memory 704 designated by DATA3 is inputted to FORMA |3| at step S434.

It is determined at step S435 whether DATA3 is equal to COLNUM. The program proceeds to step S436 if the two are equal and to step S415 if the two are different. Step 436 calls for incrementing of COLNUM. It is determined at step S437 whether COLNUM has attained the limit value of the palette memory, and FLAG is raised at step S438 is the limit value has been reached.

It is determined at step S440 whether COLNUM and CHECK are equal. If they are equal, the program proceeds to step S441, where OUTBIT is incremented. CHECK is then updated to the value of CHECK×2 at step S442. The program then proceeds to step S415, at which FORMA |3| is outputted.

When the flag has been raised at step S432, the program proceeds to step S439, at which the 24-bit data, which is the pixel data, is extracted from the distributor 701 and stored in FORMA [3]. The program then proceeds to step S415, at which FORMA |3| is outputted.

Actual compressed data will be decompressed in accordance with the foregoing flowcharts. Data, which is obtained by compressing the image data shown in FIG. 31 using the data compression apparatus set forth above, is subjected to decompression processing.

First, FORMA [3] and FORMB [3] are set to initial values (step S411).

At step S412, COLNUM, which counts the items of pixel data that have appeared, and FLAG, which indicates whether COLNUM has exceeded the limit value 256 of the palette memory, are reset, and OUTBIT, CHECK are set.

The distributor 701 extracts data from the memory 711 in a number of bits equivalent to the depth of the memory 711, stores this data and, under the control of the controller 710, distributes the data, in the necessary number of bits, to each of the components. Further, the above-mentioned compressed data (0) (0) (110) . . . has been stored in the memory 711.

First, one-bit data (DATA1) from the distributor is applied to the third comparator (step S413). When this is done, DATA1=1 holds, it is judged that this pixel is equal to FORMA |3| and {255,255,255} is outputted as the pixel data of pixel (a). A similar procedure is executed for pixel (b). Thus, data corresponding to the pixels (a), (b) in FIG. 31 is stored in the pixel-data storage unit 709.

Next, since the data distributed from the distributor 701 as DATA1 is 1, the program proceeds to step S421. Furthermore, since the one-bit data distributed by the distributor 701 as DATA2 also is 1, FORMA |3| is substituted for FORMB |3| and the relation FORMB |3|={255,255, 255} is established (step S431). Here, since FLAG=0 holds, eight-bit data is generated by substituting 0's in the higher order positions of the bit data having the number of bits indicated by the next OUTBIT number from the distributor 701. Here, since OUTBIT=1 holds, eight-bit data (00000000), which is obtained by substituting seven (8−OUTBIT=7) 0's in the higher order positions of the one-bit data (0) from the distributor 701, is substituted for DATA3 (steps S432, S433).

The pixel data {160,0,240} at address DATA3=00000000 of the palette memory is substituted for FORMA |3| at step S434. Here, since DATA3=COLNUM holds, the program proceeds to step S436 (step S435). COLNUM is then incremented (step S436). It is then determined whether COLNUM has attained the limit value 256 of the palette memory. Since the limit value has not yet been attained, the program proceeds to step S440 without any processing being executed (step S437). Step S440 calls for COLNUM and CHECK to be compared. Here, COLNUM=1, CHECK=2 hold. Since these values are different, the program proceeds to step S415 without any processing being executed. FORMA |3| is outputted to the pixel-data storage unit 709 as the pixel of this position.

Thus, the data corresponding to pixel (c) in FIG. 31 is stored in the pixel-data storage unit 709.

Since the next item of data distributed by the distributor 701 is 0, FORMA |3|={160,0,240} is outputted to the pixel-data storage unit 709 as the pixel of this position.

Thus, the data corresponding to pixel (d) in FIG. 31 is stored in the pixel-data storage unit 709.

Since the next item of data (DATA1) distributed by the distributor 701 is 1, the program proceeds to step S421 and the one-bit data from the distributor 701 is substituted for DATA2. Since DATA2 is 0, the program proceeds to step S423, FORMB |3| and FORMA |3| are interchanged, and the relations FORMB |3|={160,0,240}, FORMA |3|={255, 255,255} are established. FORMA |3| is outputted to the pixel-data storage unit 709 as the pixel of this position at step S415.

Thus, the data corresponding to pixel (e) in FIG. 31 is stored in the pixel-data storage unit 709.

Since the next item of data distributed by the distributor 701 is 0, FORMA |3|={255,255,255} is outputted to the pixel-data storage unit 709 as the pixel of this position.

Thus, the data corresponding to pixel (f) in FIG. 31 is stored in the pixel-data storage unit 709.

Since the next item of data distributed by the distributor 701 is 1, the program proceeds to step S421. Furthermore, since the one-bit data distributed by the distributor 701 as DATA2 also is 1, FORMA |3| is substituted for FORMB |3| and the relation FORMB |3|={255,255,255} is established (step S431). Since FLAG=0 holds here, eight-bit data is generated by substituting 0's in the higher order positions of the bit data having the number of bits indicated by the next OUTBIT number from the distributor 701. Here, since OUTBIT=1 holds, eight-bit data (00000001), which is obtained by substituting seven (8−OUTBIT=7) 0's in the higher order positions of the one-bit data (1) from the distributor 701, is substituted for DATA3 (steps S432, S433).

The pixel data {0,0,0} at address DATA3=00000001 of the palette memory is substituted for FORMA |3| at step S434. Here, since DATA3=COLNUM holds, the program proceeds to step S436 (step S435). COLNUM is then incremented (step S436). It is then determined whether COLNUM has attained the limit value 256 of the palette memory. Since the limit value has not yet been attained, the program proceeds to step S440 without any processing being executed (step S437). Step S440 calls for COLNUM and CHECK to be compared. Here, COLNUM=2, CHECK=2 hold. Since these values are equal, OUTBIT is incremented and CHECK is updated to CHECK×2=4 (steps S441, S442). As a result, the relations OUTBIT=2, CHECK=4 are established. FORMA |3| is outputted to the pixel-data storage unit 709 as the pixel of this position at step S415.

Thus, the data corresponding to pixel (g) in FIG. 31 is stored in the pixel-data storage unit 709.

Since the next item of data distributed by the distributor 701 is 0, FORMA |3|={0,0,0} is outputted to the pixel-data storage unit 709 as the pixel of this position.

Thus, the data corresponding to pixel (h) in FIG. 31 is stored in the pixel-data storage unit 709.

Since the next item of data distributed by the distributor 701 is 1, the program proceeds to step S421. Furthermore, since the one-bit data distributed by the distributor 701 as DATA2 also is 1, FORMA |3| is substituted for FORMB |3| and the relation FORMB |3|={0,0,0} is established (step S431). Since FLAG=0 holds here, eight-bit data is generated by substituting 0's in the higher order positions of the bit data having the number of bits indicated by the next OUTBIT number from the distributor 701. Here, since OUTBIT=2 holds, eight-bit data (00000010), which is obtained by substituting six (8−OUTBIT=6) 0's in the higher order positions of the two-bit data (10) from the distributor 701, is substituted for DATA3 (steps S432, S433).

The pixel data {200,10,0} at address DATA3=00000010 of the palette memory is substituted for FORMA |3| at step S434. Here, since DATA3=COLNUM holds, the program proceeds to step S436 (step S435). COLNUM is then incremented (step S436). It is then determined whether COLNUM has attained the limit value 256 of the palette memory. Since the limit value has not yet been attained, the program proceeds to step S440 without any processing being executed (step S437). Step S440 calls for COLNUM and CHECK to be compared. Here, COLNUM=3, CHECK=4 hold. Since these values are different, the program proceeds to step S415 without any processing being executed (step S437). FORMA |3| is outputted to the pixel-data storage unit 709 as the pixel of this position at step S415.

Thus, the data corresponding to pixel (i) in FIG. 31 is stored in the pixel-data storage unit 709.

Since the next item of data (DATA0) distributed by the distributor 701 is 1, the program proceeds to step S421 and the one-bit data from the distributor 701 is substituted for DATA2. Since DATA2 is 0, the program proceeds to step S423, FORMB |3| and FORMA |3| are interchanged, and the relations FORMB |3|={200,10,0}, FORMA |3|={0,0,0} are established. FORMA |3| is outputted to the pixel-data storage unit 709 as the pixel of this position at step S415.

Thus, the data corresponding to pixel (j) in FIG. 31 is stored in the pixel-data storage unit 709.

Since the next item of data distributed by the distributor 701 is 1, the program proceeds to step S421. Furthermore, since the one-bit data distributed by the distributor 701 as DATA2 also is 1, FORMA |3| is substituted for FORMB |3| and the relation FORMB |3|={0,0,0} is established (step S431). Since FLAG=0 holds here, eight-bit data is generated by substituting 0's in the higher order positions of the bit data having the number of bits indicated by the next OUTBIT number from the distributor 701. Here, since OUTBIT=2 holds, eight-bit data (00000011), which is obtained by substituting six (8−OUTBIT=6) 0's in the higher order positions of the two-bit data (11) from the distributor 701, is substituted for DATA3 (steps S432, S433).

The pixel data {255,255,255} at address DATA3= 00000011 of the palette memory is substituted for FORMA |3| at step S434. Here, since DATA3=COLNUM holds, the program proceeds to step S436 (step S435). COLNUM is then incremented (step S436). It is then determined whether COLNUM has attained the limit value 256 of the palette memory. Since the limit value has not yet been attained, the program proceeds to step S440 without any processing being executed (step S437). Step S440 calls for COLNUM and CHECK to be compared. Here, COLNUM=4, CHECK=4 hold. Since these values are equal, OUTBIT is incremented and CHECK is updated to CHECK×2=8 (steps S441, S442). As a result, the relations OUTBIT=3, CHECK=8 are established. FORMA |3| is outputted to the pixel-data storage unit 709 as the pixel of this position at step S415.

Thus, the data corresponding to pixel (k) in FIG. 31 is stored in the pixel-data storage unit 709.

Since the next item of data distributed by the distributor 701 is 0, FORMA |3|={255,255,255} is outputted to the pixel-data storage unit 709 as the pixel of this position.

Thus, the data corresponding to pixel (1) in FIG. 31 is stored in the pixel-data storage unit 709.

Since the next item of data distributed by the distributor 701 is 1, the program proceeds to step S421. Furthermore, since the one-bit data distributed by the distributor 701 as DATA2 also is 1, FORMA |3| is substituted for FORMB |3| and the relation FORMB |3|={255,255,255} is established (step S431). Since FLAG=0 holds here, eight-bit data is generated by substituting 0's in the higher order positions of the bit data having the number of bits indicated by the next OUTBIT number from the distributor 701. Here, since OUTBIT=3 holds, eight-bit data (00000000), which is obtained by substituting five (8−OUTBIT=5) 0's in the higher order positions of the three-bit data (000) from the distributor 701, is substituted for DATA3 (steps S432, S433).

The pixel data {160,0,240} at address DATA3=00000000 of the palette memory is substituted for FORMA |3| at step S434. Here, DATA3=0 and COLNUM=4 hold. Since these values are different, the program proceeds to step S415 without any processing being executed and FORMA |3| is outputted to the pixel-data storage unit 709 as the pixel of this position.

Thus, the data corresponding to pixel (m) in FIG. 31 is stored in the pixel-data storage unit 709.

When the decompression processing described above is executed for all of the compressed data, the R, G, B data of FIG. 31 can be restored without any change whatsoever.

In the sixth embodiment described above, the memory that stores the compressed data is constituted by a single memory (310). However, this does not impose a limitation upon the invention. For example, the memory may be divided into three separate memories, namely a memory for storing the output of the first comparator 304, a memory for storing the output of the second comparator 305 and a memory (i.e., a palette memory) for storing the pixel data. Dividing the memory in this manner simplifies the hardware configuration.

Furthermore, the number of bits of the data indicating the address of the palette memory is changed by the value of COLNUM. However, the number of bits may be fixed. In such case, the hardware configuration is simplified, though the amount of memory consumed by address data is increased and the compression ratio declines.

<Seventh Embodiment>

In the sixth embodiment, the latch for storing past pixel data is solely the second latch 303. However, it is possible to provide a plurality of such latches.

For example, if three of the second latches (a second latch 303a, a second latch 303b and a second latch 303c) are provided, three items of past pixel data can be stored. As a result, the compression ratio is raised since the number of times palette memory addresses and 24-bit pixel data are outputted declines. In such case, three of the second comparators (a second comparator 305a, a second comparator 305b and a second comparator 305c) also are required. In dependence upon the result of comparison performed by each of these second comparators, the signal 301b (two bits) varies as follows:

00: PRESENT |3| agrees with the second latch 303a;

01: PRESENT |3| agrees with the second latch 303b;

10: PRESENT |3| agrees with the second latch 303c; and

11: PRESENT |3| does not agree with any of the latches; hence, the palette address or pixel data is outputted.

The updated contents of the three second latches in a case where non-agreement is detected by the first comparator 304 change as follows in dependence upon the signal 301b:

00: the data of the second latch 303a is updated to the data of the first latch 302;

01: the data of the second latch 303b is updated to the data of the first latch 302;

02: the data of the second latch 303c is updated to the data of the first latch 302; and 11: the latch that was updated earliest is updated to the data of the first latch 302.

It should be noted that the arrangement is such that when the signal 301b is 11, the data of the second latch 303c is always updated to the data of the first latch 302.

Furthermore, the operation of the first latch 302 may be so adapted that the latched data is updated based upon the result of comparison in the first comparator 304, as illustrated in the foregoing flowcharts, or so that the latched data is updated whenever pixel data enters from the pixel-data generating unit 301.

[Eighth Embodiment]

Figure 38:
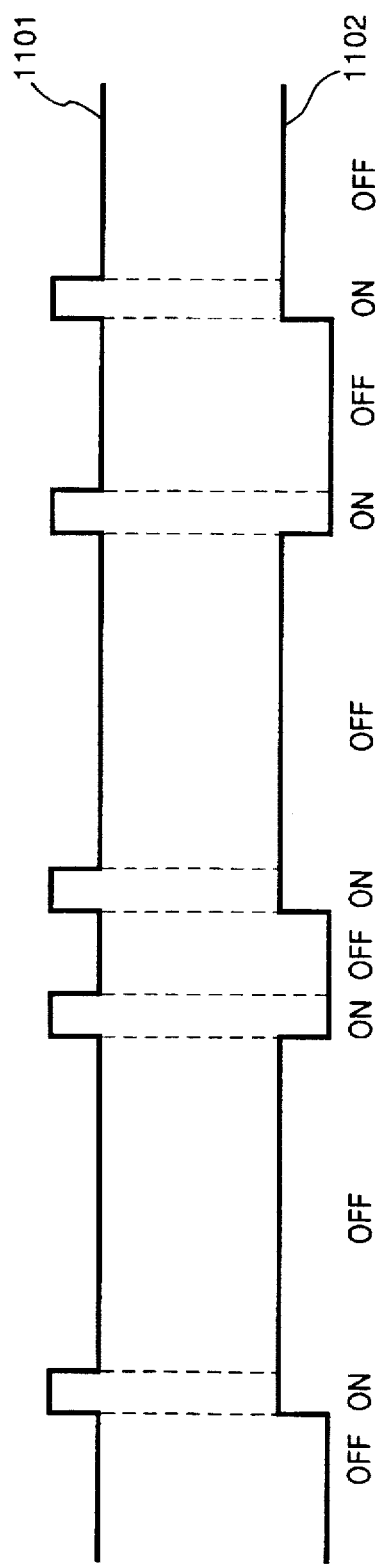
FIG. 38 is a diagram showing differences in ON/OFF representation by a flag system and trigger system.
Figure 39:
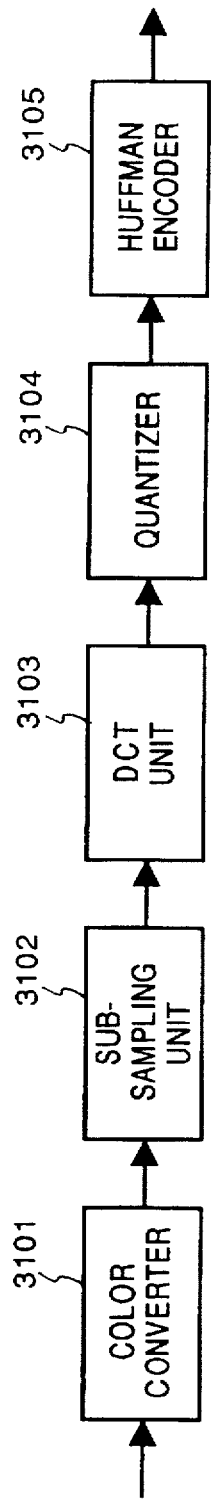
FIG. 39 is a block diagram showing the functional configuration of a typical ADCT compression apparatus.
Figure 40:
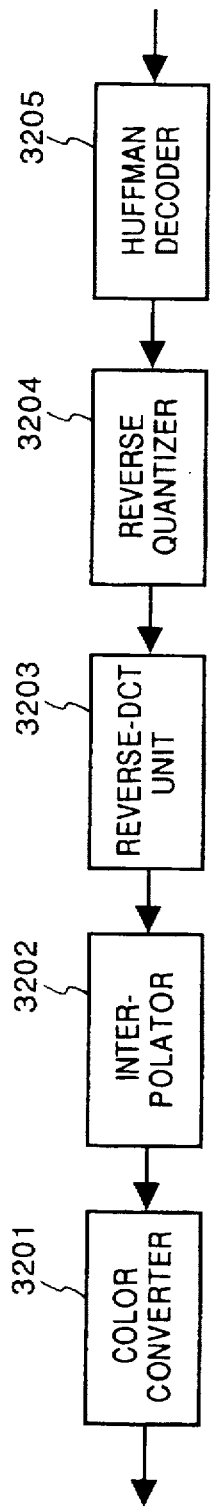
FIG. 40 is a block diagram showing the functional configuration of a typical ADCT decompression apparatus.

In the first through seventh embodiments described above, the data stored in the first memory unit 6 and second memory unit 7 is constituted by a flag system indicating ON/OFF (1/0). In the eighth embodiment, the data stored in the first and second memory units is constituted by a trigger system rather than a flag system. The difference between a flag system and a trigger system is shown in FIG. 38. Numeral 1101 represents the flag system, and numeral 1102 represents the trigger system. It will be apparent that the same data tends to have a longer duration in the trigger system 1102. This property can be exploited to apply run-length compression such as MH to the data in the first memory unit 6 and second memory unit 7 so that a further reduction in the amount of data can be achieved. In addition, the embodiment is not limited to MH; Huffman coding or Lempel-Ziv coding can be applied to the finished compressed data so that even more extensive data compression can be achieved.

In accordance with the method and apparatus for compressing and decompressing data according to the present invention as described above, a multivalued image produced by a computer or the like can be compressed at a higher compression ratio and decompressed while any decline in image quality is suppressed.

The present invention can be applied to a system comprising a plurality of devices or to an apparatus comprising a single device. Furthermore, it goes without saying that the invention is applicable also to a case where the object of the invention is attained by supplying programs to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A data compression apparatus for compressing multi-bit pixel data comprising:

first memory means for detecting a position at which there is a change in successively entered multi-bit pixel data and storing one-bit data for each pixel, the one-bit data representing, pixel by pixel, whether a pixel which is currently of interest is at the detected position;

holding means for holding at least one item of multi-bit pixel data prior to the change at previously detected positions;

comparing means which, when a position at which an entered multi-bit pixel data change has been detected, is for comparing said entered multi-bit pixel data and the multi-bit pixel data that has been stored in said holding means;

second memory means for storing a result of a comparison performed by said comparing means;

third memory means which, when the result of comparison performed by said comparing means is that multi-bit pixel data held by said holding means is different from said entered multi-bit pixel data, is for storing said entered pixel data as multi-bit data; and updating means for updating the multi-bit pixel data held by said holding means to multi-bit pixel data prior to the change at said position.

2. The apparatus according to claim 1, wherein said first through third memory means store each item of information as continuous data on a shared storage medium.

3. The apparatus according to claim 1, further comprising:

counting means for counting the total number of items of pixel data, which are stored by said third memory means, before processing for compressing the image data; and deciding means for deciding bit length of image data, which is outputted by said third memory means, based upon a result from said counting means and memory capacity for storing the compressed data;

wherein when the result of comparison performed by said comparing means is that all pixel data held by said holding means is different from said entered pixel data, said third memory means stores said entered pixel data upon limiting it to the bit length decided by said deciding means.

4. The apparatus according to claim 1, further comprising searching means which, when the result of comparison performed by said comparing means is that all pixel data held by said holding means is different from said entered pixel data, is for searching a storage unit, which stores a plurality of items of pixel data, based on said entered pixel data;

wherein if a result of retrieval performed by said searching means is that pixel data identical with said entered pixel data resides in said storage unit, said third memory means stores information indicative of the storage location, and if a result of search performed by said searching means is that pixel data identical with said entered pixel data does not reside in said storage unit, said third memory means stores said entered pixel data in said storage unit and stores information indicative of the storage location.

5. The apparatus according to claim 4, wherein the information indicative of the storage location stored in said third memory means comprises a number of bits that is changed in dependence upon the number of items of pixel data stored in said storage unit.

6. A data decompression apparatus for decompressing multi-bit pixel data comprising:

first output means for entering first data representing a position at which multi-bit pixel data changes, and outputting a plurality of multi-bit pixel data having the same level until said position is detected based upon the first data, the first data being one-bit data indicating, pixel by pixel, whether a pixel which is currently of interest is at the position;

holding means for holding at least one item of multi-bit pixel data prior to the change at said position already detected;

discriminating means for entering second data which represents holding status of said holding means when said position has been detected based upon the first data, and for discriminating, based upon the second data, whether the multi-bit pixel data to be outputted is being held in said holding means;

second output means which, when it has been discriminated by said discriminating means that said holding means is holding the multi-bit pixel data to be outputted, is for extracting the multi-bit pixel data to be outputted from said holding means based upon the second data and outputting the extracted multi-bit pixel data;

updating means for updating the multi-bit pixel data held by said holding means to multi-bit pixel data prior to the change at said position when said position has been detected; and third output means entering third data, which is multi-bit pixel data to be outputted, is entered when it has been discriminated by said discriminating means that said holding means is not holing the multi-bit pixel data to be outputted, and outputting said third data.

7. The apparatus according to claim 6, further comprising storage means for storing each of the first data, second data and third data.

8. The apparatus according to claim 6, further comprising storage means for storing the first data, second data and third data as continuous data.

9. The apparatus according to claim 6, wherein bit length of the third data is shorter than bit length of the pixel data to be outputted, and further comprising generating means, to which the third data is entered when it has been discriminated by said discriminating means that said holding means is not holding the pixel data to be outputted, for supplementing the third data with bit data to generate pixel data having a prescribed bit length;

said third output means outputting the pixel data generated by said generating means.

10. The apparatus according to claim 9, wherein the status of the bit data supplemented in said generating means is decided based upon the status of the most significant bit of the third data.

11. The apparatus according to claim 6, wherein when it has been discriminated by said discriminating means that said holding means is not holding the pixel data to be outputted, third data, which represents storage location of the pixel data to be outputted, is entered in said third output means and said third output means, on the basis of said third data, reads pixel data out of a storage unit, in which a plurality of items of pixel data have been stored, and outputs the pixel data read out.

12. The apparatus according to claim 11, wherein bit length of the third data changes based upon the number of items of pixel data read out of said storage unit, and further comprising generating means for supplementing bit data in dependence upon the bit length of the entered the third data, and generating position information for reading pixel data out of the storage unit storing a plurality of items of pixel data;

wherein when it has been discriminated by said discriminating means that said holding means is not holding the pixel data to be outputted, said third output means reads the pixel data out of the storage unit, which stores a plurality of items of pixel data, based upon the position information generated by said generating means, and outputs the pixel data read out.

13. A data compression method for compressing multi-bit pixel data comprising:

a first memory step of detecting a position at which there is a change in successively entered multi-bit pixel data and storing one-bit data for each pixel in a first memory, representing, pixel by pixel, whether a pixel which is currently of interest is at the detected position;

a comparing step of comparing said entered multi-bit pixel data and the multi-bit pixel data that has been stored in holding means which holds at least one item of multi-bit pixel data prior to the change at previously detected position when a position at which entered multi-bit pixel data changes has been detected;

a second memory step of storing a result of comparison performed in said comparing step, in a second memory means;

a third memory step of storing said entered multi-bit pixel data when the result of comparison performed in said comparing step is that multi-bit pixel data held by the holding means is different from said entered multi-bit pixel data as multi-bit data; and an updating step of updating the multi-bit pixel data held by the holding means to multi-bit pixel data prior to the change at said position.

14. The method according to claim 13, wherein said first through third memory steps are steps of storing each item of information as continuous data on a shared storage medium.

15. The method according to claim 13, further comprising:

a counting step of counting the total number of items of pixel data, which are stored at said third memory step, before processing for compressing the image data; and a deciding step of deciding bit length of image data, which is outputted at said third memory step, based upon a result from said counting step and memory capacity for storing the compressed data;

wherein when the result of comparison performed at said comparing step is that all pixel data held by said holding means is different from said entered pixel data, said third memory step is a step of storing said entered pixel data upon limiting it to the bit length decided at said deciding step.

16. The method according to claim 13, further comprising a searching step which, when the result of comparison performed at said comparing step is that all pixel data held by said holding means is different from said entered pixel data, is a step of searching a storage unit, which stores a plurality of items of pixel data, based on said entered pixel data;

wherein if a result of search performed at said searching step is that pixel data identical with said entered pixel data resides in said storage unit, said third memory step stores information indicative of the storage location, and if a result of search performed by said search means is that pixel data identical with said entered pixel data does not reside in said storage unit, said third memory step stores said entered pixel data in said storage unit and stores information indicative of the storage location.

17. The method according to claim 16, wherein the information indicative of the storage location stored at said third memory step comprises a number of bits that is changed in dependence upon the number of items of pixel data stored in said storage unit.

18. A data decompression method for decompressing multi-bit pixel data comprising:

a first output step of entering first data representing a position at which multi-bit pixel data changes, and outputting a plurality of multi-bit pixel data having the same level until said position is detected based upon the first data, the first data being one-bit data indicating, pixel by pixel, whether a pixel which is currently of interest is at the position;

a discriminating step of entering second data which represents holding status of holding means which holds at least one item of multi-bit pixel data prior to the change at previously detected position when said position has been detected based upon the first data, and discriminating, based upon the second data, whether the multi-bit pixel data to be outputted is being held in said holding means;

a second output step of extracting the multi-bit pixel data to be outputted from the holding means based upon the second data and outputting the extracted multi-bit pixel data when it has been discriminated in said discriminating step that the holding means is holding the multi-bit pixel data to be outputted;

an updating step of updating the multi-bit pixel data held by the holding means to multi-bit pixel data prior to the change at said position when said position has been detected; and a third output step of entering third data, which is multi-bit pixel data to be outputted, when it has been discriminated in said discriminating step that the holding means is not holding the multi-bit pixel data to be outputted, and outputting said third data.

19. The method according to claim 18, further comprising a storage step of storing each of the first data, second data and third data.

20. The method according to claim 18, further comprising a storage step of storing the first data, second data and third data as continuous data.

21. The method according to claim 18, wherein bit length of the third data is shorter than bit length of the pixel data to be outputted, and further comprising a generating step of entering the third data when it has been discriminated at said discriminating step that said holding means is not holding the pixel data to be outputted, and supplementing the third data with bit data to generate pixel data having a prescribed bit length;

said third output step outputting the pixel data generated at said generating step.

22. The apparatus according to claim 21, wherein the status of the bit data supplemented at said generating step is decided based upon the status of the most significant bit of the third data.

23. The apparatus according to claim 18, wherein when it has been discriminated at said discriminating step that said holding means is not holding the pixel data to be outputted, said third step enters third data, which represents storage location of the pixel data to be outputted, reads pixel data out of a storage unit, in which a plurality of items of pixel data have been stored, based on said third data, and outputs the pixel data read out.

24. The method according to claim 23, wherein bit length of the third data changes based upon the number of items of pixel data read out of said storage unit, and further comprising a generating step of supplementing bit data in dependence upon the bit length of the entered the third data, and generating position information for reading pixel data out of the storage unit storing a plurality of items of pixel data;

wherein when it has been discriminated at said discriminating step that said holding means is not holding the pixel data to be outputted, said third output step reads the pixel data out of the storage unit, which stores a plurality of items of pixel data, based upon the position information generated at said generating step, and outputs the pixel data read out.

* * * * *

UNITED STATES PATENT AND TRADEMARK OFFICE
CERTIFICATE OF CORRECTION

PATENT NO. : 5,796,872
DATED : August 18, 1998
INVENTOR(S) : YUKARI SHIMOMURA

It is certified that error appears in the above-identified patent and that said Letters Patent is hereby corrected as shown below:

ON COVER PAGE AT [57], ABSTRACT

Line 17, "this pixel data." should read --the most recent pixel data from the generating unit.--.

SHEET 26

Figure 30, "PRESETNT" should read --PRESENT--.

COLUMN 10

Line 39, "DATA2=0holds," should read --DATA2=0 holds,--.

COLUMN 11

Line 4, "computed-produced" should read --computer-produced--;
Line 60, "corresponding" should read --corresponding to--.

COLUMN 20

Line 66, "rearranged" should read --are rearranged--.

COLUMN 21

Line 48, "even not even" should read --not even--.

UNITED STATES PATENT AND TRADEMARK OFFICE
CERTIFICATE OF CORRECTION

PATENT NO. : 5,796,872
DATED : August 18, 1998
INVENTOR(S) : YUKARI SHIMOMURA

It is certified that error appears in the above-identified patent and that said Letters Patent is hereby corrected as shown below:

COLUMN 24

Line 27, "11111" should read --1--.

COLUMN 28

Line 27, "is the" should read --if the--.

COLUMN 35

Line 11, "the third" should read --third--.

Signed and Sealed this

Thirteenth Day of April, 1999

Attest:

Q. TODD DICKINSON

Attesting Officer    Acting Commissioner of Patents and Trademarks